US012561050B2

(12) United States Patent
Seki et al.

(10) Patent No.: US 12,561,050 B2
(45) Date of Patent: Feb. 24, 2026

(54) INFORMATION PROCESSING APPARATUS IMPLEMENTING A PIPING AND INSTRUMENTATION DIAGRAM, INFORMATION PROCESSING METHOD, AND PROGRAM

(71) Applicant: YOKOGAWA ELECTRIC CORPORATION, Tokyo (JP)

(72) Inventors: Tatenobu Seki, Musashino (JP); Takahiro Kambe, Musashino (JP); Yuri Kimura, Musashino (JP); Masato Annen, Musashino (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 0 days.

(21) Appl. No.: 18/537,464

(22) Filed: Dec. 12, 2023

(65) Prior Publication Data

US 2024/0111401 A1 Apr. 4, 2024

Related U.S. Application Data

(62) Division of application No. 17/455,357, filed on Nov. 17, 2021, now abandoned.

(30) Foreign Application Priority Data

| Nov. 18, 2020 | (JP) | ................................. | 2020-192045 |
| Nov. 18, 2020 | (JP) | ................................. | 2020-192046 |

(Continued)

(51) Int. Cl.
*G06F 3/048* (2013.01)
*G06F 3/04842* (2022.01)
(Continued)

(52) U.S. Cl.
CPC ...... *G06F 3/04842* (2013.01); *G06F 3/04845* (2013.01); *G06F 3/04847* (2013.01);
(Continued)

(58) Field of Classification Search
CPC ............. G06F 3/04842; G06F 3/04847; G06F 3/04845; G06F 3/04883; G06F 16/532; G06F 18/22; G06F 18/2431
See application file for complete search history.

(56) References Cited

U.S. PATENT DOCUMENTS

| 6,289,254 B1 | 9/2001 | Shimizu et al. |
| 9,710,159 B2 * | 7/2017 | Miyazawa .......... G06F 3/04842 |

(Continued)

FOREIGN PATENT DOCUMENTS

| CN | 1908961 A | 2/2007 |
| CN | 102402621 A | 4/2012 |

(Continued)

OTHER PUBLICATIONS

Communication dated Apr. 16, 2024 issued by the European Patent Office in application No. 21208960.1.
(Continued)

*Primary Examiner* — Mahelet Shiberou
(74) *Attorney, Agent, or Firm* — Sughrue Mion, PLLC

(57) ABSTRACT

An information processing apparatus including a processor that receives a selection from a user of a region, in a drawing in which elements are indicated by graphics, that contains the graphics, extracts from the drawing one or more first elements, indicated by the graphics, that are completely contained within the region for which the selection is received, extracts from the drawing one or more second elements, indicated by the graphics, that intersect a boundary of the region for which the selection is received, extracts a third element from the one or more second elements based (Continued)

on a positional relationship between the graphics indicating the one or more second elements and the boundary, and stores a set of elements including the one or more first elements and the third element in a storage as an element group selected by the user.

11 Claims, 44 Drawing Sheets

(30)         Foreign Application Priority Data

| Nov. 18, 2020 | (JP) | 2020-192049 |
|---|---|---|
| Nov. 18, 2020 | (JP) | 2020-192082 |
| Nov. 18, 2020 | (JP) | 2020-192084 |
| Nov. 18, 2020 | (JP) | 2020-192085 |
| Nov. 18, 2020 | (JP) | 2020-192087 |
| Nov. 18, 2020 | (JP) | 2020-192089 |

(51) Int. Cl.

| | |
|---|---|
| *G06F 3/04845* | (2022.01) |
| *G06F 3/04847* | (2022.01) |
| *G06F 3/04883* | (2022.01) |
| *G06F 16/532* | (2019.01) |
| *G06F 18/22* | (2023.01) |
| *G06F 18/2431* | (2023.01) |

(52) U.S. Cl.
CPC ........ *G06F 3/04883* (2013.01); *G06F 16/532* (2019.01); *G06F 18/22* (2023.01); *G06F 18/2431* (2023.01)

(56)         References Cited

U.S. PATENT DOCUMENTS

| 10,445,570 | B2 | 10/2019 | Kawano |
|---|---|---|---|
| 2003/0236778 | A1 | 12/2003 | Masumoto et al. |
| 2004/0004625 | A1* | 1/2004 | Chao .................... G06F 40/103 |
| | | | 345/622 |
| 2004/0015340 | A1 | 1/2004 | Kadoi et al. |
| 2007/0031066 | A1 | 2/2007 | Nakano |
| 2011/0219352 | A1 | 9/2011 | Majumder et al. |
| 2012/0026100 | A1* | 2/2012 | Migos ................... G06F 3/0412 |
| | | | 345/173 |
| 2016/0117093 | A1* | 4/2016 | Yokoyama .......... G06F 3/04883 |
| | | | 715/760 |
| 2016/0125037 | A1 | 5/2016 | Iwamura |
| 2016/0239185 | A1 | 8/2016 | Balimidi et al. |
| 2019/0050116 | A1* | 2/2019 | Kim ...................... G06T 11/206 |
| 2021/0286349 | A1* | 9/2021 | Mabote .............. G05B 19/0423 |

FOREIGN PATENT DOCUMENTS

| CN | 105573236 A | 5/2016 |
|---|---|---|
| CN | 110750953 A | 2/2020 |
| JP | 03-189762 A | 8/1991 |
| JP | 5-143706 A | 6/1993 |
| JP | 7-311783 A | 11/1995 |
| JP | 9-128434 A | 5/1997 |
| JP | 10-207923 A | 8/1998 |
| JP | 10-240960 A | 9/1998 |
| JP | 10-254941 A | 9/1998 |
| JP | 11-39366 A | 2/1999 |
| JP | 2002-230055 A | 8/2002 |
| JP | 2004-127002 A | 4/2004 |
| JP | 2006-155406 A | 6/2006 |
| JP | 2008-250888 A | 10/2008 |
| JP | 2010-128595 A | 6/2010 |
| JP | 2011-175341 A | 9/2011 |
| JP | 2012-174127 A | 9/2012 |
| JP | 2012-203458 A | 10/2012 |
| JP | 2012-230586 A | 11/2012 |
| JP | 2014-194771 A | 10/2014 |
| JP | 2015-125524 A | 7/2015 |
| JP | 2017-228008 A | 12/2017 |
| JP | 2018-013971 A | 1/2018 |
| JP | 2019-57051 A | 4/2019 |

OTHER PUBLICATIONS

Find and Replace Objects in AutoCAD with dwgExplore, "The Wayback Machine", Feb. 8, 2016, pp. 1-4, XP55906191A, http://web.archive.org/web/20160208095801/ http://www.cpprs.com/dwgexplore.html.
AutoCAD Tricks—Object Selection, Mar. 19, 2015, pp. 1-3, XP55906058A, http://web.archive.org/web/20150319215804 https://www.cadtobim.com/object-selection.html.
AutoClass—automatic classification of object properties, cadstudio, Mar. 16, 2016, Retrieved from: http://web.archive.org/web/20160316105358/ https://www.cadstudio.cz/autoclass (5 pages total).
Find and Replace Objects in AutoCAD with dwgExplore, cpprs, Mar. 19, 2015, Retrieved from: http://web.archive.org/web/20160208095801/http://www.cpprs.com/dwgexplore.html (4 pages total).
AutoCAD Tips and Tricks—Object Selection, cadtobim, Mar. 19, 2015, Retrieved from: http://web.archive.org/web/20150319215804/ https://www.cadtobim.com/object-selection.html (3 pages total).
AutoCAD LT Tips Guide, Autodesk, Jan. 1, 2019, Retrieved from: https://damassets.autodesk.net/content/dam/autodesk/docs/pdfs/AutoCAD-LT-2019-tips-guide-en.pdf?av=20190111194833 (41 pages total).
https://www.youtube.com/watch?v=aRB-_HFAHkc, Find and Replace Similar Objects in AutoCAD, Published Oct. 9, 2015 (Year: 2015).
Communication issued Mar. 12, 2025 in Chinese Application No. 202111367449.8.
Chinese Office Action dated Nov. 4, 2025, issued in Chinese application No. 202111367449.8.

* cited by examiner

Figure 5:
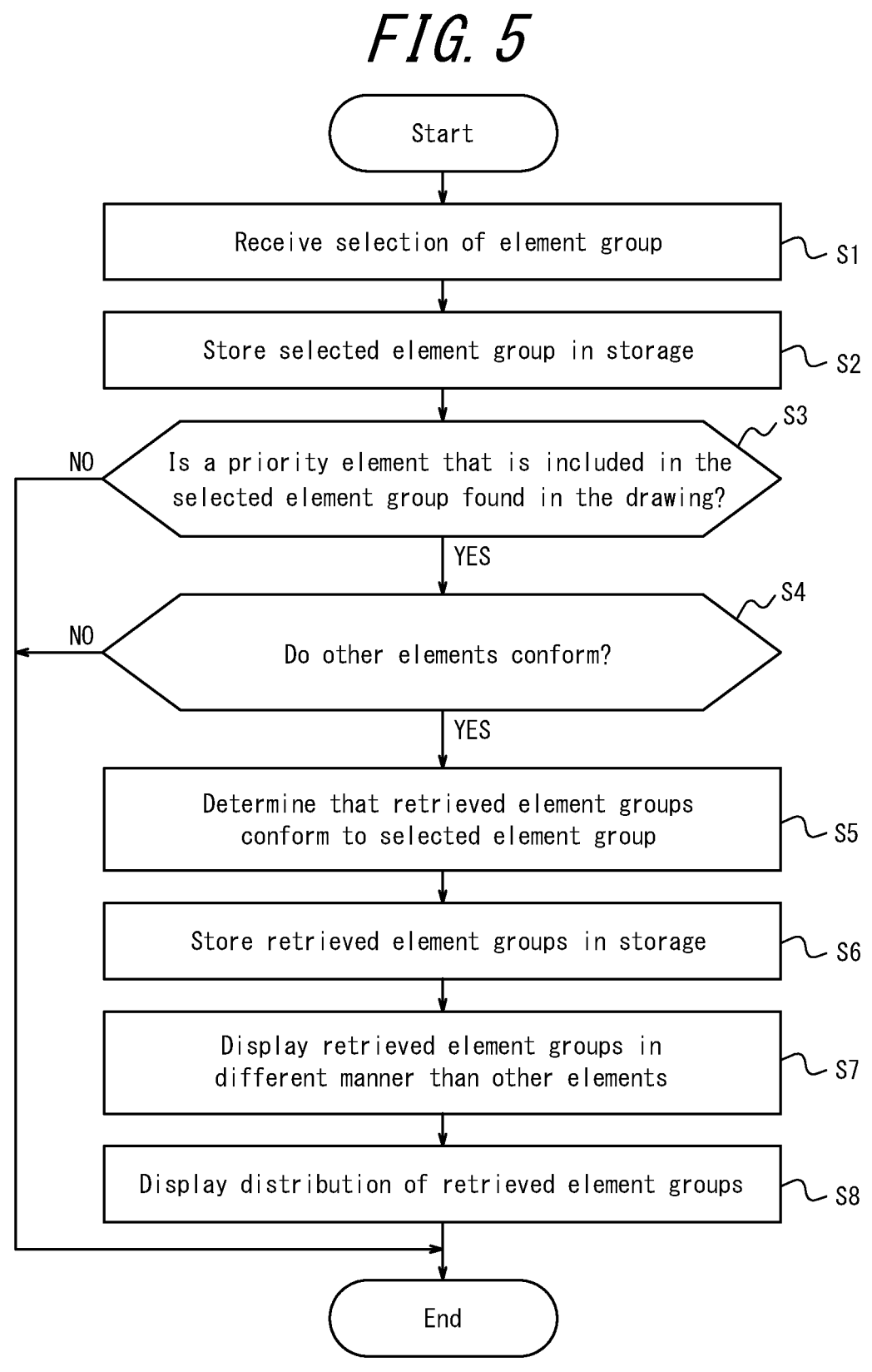

Start

Receive selection of element group    S1

Store selected element group in storage    S2

NO ← Is a priority element that is included in the selected element group found in the drawing?    S3

YES

NO ← Do other elements conform?    S4

YES

Determine that retrieved element groups conform to selected element group    S5

Store retrieved element groups in storage    S6

Display retrieved element groups in different manner than other elements    S7

Display distribution of retrieved element groups    S8

End

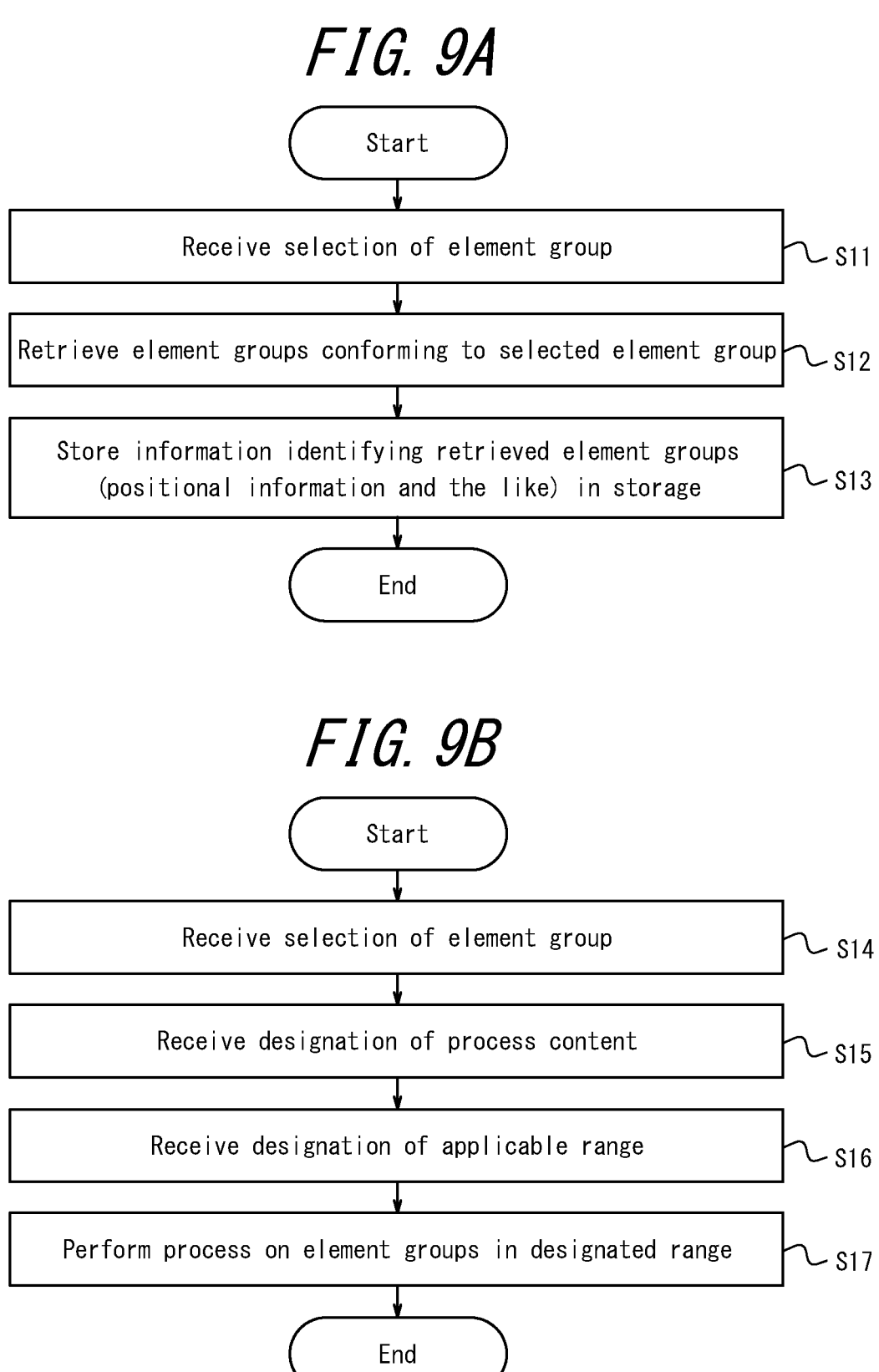

*FIG. 9A*

Start

Receive selection of element group   S11

Retrieve element groups conforming to selected element group   S12

Store information identifying retrieved element groups (positional information and the like) in storage   S13

End

*FIG. 9B*

Start

Receive selection of element group   S14

Receive designation of process content   S15

Receive designation of applicable range   S16

Perform process on element groups in designated range   S17

End

Attribute information 1    a1
Attribute information 2    a2

| | A | B | C |
|---|---|---|---|
| Element | ✓ | ✓ | ✓ |
| Arrangement | ✓ | ✓ | ✓ |
| Setting | ✓ | ✓ | ✓ |
| Attribute 1 | ✓ | — | — |
| Attribute 2 | ✓ | — | — |
| Character | ✓ | ✓ | ✓ |
| Graphic | ✓ | ✓ | ✓ |

Attribute information 1 | a1
Attribute information 2   a2

FIG. 18

| | Element 1 | Element 2 | Element 3 | ... | Device No. of element 3 | Setting value of element 3 | ... | Score | Evaluation |
|---|---|---|---|---|---|---|---|---|---|
| Reference | C | A | B | | ABC110 | 22.5 | | — | — |
| 1a | C | A | B | | ABC110 | 22.5 | | 100 | Identical |
| 1b | C | A | B | | ABC110 | — | | 98 | Error? |
| 1c | C | A | B | | ADC110 | 22.5 | | 95 | Error? |
| 2 | D | A | B | | | | | 70 | Different |
| 3 | A | B | C | | | | | 60 | Different |

FIG. 31A
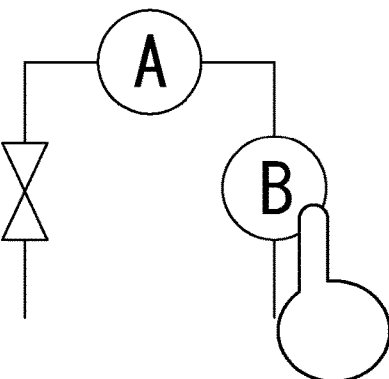
Information on element B
Tag No. : PT010
Model : ADC110
Setting : −
FIG. 31B
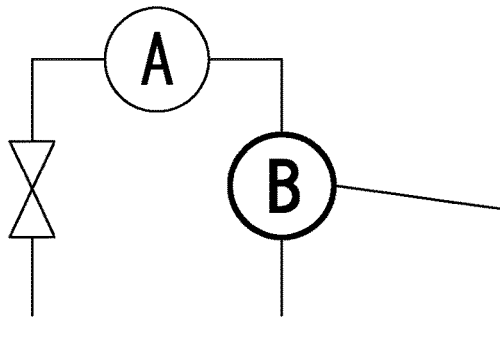
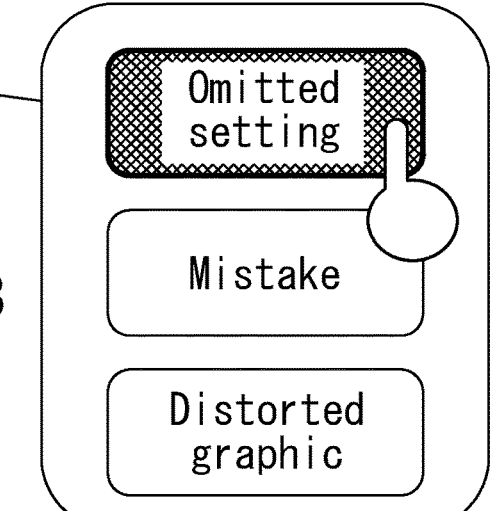
Information on element B
Tag No. : PT010
Model : ADC110
Setting : −

Figure 33:
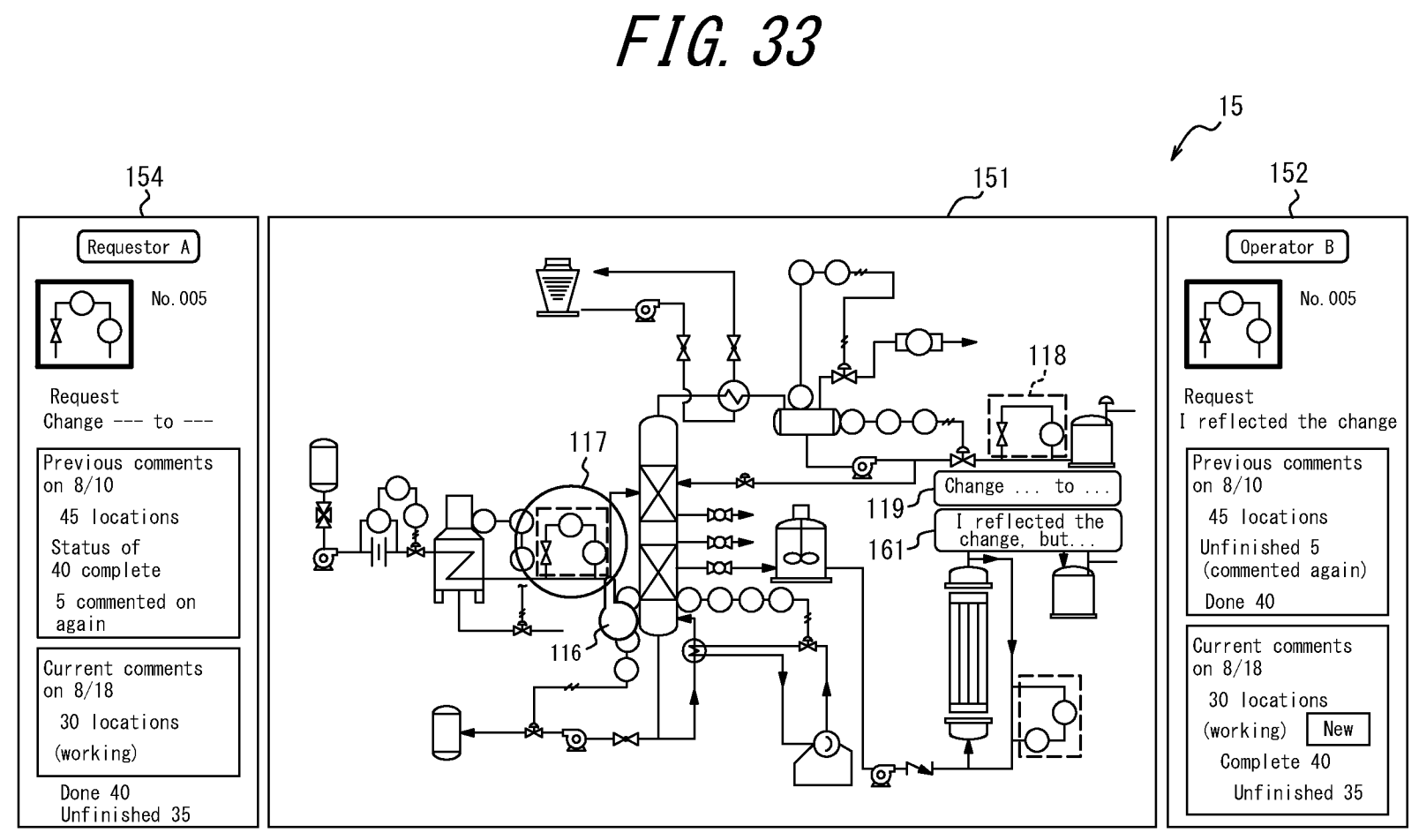

Operator B

No. 005

Request
I reflected the change

Previous comments
on 8/10

45 locations

Unfinished 5
(commented again)

Done 40

Current comments
on 8/18

30 locations
(working)    New

Complete 40

Unfinished 35

15

151

118

Change .... to ....    I reflected the
change, but....

119    161

117

116

154

Requestor A

No. 005

Request
Change --- to ---

Previous comments
on 8/10

45 locations

Status of
40 complete 5 commented on
again

Current comments
on 8/18

30 locations
(working)

Done 40
Unfinished 35

FIG. 35

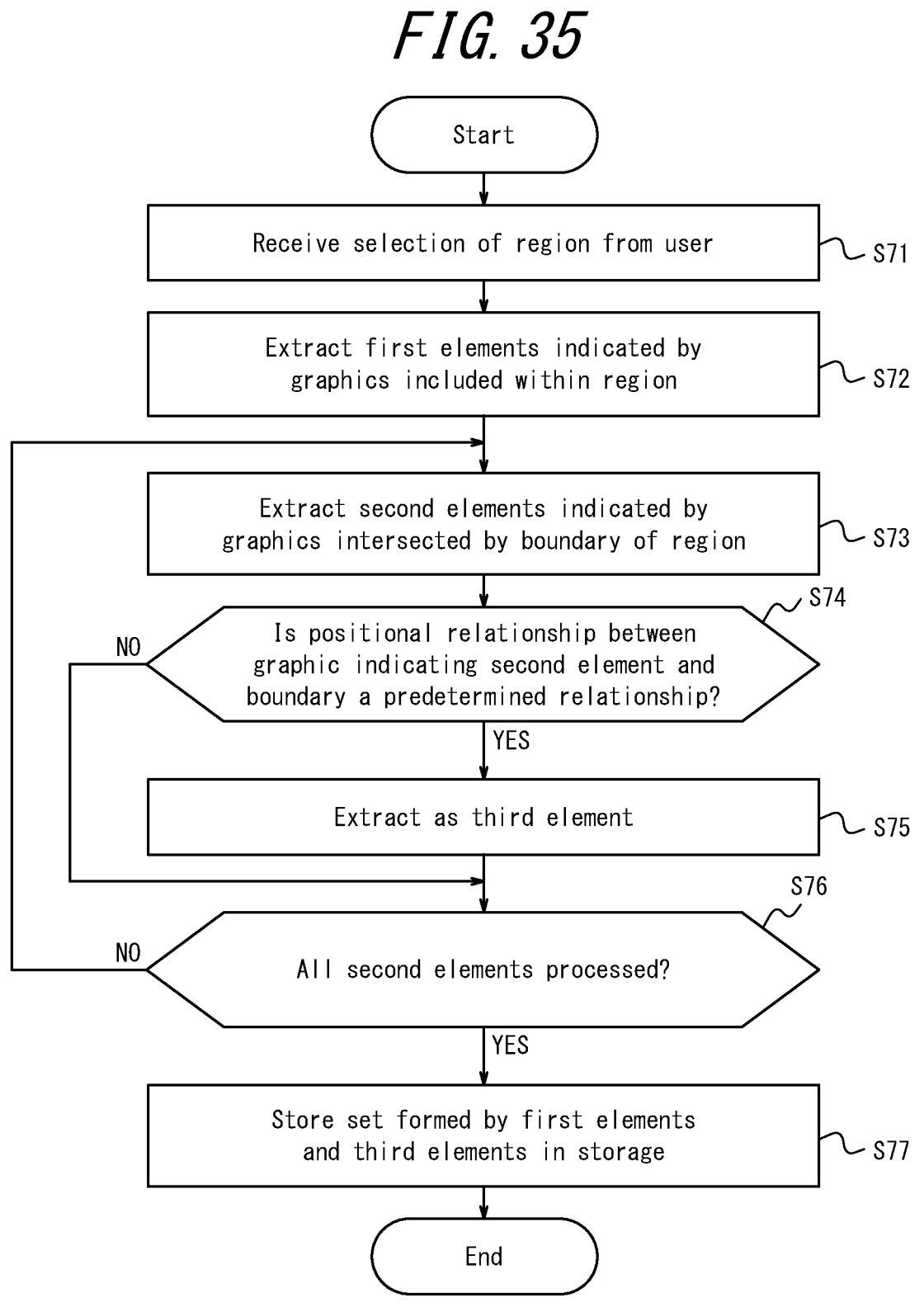

```
                        ( Start )
                            │
                            ▼
        ┌───────────────────────────────────────┐
        │    Receive selection of region from user │────◜ S71
        └───────────────────────────────────────┘
                            │
                            ▼
        ┌───────────────────────────────────────┐
        │      Extract first elements indicated by  │────◜ S72
        │        graphics included within region    │
        └───────────────────────────────────────┘
                            │
                            ▼
        ┌───────────────────────────────────────┐
        │     Extract second elements indicated by  │────◜ S73
        │   graphics intersected by boundary of region │
        └───────────────────────────────────────┘
                            │
                            ▼                         S74
        ╱──────────────────────────────────────╲
  NO   ⟨   Is positional relationship between      ⟩
 ◄─────⟨  graphic indicating second element and    ⟩
        ⟨ boundary a predetermined relationship?    ⟩
        ╲──────────────────────────────────────╱
                            │ YES
                            ▼
        ┌───────────────────────────────────────┐
        │            Extract as third element       │────◜ S75
        └───────────────────────────────────────┘
                            │
                            ▼                         S76
        ╱──────────────────────────────────────╲
  NO   ⟨                                            ⟩
 ◄─────⟨        All second elements processed?      ⟩
        ╲──────────────────────────────────────╱
                            │ YES
                            ▼
        ┌───────────────────────────────────────┐
        │     Store set formed by first elements    │────◜ S77
        │        and third elements in storage      │
        └───────────────────────────────────────┘
                            │
                            ▼
                        ( End )
```

INFORMATION PROCESSING APPARATUS IMPLEMENTING A PIPING AND INSTRUMENTATION DIAGRAM, INFORMATION PROCESSING METHOD, AND PROGRAM

CROSS-REFERENCE TO RELATED APPLICATIONS

The present application is a Divisional application of U.S. application Ser. No. 17/455,357 filed on Nov. 17, 2021, which claims priority to Japanese Patent Applications No. 2020-192045 filed on Nov. 18, 2020, No. 2020-192046 filed on Nov. 18, 2020, No. 2020-192049 filed on Nov. 18, 2020, No. 2020-192082 filed on Nov. 18, 2020, No. 2020-192084 filed on Nov. 18, 2020, No. 2020-192085 filed on Nov. 18, 2020, No. 2020-192087 filed on Nov. 18, 2020, and No. 2020-192089 filed on Nov. 18, 2020, the entire contents of which are incorporated herein by reference.

TECHNICAL FIELD

The present disclosure relates to an information processing apparatus, an information processing method, and a program.

BACKGROUND

A Piping and Instrumentation Diagram (P&ID) is known as a drawing to illustrate the configuration of a system in a plant or the like. A P&ID is a drawing in which the connections of piping and instrumentation in a plant are indicated by a combination of predetermined graphics, letters, etc. (including symbols).

Patent Literature (PTL) 1 describes technology for contact operation of a monitoring screen in a plant monitoring and control system.

CITATION LIST

Patent Literature

PTL 1: JP 2012-174127 A

SUMMARY

An information processing apparatus according to some embodiments includes a processor configured to receive from a user a selection of a search element group, which is an element group formed by one or more elements used in a drawing, search from the drawing an element group that conforms to the search element group for which the selection is received, and display the searched element group on a display in correspondence with a position on the drawing.

An information processing method according to some embodiments is to be performed by a processor of an information processing apparatus and includes receiving from a user a selection of a search element group, which is an element group formed by one or more elements used in a drawing, searching from the drawing an element group that conforms to the search element group for which the selection is received, and displaying the searched element group on a display in correspondence with a position on the drawing.

A program according to an embodiment is configured to cause a computer to function as the aforementioned information processing apparatus.

An information control apparatus according to some embodiments includes a processor configured to acquire a plurality of element groups that are identical and formed by one or more elements used in a drawing, receive from a user a selection of a common process to be performed on the plurality of element groups, and perform the common process for which the selection is received on each element group in the plurality of element groups.

An information processing method according to some embodiments is to be performed by a processor of an information processing apparatus and includes acquiring a plurality of element groups that are identical and formed by one or more elements used in a drawing, receiving from a user a selection of a common process to be performed on the plurality of element groups, and performing the common process for which the selection is received on each element group in the plurality of element groups.

A program according to an embodiment is configured to cause a computer to function as the aforementioned information processing apparatus.

An information processing apparatus according to some embodiments includes a processor configured to receive from a user a selection of a search element group, which is an element group formed by one or more elements used in a drawing, search from the drawing, as element groups that conform to the search element group for which the selection is received, not only element groups that are completely identical to the search element group but also element groups that are partially different from the search element group, and store information, in a storage, indicating a difference from the search element group with respect to the element groups that are partially different from the search element group among the searched element groups.

An information processing method according to some embodiments is to be performed by a processor of an information processing apparatus and includes receiving from a user a selection of a search element group, which is an element group formed by one or more elements used in a drawing, searching from the drawing, as element groups that conform to the search element group for which the selection is received, not only element groups that are completely identical to the search element group but also element groups that are partially different from the search element group, and storing information, in a storage, indicating a difference from the search element group with respect to the element groups that are partially different from the search element group among the searched element groups.

A program according to an embodiment is configured to cause a computer to function as the aforementioned information processing apparatus.

An information processing apparatus according to some embodiments includes a processor configured to acquire a first element group and a second element group formed by elements used in a drawing, extract a third element group, which is an element group included in common in the first element group and the second element group, from the first element group and the second element group, and arrange the first element group, the second element group, and the third element group in a hierarchy such that the third element group belongs to a higher level than the first element group and the second element group and store the hierarchy in a storage.

An information processing method according to some embodiments is to be performed by a processor of an information processing apparatus and includes acquiring a first element group and a second element group formed by elements used in a drawing, extracting a third element group, which is an element group included in common in the first element group and the second element group, from the first element group and the second element group, and arranging the first element group, the second element group, and the third element group in a hierarchy such that the third element group belongs to a higher level than the first element group and the second element group and storing the hierarchy in a storage.

A program according to an embodiment is configured to cause a computer to function as the aforementioned information processing apparatus.

An information processing apparatus according to some embodiments includes a processor configured to receive from a user a selection of a first element group, which is an element group formed by one or more elements used in a drawing, search from the drawing element groups that conform to the first element group for which the selection is received, classify the element groups conforming to the first element group into an element group conforming to a second element group and an element group conforming to a third element group based on a predetermined condition or a condition designated by the user, and arrange the second element group and the third element group in a hierarchy to belong to a lower level than the first element group and store the hierarchy in a storage.

An information processing method according to some embodiments is to be performed by a processor of an information processing apparatus and includes receiving from a user a selection of a first element group, which is an element group formed by one or more elements used in a drawing, searching from the drawing element groups that conform to the first element group for which the selection is received, classifying the element groups conforming to the first element group into an element group conforming to a second element group and an element group conforming to a third element group based on a predetermined condition or a condition designated by the user, and arranging the second element group and the third element group in a hierarchy to belong to a lower level than the first element group and storing the hierarchy in a storage.

A program according to an embodiment is configured to cause a computer to function as the aforementioned information processing apparatus.

An information processing apparatus according to some embodiments includes a processor configured to receive a selection of a position or a region in a drawing from a first user, receive assignment of a communication item for a second user from the first user to the position or the region for which the selection from the first user is received, store marking information indicating the position or the region for which the selection from the first user is received and communication information indicating the communication item in association in a storage, and display the communication item on a display in correspondence with the position or the region, on the drawing, to which the communication item is assigned.

An information processing method according to some embodiments is to be performed by a processor of an information processing apparatus and includes receiving a selection of a position or a region in a drawing from a first user, receiving assignment of a communication item for a second user from the first user to the position or the region for which the selection from the first user is received, storing marking information indicating the position or the region for which the selection from the first user is received and communication information indicating the communication item in association in a storage, and displaying the communication item on a display in correspondence with the position or the region, on the drawing, to which the communication item is assigned.

A program according to an embodiment is configured to cause a computer to function as the aforementioned information processing apparatus.

An information processing apparatus according to some embodiments includes a processor configured to receive a selection from a user of a region, in a drawing in which elements are indicated by graphics, that contains a plurality of the graphics, extract from the drawing one or more first elements, indicated by the graphics, that are completely contained within the region for which the selection is received, extract from the drawing one or more second elements, indicated by the graphics, that intersect a boundary of the region for which the selection is received, extract a third element from the one or more second elements based on a positional relationship between the graphics indicating the one or more second elements and the boundary; and store a set of elements including the one or more first elements and the third element in a storage as an element group selected by the user.

An information processing method according to some embodiments is to be performed by a processor of an information processing apparatus and includes receiving a selection from a user of a region, in a drawing in which elements are indicated by graphics, that contains a plurality of the graphics, extracting from the drawing one or more first elements, indicated by the graphics, that are completely contained within the region for which the selection is received, extracting from the drawing one or more second elements indicated by graphics that intersect a boundary of the region for which the selection is received, extracting a third element from the one or more second elements based on a positional relationship between the graphics indicating the one or more second elements and the boundary, and storing a set of elements including the one or more first elements and the third element in a storage as an element group selected by the user.

A program according to an embodiment is configured to cause a computer to function as the aforementioned information processing apparatus.

An information processing apparatus according to an embodiment includes a processor configured to receive a selection from a user of a region, in a drawing in which elements are indicated by graphics, that contains one or more graphics indicating one or more first elements, receive a selection from the user of a second element after receipt of the selection of the region, and store, based on a time from receipt of the selection of the region until receipt of the selection of the second element and/or a positional relationship between the region and a graphic indicating the second element, a set of elements including the one or more first elements contained in the region for which the selection was received or a set of elements including the one or more first elements and the second element in a storage as an element group selected by the user.

An information processing method according to some embodiments is to be performed by a processor of an information processing apparatus and includes receiving a selection from a user of a region, in a drawing in which elements are indicated by graphics, that contains one or more graphics indicating one or more first elements; receiving a selection from the user of a second element after receipt of the selection of the region; and storing, based on a time from receipt of the selection of the region until receipt of the selection of the second element and/or a positional relationship between the region and a graphic indicating the second element, a set of elements including the one or more first elements contained in the region for which the selection was received or a set of elements including the one or more first elements and the second element in a storage as an element group selected by the user.

A program according to an embodiment is configured to cause a computer to function as the aforementioned information processing apparatus.

BRIEF DESCRIPTION OF THE DRAWINGS

In the accompanying drawings:

FIG. 1 is a diagram illustrating the configuration of an information processing system that includes an information processing apparatus according to an embodiment of the present disclosure;

FIG. 5 is a flowchart illustrating example operations of the information processing apparatus according to an embodiment of the present disclosure;

FIG. 9A is a flowchart illustrating example operations of the information processing apparatus according to an embodiment of the present disclosure;

FIG. 9B is a flowchart illustrating example operations of the information processing apparatus according to an embodiment of the present disclosure;

FIG. 18 is a diagram illustrating an example of scoring based on differences in element groups;

FIG. 31A is a diagram schematically illustrating a user interface for correcting the settings of an element;

FIG. 31B is a diagram schematically illustrating a user interface for correcting the settings of an element;

FIG. 33 is a diagram illustrating an example of a screen on a display connected to the information processing apparatus;

FIG. 35 is a flowchart illustrating example operations of the information processing apparatus according to an embodiment of the present disclosure;

DETAILED DESCRIPTION

Figure 2:
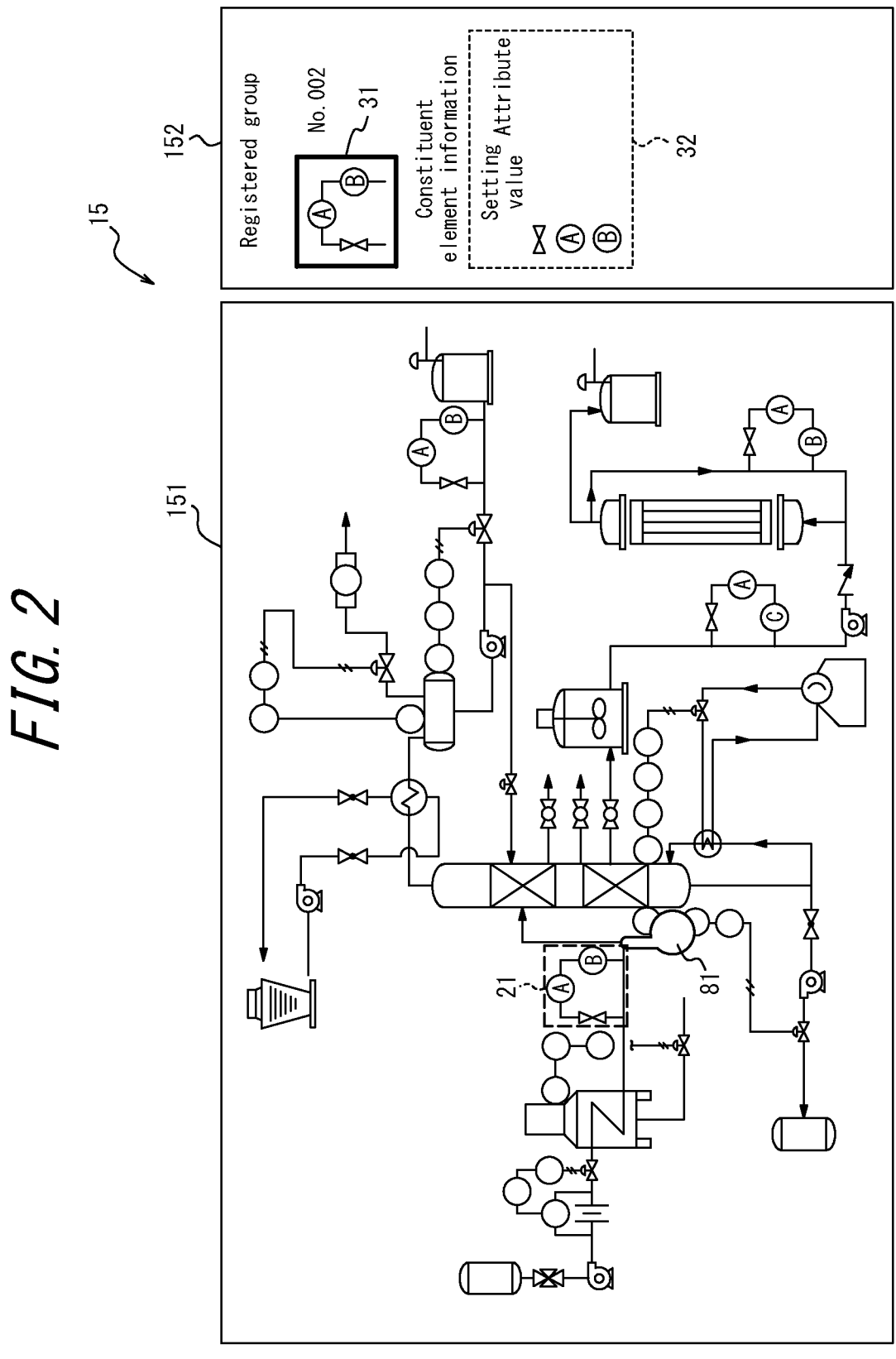
FIG. 2 is a diagram illustrating an example of a screen on a display connected to the information processing apparatus.

In a known configuration, when performing actions such as editing or correcting each element group that conforms to a specific element group including at least one element in a drawing such as a P&ID, the user needs to visually select and extract the element groups to be edited or corrected from the drawing.

However, visual extraction of the element groups by the user requires many person-hours and easily leads to human error such as failing to extract an element group that should be extracted, or mistakenly extracting an element group that should not be extracted. In particular, when extracting element groups visually from drawings of a large-scale system such as a plant, an enormous amount of person-hours or labor is required, and the possibility of errors increases.

Therefore, a first object of the present disclosure is to provide an information processing apparatus, an information processing method, and a program that enable easy extraction of all element groups conforming to a specific element group from a drawing with a small number of person-hours.

It also may be the case that in drawings such as P&IDs, there is a plurality of identical element groups including at least one element, and the same processing such as display, correction, or replacement is to be performed on each of these element groups. With a known configuration, however, such groups of elements must be individually selected by hand and processed separately, which requires many person-hours and is prone to human error. Examples of human error include not processing or incompletely processing an element group that is to be processed, and mistakenly processing elements that are not to be processed.

Therefore, a second object of the present disclosure is to provide an information processing apparatus, an information processing method, and a program that enable the same process to be performed in a batch with a simple operation on a plurality of identical element groups that include at least one element.

There may also be defective or deficient elements in the drawings such as P&IDs, and the defects or deficiencies of such elements need to be corrected. In a known configuration, the defective or deficient elements need to be selected and extracted by the user visually.

However, manually extracting such defective or deficient elements requires many person-hours and can easily lead to human errors such as failing to extract elements to be extracted or mistakenly extracting elements that should not be extracted. In particular, when extracting defective or deficient elements visually from drawings of a large-scale system such as a plant, an enormous amount of person-hours or labor is required, and the possibility of errors increases.

Therefore, a third object of the present disclosure is to provide an information processing apparatus, an information processing method, and a program that enable defective or deficient elements to be easily extracted from a drawing with a small number of person-hours.

In a known configuration, when performing actions such as editing or correcting each element group that conforms to an element group including at least one element in a drawing such as a P&ID, the user needs to select and extract the element group to be edited or corrected from the drawing. When such processing is performed on multiple types of element groups, the user has to extract each element group that conforms to the element group from the drawing for each of the multiple types of element groups, and then perform operations for editing or correction.

However, when there is an array of elements common to multiple types of element groups, the same editing or correction operations may in some cases be performed on such an array of common elements. Therefore, extracting a conforming element group for each of multiple types of element groups separately, and editing or correcting each extracted element group separately, is inefficient.

Therefore, a fourth object of the present disclosure is to provide an information processing apparatus, an information processing method, and a program that enable operations such as editing or correcting element groups that conform to a plurality of types of element groups to be performed more efficiently.

In a known configuration, when editing or correcting each element group while focusing on specific element groups including at least one element in a drawing such as a P&ID, the user needs to select and extract the element groups to work on from the drawing visually.

However, visual extraction of the element group by the user requires many person-hours and easily leads to human error such as failing to extract an element group that should be extracted, or mistakenly extracting an element group that should not be extracted. In particular, when the work content changes not only when the type of elements included in an element group matches, but also according to conditions such as the attribute information on an element, or the element adjacent to the element group, extracting the element groups to be processed and selecting operations requires an enormous amount of person-hours and increases the possibility of errors.

Therefore, a fifth object of the present disclosure is to provide an information processing apparatus, an information processing method, and a program that enable a user, while focusing on specific element groups, to efficiently work on element groups that also conform to a condition desired by the user.

When a drawing such as a P&ID is created by multiple people, the creators may communicate with each other by designating a position or an area in the drawing. However, communication about drawings has mainly taken place by writing marks or characters by hand on printed drawings. This requires people to visually search for marks or characters, making the work complicated. In some cases, the handwritten marks or characters are written sloppily and are difficult to distinguish visually. Furthermore, the use of printed drawings necessitates storage of paper media. In particular, in the case of sharing the creation of drawings for a large-scale system such as a plant, it is very difficult to communicate by writing letters and the like by hand on such paper media, due to the enormous number of drawings.

Therefore, a sixth object of the present disclosure is to provide an information processing apparatus, an information processing method, and a program that enable multiple people to create a drawing efficiently.

In a known configuration, when a user selects an element group including at least one element from a drawing such as a P&ID, the user needs to work precisely and carefully to ensure that the elements to be selected are selected without omission, and that elements that should not be selected are not selected by mistake.

Therefore, a seventh object of the present disclosure is to provide an information processing apparatus, an information processing method, and a program that enable a user to quickly select a desired element group with a simple operation.

Furthermore, an eighth object of the present disclosure is to provide an information processing apparatus, an information processing method, and a program that enable addition, with a simple operation, of an element to be added to a group of elements that has been selected.

An information processing apparatus according to some embodiments includes a processor configured to receive from a user a selection of a search element group, which is an element group formed by one or more elements used in a drawing, search from the drawing an element group that conforms to the search element group for which the selection is received, and display the searched element group on a display in correspondence with a position on the drawing. In this way, the information processing apparatus automatically searches an element group that conforms to an element group selected by the user and displays the result on the display. Accordingly, the user does not need to extract element groups visually and can easily extract all the element groups conforming to a specific element group from the drawing with a small number of person-hours.

In an information processing apparatus according to an embodiment, the processor receives the selection of the search element group by the user on the drawing displayed on the display, and searches from the drawing an element group that conforms to the search element group selected by the user on the drawing. In this way, the information processing apparatus receives the selection of the search element group in the drawing displayed on the display, so that the user can easily select the search element group.

In an information processing apparatus according to an embodiment, the processor displays the drawing on the display so that the searched element group is displayed in a different manner from other elements. In this way, since the searched element group is displayed on the display in a different manner from other elements, the user can easily recognize the searched element group in the drawing displayed on the display.

In the information processing apparatus according to an embodiment, the processor displays an image, on the display, indicating a distribution in the drawing of each searched element group. Accordingly, the user can easily grasp where the searched element groups are located in the drawing by referring to the image illustrating the distribution of the searched element groups.

In an information processing apparatus according to an embodiment, a type and arrangement of the elements are specified in the drawing, and as the element group that conforms to the search element group, the processor searches, from the drawing, an element group such that the type of each element included in the element group and the arrangement of elements match the search element group. Accordingly, an element group having the same type and arrangement as the elements included in the search element group can be searched automatically.

In an information processing apparatus according to an embodiment, each element used in the drawing has attached thereto at least one piece of attribute information indicating a property of the element and/or a condition during operation, and as the element group that conforms to the search element group, the processor searches, from the drawing, an element group such that the type of each element included in the element group, the attribute information attached to each element, and the arrangement of elements match the search element group. Accordingly, an element group having not only the same type and arrangement but also the same attribute information as the elements included in the search element group can be searched automatically.

In an information processing apparatus according to an embodiment, the processor searches, from the drawing, an element that conforms to a priority element to be prioritized among the elements included in the search element group, and searches an element that conforms to an element adjacent to the priority element included in the search element group from among elements adjacent to the element that conforms to the priority element and was searched from the drawing. In this way, the information processing apparatus narrows down the search target by searching in order starting from the priority element that is to be prioritized among the elements included in the search element group. When no priority element is found, the processing is suspended, thus enabling efficient searching.

In an information processing apparatus according to an embodiment, the processor determines which element, among at least two elements in a connection relationship with each other in the drawing, is farther upstream based on the connection relationship, and searches, from the drawing, an element group that conforms to the search element group and has the element that is farther upstream as the priority element. In this way, the information processing apparatus narrows down the search target by searching in order starting from the element that is farther upstream among the elements included in the search element group, thus enabling efficient searching.

An information processing method according to some embodiments is to be performed by a processor of an information processing apparatus and includes receiving from a user a selection of a search element group, which is an element group formed by one or more elements used in a drawing, searching from the drawing an element group that conforms to the search element group for which the selection is received, and displaying the searched element group on a display in correspondence with a position on the drawing. In this way, the information processing method automatically searches an element group that conforms to an element group selected by the user and displays the result on the display. Accordingly, the user does not need to extract element groups visually and can easily extract all the element groups conforming to a specific element group from the drawing with a small number of person-hours.

A program according to an embodiment is configured to cause a computer to function as the aforementioned information processing apparatus. The information processing apparatus automatically searches an element group that conforms to an element group selected by the user and displays the result on the display. Accordingly, the user does not need to extract element groups visually and can easily extract all the element groups conforming to a specific element group from the drawing with a small number of person-hours.

An information control apparatus according to some embodiments includes a processor configured to acquire a plurality of element groups that are identical and formed by one or more elements used in a drawing, receive from a user a selection of a common process to be performed on the plurality of element groups, and perform the common process for which the selection is received on each element group in the plurality of element groups. In this way, since the user-selected process is performed on each element group in the plurality of identical element groups in the drawing, the same process can be performed on each element group in a batch with a simple operation.

In an information processing apparatus according to an embodiment, the processor stores, in a storage, specifying information that specifies the plurality of element groups that is acquired, and in response to receipt of a selection of a process from the user for any element group included in the plurality of element groups specified by the specifying information, performs the process as the common process on each element group included in the plurality of element groups In this way, in response to the receipt of the selection of a process for any of the element groups included in the plurality of element groups, the process is performed on each of the element groups included in the plurality of element groups. The common process can thereby be performed on all of the element groups included in the plurality of element groups, without omission.

In an information processing apparatus according to an embodiment, the processor performs, as the common process, a process to replace some or all of the elements included in the plurality of element groups with at least one element selected by the user. Accordingly, an element included in each element group in the plurality of element groups can be replaced at once.

In an information processing apparatus according to an embodiment, the processor performs, as the common process, a process to change a type and/or arrangement of the elements included in the plurality of element groups according to a selection by the user. Accordingly, the type and/or arrangement of an element included in each element group in the plurality of element groups can be changed at once.

In an information processing apparatus according to an embodiment, each element used in the drawing has attached thereto at least one piece of attribute information indicating a property of the element, and the processor performs, as the common process, a process to change any of the attribute information for at least one of the elements included in the plurality of element groups according to a selection by the user. Accordingly, an attribute of an element included in each element group in the plurality of element groups can be changed at once.

In an information processing apparatus according to an embodiment, the processor performs a process to display the plurality of element groups subject to the common process on a display in a different manner from elements not included in the plurality of element groups. Accordingly, the user can easily confirm the element groups that are subjected in a batch to the common process.

In an information processing apparatus according to an embodiment, the processor receives a selection from the user of a search element group, which is an element group formed by one or more elements used in the drawing, and searches from the drawing element groups that conform to the search element group for which the selection is received to acquire the plurality of element groups. Accordingly, the plurality of element groups that are subjected in a batch to the common process can be acquired automatically.

An information processing method according to some embodiments is to be performed by a processor of an information processing apparatus and includes acquiring a plurality of element groups that are identical and formed by one or more elements used in a drawing, receiving from a user a selection of a common process to be performed on the plurality of element groups, and performing the common process for which the selection is received on each element group in the plurality of element groups. In this way, since the user-selected process is performed on each element group in the plurality of identical element groups in the drawing, the same process can be performed on each element group in a batch with a simple operation.

A program according to an embodiment is configured to cause a computer to function as the aforementioned information processing apparatus. In this way, since the user-selected process is performed on each element group in the plurality of identical element groups in the drawing, the same process can be performed on each element group in a batch with a simple operation.

An information processing apparatus according to some embodiments includes a processor configured to receive from a user a selection of a search element group, which is an element group formed by one or more elements used in a drawing, search from the drawing, as element groups that conform to the search element group for which the selection is received, not only element groups that are completely identical to the search element group but also element groups that are partially different from the search element group, and store information, in a storage, indicating a difference from the search element group with respect to the element groups that are partially different from the search element group among the searched element groups. In this way, as element groups that conform to the search element group selected by the user, not only element groups that are completely identical to the search element group but also element groups that are partially different from the search element group are automatically searched from the drawing, and the information indicating the differences from the search element group is stored in the storage. Therefore, the user can easily extract the defective or deficient elements by referring to the information, stored in the storage, indicating the differences.

In an information processing apparatus according to an embodiment, the processor displays the searched element groups on the display in a manner enabling identification of the difference with respect to the element groups that are partially different from the search element group. Accordingly, the user can easily grasp the defective or deficient elements in the drawing at a glance by viewing the element groups that are partially different from the search element group and are displayed in a manner enabling identification of the differences.

In an information processing apparatus according to an embodiment, the processor displays, on the display, a character string and/or an image indicating a type of the difference with respect to the element groups that are partially different from the search element group among the searched element groups. Accordingly, the user can easily recognize whether a searched element group differs from the search element group in any respect by referring to the character string and/or the image indicating the type of the difference.

In an information processing apparatus according to an embodiment, the processor receives from the user a setting of a retrieval condition for searching the element groups as the element groups that conform to the search element group despite being partially different from the search element group. Accordingly, the user can set the desired retrieval conditions according to the application or purpose.

In an information processing apparatus according to an embodiment, the processor calculates, for each element group in the searched element groups, a matching degree that is a numerical value indicating a degree of conformity to the search element group, and classifies the searched element groups into sets of at least one element group based on the matching degree. In this way, by the searched element groups being classified based on the numerical value indicating the degree of conformity to the search element group, the user can appropriately and easily handle each searched element group according to the degree of conformity to the search element group.

In an information processing apparatus according to an embodiment, the processor receives from the user a selection of the element group, from among the element groups that are partially different from the search element group in the searched element groups, to be subjected to a process to be matched to the search element group and performs, in response to receiving the selection of the element group from the user, a process to correct the element group for which the selection is received so that the element group matches the search element group. Accordingly, with a simple operation, the user can perform the process to correct an element group that partially differs from the search element group among the searched element groups so as to match the search element group.

In an information processing apparatus according to an embodiment, the processor receives a selection of a plurality of the element groups from the user as the element groups to be subjected to the process. Accordingly, the user can perform the process to correct, in a batch, a plurality of element groups that partially differ from the search element group among the searched element groups so as to match the search element group.

An information processing method according to some embodiments is to be performed by a processor of an information processing apparatus and includes receiving from a user a selection of a search element group, which is an element group formed by one or more elements used in a drawing, searching from the drawing, as element groups that conform to the search element group for which the selection is received, not only element groups that are completely identical to the search element group but also element groups that are partially different from the search element group, and storing information, in a storage, indicating a difference from the search element group with respect to the element groups that are partially different from the search element group among the searched element groups. In this way, as element groups that conform to the search element group selected by the user, not only element groups that are completely identical to the search element group but also element groups that are partially different from the search element group are automatically searched from the drawing, and the information indicating the differences from the search element group is stored in the storage. Therefore, the user can easily extract the defective or deficient elements by referring to the information, stored in the storage, indicating the differences.

A program according to an embodiment is configured to cause a computer to function as the aforementioned information processing apparatus. In this way, as element groups that conform to the search element group selected by the user, not only element groups that are completely identical to the search element group but also element groups that are partially different from the search element group are automatically searched from the drawing, and the information indicating the differences from the search element group is stored in the storage. Therefore, the user can easily extract the defective or deficient elements by referring to the information, stored in the storage, indicating the differences.

An information processing apparatus according to some embodiments includes a processor configured to acquire a first element group and a second element group formed by elements used in a drawing, extract a third element group, which is an element group included in common in the first element group and the second element group, from the first element group and the second element group, and arrange the first element group, the second element group, and the third element group in a hierarchy such that the third element group belongs to a higher level than the first element group and the second element group and store the hierarchy in a storage. In this way, a third element group, which is an element group included in common in the first and second element groups, is automatically extracted and is arranged and stored in a hierarchy such that the third element group belongs to a higher level than the first element group and the second element group. Accordingly, by performing operations based on the third element group belonging to a higher level of the hierarchy, the user can perform operations more efficiently than when performing operations on each of the first and second element groups separately.

In an information processing apparatus according to an embodiment, the processor extracts one element, or a plurality of elements connected to each other in an identical arrangement, that is included in common in the first element group and the second element group, and for which a corresponding element type and attribute information are identical and a number of elements is largest, as the third element group. In this way, the plurality of elements with the largest number of elements connected to each other that are included in common in the first and second element groups are extracted as third elements, enabling appropriate arrangement of the element groups in a hierarchy and contributing to improving the efficiency of work.

In an information processing apparatus according to an embodiment, the processor extracts an element group formed by at least one element included in common in the first element group and the second element group, for which a corresponding element type and attribute information are identical, and in which a particular element is adjacent to an identical outside element that is outside the element group, as the third element group, and includes the identical outside element in the third element group. In this way, an identical element that is included in common in the first and second element groups and is adjacent to an identical outside element that is outside the element group is extracted as the third element, enabling appropriate arrangement of the element groups in a hierarchy based even on the elements outside the element group.

In an information processing apparatus according to an embodiment, the processor receives from a user a setting to set a condition for extraction as the element group included in common in the first element group and the second element group, and extracts the third element group from the first element group and the second element group based on the set condition. In this way, the user can freely set the conditions for extraction as the element group included in common in the first and second element groups, which enables appropriate arrangement of the element groups in a hierarchy according to the application or purpose.

In an information processing apparatus according to an embodiment, the processor displays a hierarchical relationship among the first element group, the second element group, and the third element group on a display. Accordingly, the user can easily grasp the hierarchical relationship between the element groups.

In an information processing apparatus according to an embodiment, the processor receives from a user a selection of a process to be performed on the third element group, and performs the process for which the selection is received on each third element group used in the drawing. Accordingly, the user can perform a process in a batch on the third element group belonging to a higher level of the hierarchy and can thus perform operations more efficiently than when performing operations on each of the first and second element groups separately.

An information processing method according to some embodiments is to be performed by a processor of an information processing apparatus and includes acquiring a first element group and a second element group formed by elements used in a drawing, extracting a third element group, which is an element group included in common in the first element group and the second element group, from the first element group and the second element group, and arranging the first element group, the second element group, and the third element group in a hierarchy such that the third element group belongs to a higher level than the first element group and the second element group and storing the hierarchy in a storage. In this way, a third element group, which is an element group included in common in the first and second element groups, is automatically extracted and is arranged and stored in a hierarchy such that the third element group belongs to a higher level than the first element group and the second element group. Accordingly, by performing operations based on the third element group belonging to a higher level of the hierarchy, the user can perform operations more efficiently than when performing operations on each of the first and second element groups separately.

A program according to an embodiment is configured to cause a computer to function as the aforementioned information processing apparatus. In this way, a third element group, which is an element group included in common in the first and second element groups, is automatically extracted and is arranged and stored in a hierarchy such that the third element group belongs to a higher level than the first element group and the second element group. Accordingly, by performing operations based on the third element group belonging to a higher level of the hierarchy, the user can perform operations more efficiently than when performing operations on each of the first and second element groups separately.

An information processing apparatus according to some embodiments includes a processor configured to receive from a user a selection of a first element group, which is an element group formed by one or more elements used in a drawing, search from the drawing element groups that conform to the first element group for which the selection is received, classify the element groups conforming to the first element group into an element group conforming to a second element group and an element group conforming to a third element group based on a predetermined condition or a condition designated by the user, and arrange the second element group and the third element group in a hierarchy to belong to a lower level than the first element group and store the hierarchy in a storage. In this way, the first element group is focused on to extract element groups that conform to the first element group from the drawing, and the extracted element groups are then subdivided into the second and third element groups based on a predetermined condition or a condition designated by the user. Therefore, while focusing on specific element groups, the user can efficiently perform operations on element groups that also conform to a condition desired by the user.

In an information processing apparatus according to an embodiment, among the element groups conforming to the first element group, the processor classifies an element group for which attribute information for at least one element included in the element group satisfies a certain condition into an element group conforming to the second element group, and classifies an element group that does not satisfy the certain condition into an element group conforming to the third element group. In this way, by the element groups conforming to the first element group being further subdivided based on the attribute information on the elements included in the element groups, the user can, while focusing on specific element groups, efficiently perform operations on element groups that also conform to a condition desired by the user.

In an information processing apparatus according to an embodiment, among the element groups conforming to the first element group, the processor classifies an element group for which an element adjacent to the element group satisfies a certain condition into an element group conforming to the second element group, and classifies an element group for which an element adjacent to the element group does not satisfy the certain condition into an element group conforming to the third element group. In this way, by the element groups conforming to the first element group being further subdivided based on an element adjacent to the element group, the user can, while focusing on specific element groups, efficiently perform operations on element groups that also conform to a condition desired by the user.

In an information processing apparatus according to an embodiment, the processor displays an image or text information indicating a hierarchical relationship among the first element group, the second element group, and the third element group on a display. Accordingly, the user can easily grasp the hierarchical relationship between the element groups.

In an information processing apparatus according to an embodiment, the processor displays the drawing in a manner enabling identification of portions corresponding to the first element group, the second element group, and the third element group on a display. Accordingly, the user can easily grasp which portions in the drawing correspond to the first, second, and third element groups.

In an information processing apparatus according to an embodiment, the processor receives from the user a selection of an element group from among the first element group, the second element group, and the third element group, receives from the user a selection of a common process to be performed on element groups that conform to the element group for which the selection is received, and performs the common process for which the selection is received on each element group that conforms to the element group. In this way, since the common process is performed on each element group conforming to the element group selected by the user in the drawing, the same process can be performed on each element group in a batch with a simple operation.

An information processing method according to some embodiments is to be performed by a processor of an information processing apparatus and includes receiving from a user a selection of a first element group, which is an element group formed by one or more elements used in a drawing, searching from the drawing element groups that conform to the first element group for which the selection is received, classifying the element groups conforming to the first element group into an element group conforming to a second element group and an element group conforming to a third element group based on a predetermined condition or a condition designated by the user, and arranging the second element group and the third element group in a hierarchy to belong to a lower level than the first element group and storing the hierarchy in a storage. In this way, the first element group is focused on to extract element groups that conform to the first element group from the drawing, and the extracted element groups are then subdivided into the second and third element groups based on a predetermined condition or a condition designated by the user. Therefore, while focusing on specific element groups, the user can efficiently perform operations on element groups that also conform to a condition desired by the user.

A program according to an embodiment is configured to cause a computer to function as the aforementioned information processing apparatus. In this way, the first element group is focused on to extract element groups that conform to the first element group from the drawing, and the extracted element groups are then subdivided into the second and third element groups based on a predetermined condition or a condition designated by the user. Therefore, while focusing on specific element groups, the user can efficiently perform operations on element groups that also conform to a condition desired by the user.

An information processing apparatus according to some embodiments includes a processor configured to receive a selection of a position or a region in a drawing from a first user, receive assignment of a communication item for a second user from the first user to the position or the region for which the selection from the first user is received, store marking information indicating the position or the region for which the selection from the first user is received and communication information indicating the communication item in association in a storage, and display the communication item on a display in correspondence with the position or the region, on the drawing, to which the communication item is assigned. In this way, the communication item for the second user from the first user is displayed at a corresponding position or region on the drawing, thereby enabling the second user to easily grasp the position or region to be confirmed in the drawing and the communication item corresponding to the position or region. Accordingly, multiple people can efficiently create a drawing.

In an information processing apparatus according to an embodiment, the processor displays the drawing on the display by indicating the position or the region, on the drawing, indicated by the marking information in a different manner from other positions or regions. In this way, the position or region of the drawing to which the communication item was assigned is displayed in a different manner from other positions or regions, thereby enabling the second user to easily grasp the position or region of the drawing to which the communication item was assigned. Accordingly, multiple people can efficiently create a drawing.

In an information processing apparatus according to an embodiment, the processor switches and displays the position or the region to which the communication item is assigned on the display in response to a specific operation input by the first user or the second user. In this way, the position or region to which the communication item was assigned is switched and displayed in response to the operation input by the user, thereby enabling confirmation of the location to which the communication item was assigned without omission.

In an information processing apparatus according to an embodiment, the processor receives, from the first user, a selection of a degree of importance indicating a priority of responding for each position or region for which the selection from the first user is received, stores, for each position or region for which the selection from the first user is received, degree of importance information indicating a degree of importance of the position or the region in the storage in association with the marking information, and switches and displays the position or the region to which the communication item is assigned in descending order of the degree of importance of the position or the region on the display in response to the specific operation input by the first user or the second user. In this way, the position or region is switched in descending order of the degree of importance in response to the operation input by the user, thereby enabling confirmation of the locations to which the communication items were assigned in descending order of need for consideration.

In an information processing apparatus according to an embodiment, the processor receives the assignment of the communication item by character input or an operation to select from among options. Accordingly, the user can assign a communication item to a position or region in the drawing by character input or an operation to select from among options.

In an information processing apparatus according to an embodiment, the processor receives assignment of a second communication item from the second user for the position or the region for which the selection from the first user is received, stores second communication information that is communication information indicating the second communication item in the storage in association with the marking information indicating the position or the region to which assignment of the second communication item is received, or in association with other communication information already stored in association with the marking information, and displays the second communication item on the display in correspondence with the position or the region to which the second communication item is assigned. In this way, not only the communication item from the first user, but also the communication item from the second user are displayed in correspondence with the position or region in the drawing, thereby making it easy to grasp the discussion at the location of interest in the drawing.

In an information processing apparatus according to an embodiment, the processor stores, for each piece of the marking information, response information indicating whether the second user or the first user has responded to or confirmed the position or the region to which the first communication item, which is a communication item from the first user to the second user, or the second communication item is assigned, the processor storing the response information in the storage in association with the marking information corresponding to the response information, and displays on the display, for each position or region to which the communication item is assigned, a mark indicating whether the second user or the first user has responded to or confirmed the communication item based on the response information. In this way, the mark indicates whether another user has responded to or confirmed the position or region to which the communication item was assigned by a certain user, making it easy to distinguish between locations that have been responded to and locations that have not been responded to.

An information processing method according to some embodiments is to be performed by a processor of an information processing apparatus and includes receiving a selection of a position or a region in a drawing from a first user, receiving assignment of a communication item for a second user from the first user to the position or the region for which the selection from the first user is received, storing marking information indicating the position or the region for which the selection from the first user is received and communication information indicating the communication item in association in a storage, and displaying the communication item on a display in correspondence with the position or the region, on the drawing, to which the communication item is assigned. In this way, the communication item for the second user from the first user is displayed at a corresponding position or region on the drawing, thereby enabling the second user to easily grasp the position or region to be confirmed in the drawing and the communication item corresponding to the position or region. Accordingly, multiple people can efficiently create a drawing.

A program according to an embodiment is configured to cause a computer to function as the aforementioned information processing apparatus. In this way, the communication item for the second user from the first user is displayed at a corresponding position or region on the drawing, thereby enabling the second user to easily grasp the position or region to be confirmed in the drawing and the communication item corresponding to the position or region. Accordingly, multiple people can efficiently create a drawing.

An information processing apparatus according to some embodiments includes a processor configured to receive a selection from a user of a region, in a drawing in which elements are indicated by graphics, that contains a plurality of the graphics, extract from the drawing one or more first elements, indicated by the graphics, that are completely contained within the region for which the selection is received, extract from the drawing one or more second elements, indicated by the graphics, that intersect a boundary of the region for which the selection is received, extract a third element from the one or more second elements based on a positional relationship between the graphics indicating the one or more second elements and the boundary; and store a set of elements including the one or more first elements and the third element in a storage as an element group selected by the user. In this way, the elements indicated by the graphics included within the region selected by the user are not simply selected as an element group, but the elements to be included in the element group are extracted from the elements indicated by the graphics intersecting with the boundary of the region based on the positional relationship between the boundary of the region and the graphics. Therefore, the user can quickly select the desired element group by a simple operation, without needing to perform a precise and careful operation.

In an information processing apparatus according to an embodiment, as the third element, the processor extracts, from among the one or more second elements, a second element for which a ratio of an area of a portion, included within the region, of the graphic indicating the second element to an area of the graphic as a whole is a predetermined value or more. In this way, the elements whose graphics partially protrude from the boundary of the region are also included in the element group, enabling the user to select the desired element group quickly by a simple operation, without needing to perform a precise and careful operation.

In an information processing apparatus according to an embodiment, a connection relationship between the elements in the drawing is indicated by connecting lines, and as the third element, the processor extracts an element among the one or more second elements that is connected by the same connecting line as any first element among the one or more first elements. In this way, among the elements of the graphics through which the boundary of the region passes, the elements in a connection relationship with a first element whose graphic is included within the region are included in the element group, enabling the user to select the desired element group quickly by a simple operation, without needing to perform a precise and careful operation.

In an information processing apparatus according to an embodiment, the processor extracts the third element based on a positional relationship between the boundary of the region and a center of each graphic indicating the one or more second elements. In this way, among the elements of the graphics through which the boundary of the region passes, the elements to be included in the element group are extracted based on the positional relationship between the center of each graphic and the boundary of the region, enabling the user to select the desired element group quickly by a simple operation, without needing to perform a precise and careful operation.

In an information processing apparatus according to an embodiment, the processor extracts the third element based on a positional relationship between a point of intersection of the boundary of the region with a periphery of each graphic indicating the one or more second elements and a center of the graphic. In this way, among the elements of the graphics through which the boundary of the region passes, the elements to be included in the element group are extracted based on the positional relationship between the point on intersection between the periphery of the graphic with the boundary of the region and the center of the graphic. Therefore, the user can quickly select the desired element group by a simple operation, without needing to perform a precise and careful operation.

In an information processing apparatus according to an embodiment, the processor receives the selection of the region from the user by taking a trajectory drawn on the drawing by an operation with a pointing device or an operation on a touch panel as the boundary of the region. Accordingly, the user can easily select a desired element group by an operation with a pointing device or an operation on a touch panel.

In an information processing apparatus according to an embodiment, the processor receives a first operation for a first position of the drawing by a pointing device or a touch panel, receives a second operation for a second position of the drawing by the pointing device or the touch panel, and receives, from the user, a selection of a rectangular region having the first position and the second position as ends of a diagonal. Accordingly, the user can easily select a desired element group by an operation with a pointing device or an operation on a touch panel.

An information processing method according to some embodiments is to be performed by a processor of an information processing apparatus and includes receiving a selection from a user of a region, in a drawing in which elements are indicated by graphics, that contains a plurality of the graphics, extracting from the drawing one or more first elements, indicated by the graphics, that are completely contained within the region for which the selection is received, extracting from the drawing one or more second elements indicated by graphics that intersect a boundary of the region for which the selection is received, extracting a third element from the one or more second elements based on a positional relationship between the graphics indicating the one or more second elements and the boundary, and storing a set of elements including the one or more first elements and the third element in a storage as an element group selected by the user. In this way, the elements indicated by the graphics included within the region selected by the user are not simply selected as an element group, but the elements to be included in the element group are extracted from the elements indicated by the graphics intersecting with the boundary of the region based on the positional relationship between the boundary of the region and the graphics. Therefore, the user can quickly select the desired element group by a simple operation, without needing to perform a precise and careful operation.

A program according to an embodiment is configured to cause a computer to function as the aforementioned information processing apparatus. In this way, the elements indicated by the graphics included within the region selected by the user are not simply selected as an element group, but the elements to be included in the element group are extracted from the elements indicated by the graphics intersecting with the boundary of the region based on the positional relationship between the boundary of the region and the graphics. Therefore, the user can quickly select the desired element group by a simple operation, without needing to perform a precise and careful operation.

An information processing apparatus according to an embodiment includes a processor configured to receive a selection from a user of a region, in a drawing in which elements are indicated by graphics, that contains one or more graphics indicating one or more first elements, receive a selection from the user of a second element after receipt of the selection of the region, and store, based on a time from receipt of the selection of the region until receipt of the selection of the second element and/or a positional relationship between the region and a graphic indicating the second element, a set of elements including the one or more first elements contained in the region for which the selection was received or a set of elements including the one or more first elements and the second element in a storage as an element group selected by the user. In this way, based on the time from selection of the region until selection of the graphic and/or the positional relationship between the selected region and the graphic, it is determined whether only the elements indicated by the graphics contained within the region are to be used as the element group, or whether the element indicated by the graphic selected after selection of the region is to be included in the element group. Accordingly, it can be automatically determined whether an operation performed after selection of the region is related to the most recent selection operation or is a new selection operation, and an element to be added to an already selected element group can be added by a simple operation.

In an information processing apparatus according to an embodiment, the processor stores the set of elements including the one or more first elements and the second element in the storage as the element group selected by the user in a case in which the time from receipt of the selection of the region until receipt of the selection of the second element is within a predetermined time. Therefore, after the user has selected an element group, the user can add an element to the element group by selecting the element within a predetermined time. Accordingly, an element to be added to an already selected element group can be added by a simple operation.

In an information processing apparatus according to an embodiment, the processor stores the set of elements including the one or more first elements and the second element in the storage as the element group selected by the user in a case in which a distance between the region and the graphic indicating the second element is equal to or less than a predetermined distance. Therefore, after the user has selected an element group, the user can select an element located near the element group to add the element to the element group. Accordingly, an element to be added to an already selected element group can be added by a simple operation.

In an information processing apparatus according to an embodiment, a connection relationship between the elements in the drawing is indicated by connecting lines, and the processor stores the set of elements including the one or more first elements and the second element in the storage as the element group selected by the user in a case in which the second element is connected by the same connecting line as at least one first element among the one or more first elements. Therefore, after the user has selected an element group, the user can select an element that is located on the same connecting line as, and has a strong relationship with, any of the elements in the element group to add the element to the element group. Accordingly, an element to be added to an already selected element group can be added by a simple operation.

In an information processing apparatus according to an embodiment, the processor extracts, as the one or more first elements, an element indicated by a graphic that intersects a boundary of the region for which the selection is received in addition to the elements indicated by the graphics contained inside the region. Accordingly, not only the elements whose graphics are entirely included within the selected region, but also elements whose graphics intersect the boundary of the region can be extracted as first elements, enabling the user to select a desired element group with a simple operation.

In an information processing apparatus according to an embodiment, the processor stores the set of elements including the one or more first elements and the second element in the storage as the element group selected by the user in a case in which an operation is performed by the user to drag the graphic indicating the second element to the region after the selection of the region is received. Accordingly, the user can select a desired element group with an intuitive, understandable operation.

An information processing method according to some embodiments is to be performed by a processor of an information processing apparatus and includes receiving a selection from a user of a region, in a drawing in which elements are indicated by graphics, that contains one or more graphics indicating one or more first elements; receiving a selection from the user of a second element after receipt of the selection of the region; and storing, based on a time from receipt of the selection of the region until receipt of the selection of the second element and/or a positional relationship between the region and a graphic indicating the second element, a set of elements including the one or more first elements contained in the region for which the selection was received or a set of elements including the one or more first elements and the second element in a storage as an element group selected by the user. In this way, based on the time from selection of the region until selection of the graphic and/or the positional relationship between the selected region and the graphic, it is determined whether only the elements indicated by the graphics contained within the region are to be used as the element group, or whether the element indicated by the graphic selected after selection of the region is to be included in the element group.

Accordingly, it can be automatically determined whether an operation performed after selection of the region is related to the most recent selection operation or is a new selection operation, and an element to be added to an already selected element group can be added by a simple operation.

A program according to an embodiment is configured to cause a computer to function as the aforementioned information processing apparatus. In this way, based on the time from selection of the region until selection of the graphic and/or the positional relationship between the selected region and the graphic, it is determined whether only the elements indicated by the graphics contained within the region are to be used as the element group, or whether the element indicated by the graphic selected after selection of the region is to be included in the element group. Accordingly, it can be automatically determined whether an operation performed after selection of the region is related to the most recent selection operation or is a new selection operation, and an element to be added to an already selected element group can be added by a simple operation.

According to an embodiment of the present disclosure, all element groups conforming to a particular element group can easily be extracted from a drawing with a small number of person-hours. According to an embodiment of the present disclosure, the same process can also be performed in a batch with a simple operation on a plurality of identical element groups that include at least one element. According to an embodiment of the present disclosure, defective or deficient elements can also easily be extracted from a drawing with a small number of person-hours. According to an embodiment of the present disclosure, operations such as editing or correcting element groups that conform to a plurality of types of element groups can also be performed more efficiently. According to an embodiment of the present disclosure, the user can, while focusing on specific element groups, efficiently perform operations on element groups that also conform to a condition desired by the user. According to an embodiment of the present disclosure, multiple people can efficiently create a drawing. According to an embodiment of the present disclosure, a desired element group can be selected quickly with a simple operation. According to an embodiment of the present disclosure, an element to be added to an already selected element group can be added by a simple operation.

Comparative Example

PTL 1 discloses an operation system for performing a touch operation on a monitoring screen displayed on an operator monitoring operation terminal in a plant monitoring and control system for controlling the operation of plant devices. In this configuration, a user can display details of a drawing illustrating the configuration of the plant system and switch the display mode by performing a touch operation on a symbol indicating the plant device.

In a system such as a plant, a plurality of plant devices may be combined in a certain arrangement and used in multiple locations. Therefore, in the stage of creating or updating a drawing such as a P&ID illustrating the configuration of a plant or the like, the user may in some cases edit or correct each element group that conforms to a specific element group formed by one or more elements. In such cases, the user needs to visually select and extract the element group to be edited or corrected from the drawing.

However, visual extraction of the element group by the user requires many person-hours and easily leads to human error such as failing to extract an element group that should be extracted, or mistakenly extracting an element group that should not be extracted. In particular, when extracting element groups visually from drawings of a large-scale system such as a plant, an enormous amount of person-hours or labor is required, and the possibility of errors increases.

Embodiments of Present Disclosure

Embodiments of the present disclosure are now described with reference to the drawings. Identical or equivalent portions in the drawings are labeled with the same reference signs. In the explanation of the embodiments, a description of identical or equivalent portions is omitted or simplified as appropriate.

First Embodiment (Configuration of Information Processing System)

Figure 1:
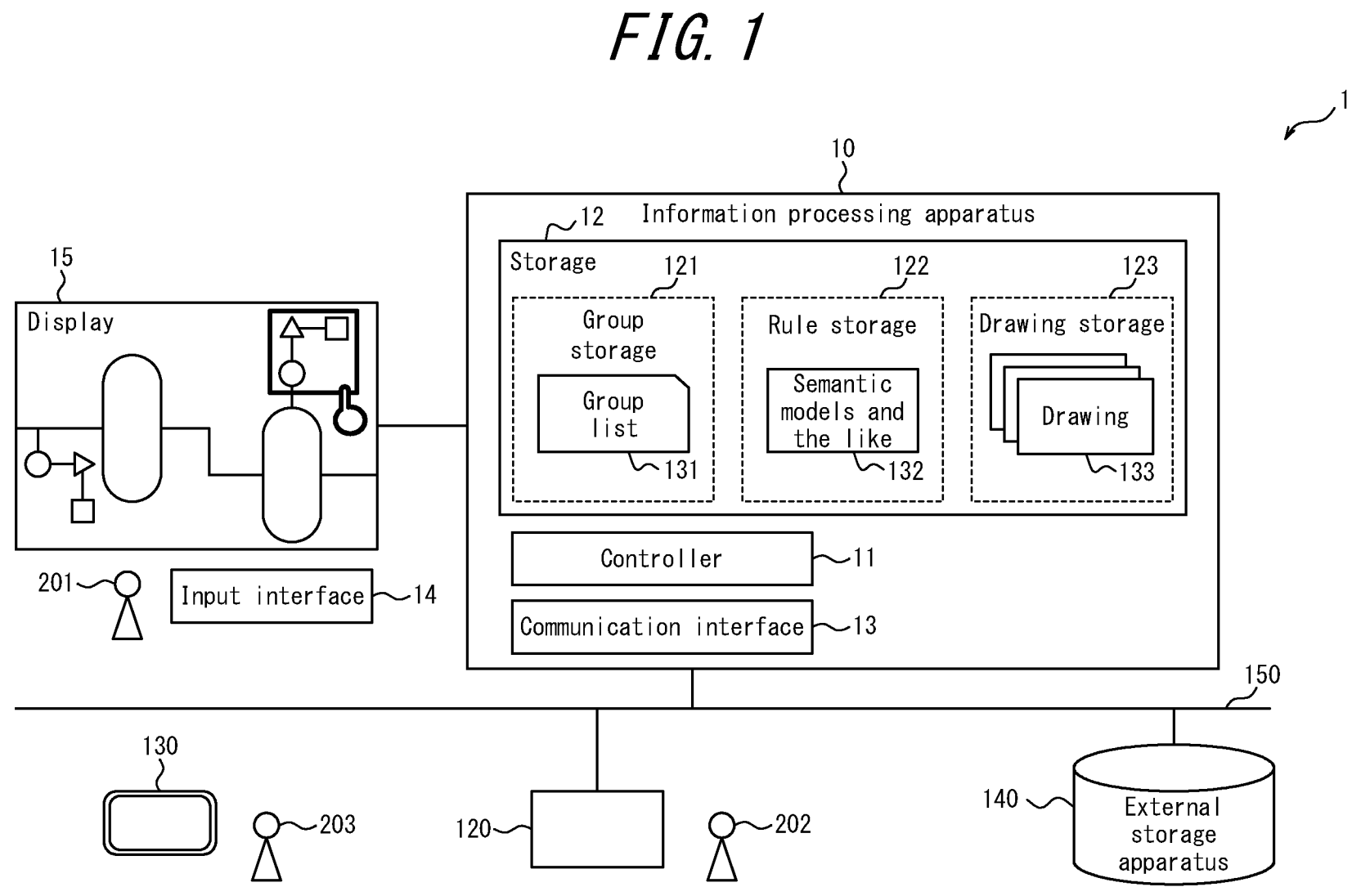

FIG. 1 is a diagram illustrating the configuration of an information processing system 1 that includes an information processing apparatus 10 according to an embodiment of the present disclosure. The information processing system 1 includes the information processing apparatus 10, an input interface 14, a display 15, a terminal 120, a terminal 130, an external storage apparatus 140, and a network 150. The information processing apparatus 10, the terminal 120, the terminal 130, and the external storage apparatus 140 are communicably connected to each other by the network 150. There is no requirement for the quantity of terminals 120 and 130, and desktop terminals, portable terminals (such as laptop personal computers (PC), tablets, or smartphones), and the like may be used as appropriate.

The information processing apparatus 10 automatically retrieves (searches) from the drawing element groups that conform to the element group selected by the user 201, thereby enabling easy extraction of all element groups that conform to a specific element group from the drawing with a small number of person-hours. The information processing apparatus 10 is one server apparatus or a plurality of communicably connected server apparatuses. The information processing apparatus 10 itself includes a display and may display the results of element group retrieval and the like to the user, or another terminal may receive the process performed on the information processing apparatus 10 and display the results. The information processing apparatus 10 may be any general-purpose electronic device, such as a work station (WS) or a PC, or any other dedicated electronic device. As illustrated in FIG. 1, the information processing apparatus 10 includes a controller 11, a storage 12, and a communication interface 13, and is communicatively connected to the input interface 14 and the display 15. In this specification, both the retrieval and search of the drawing elements, the element groups and so on means the detection of them.

The controller 11 includes one or more processors. The "processor" in an embodiment is a general-purpose processor or a dedicated processor specialized for particular processing, but these examples are not limiting. The controller 11 is communicably connected with each component of the information processing apparatus 10 and controls operations of the information processing apparatus 10 overall. The controller 11 includes the one or more processors which execute a processing, for example, based on a program according to the embodiment, in the information processing apparatus 10 according to the embodiment.

The storage 12 may include any appropriate storage module, such as an HDD, SSD, EEPROM, ROM, or RAM.

The storage 12 may, for example, function as a main memory, an auxiliary memory, or a cache memory. The storage 12 stores any information used for operations of the information processing apparatus 10. For example, the storage 12 may store a system program, an application program, various types of information received by the communication interface 13, and the like. The storage 12 is not limited to being internal to the information processing apparatus 10 and may be an external database or an external storage module connected through a digital input/output port or the like, such as USB. "HDD" is an abbreviation of Hard Disk Drive. "SSD" is an abbreviation of Solid State Drive. "EEPROM" is an abbreviation of Electrically Erasable Programmable Read-Only Memory. "ROM" is an abbreviation of Read-Only Memory. "RAM" is an abbreviation of Random Access Memory. "USB" is an abbreviation of Universal Serial Bus.

In the present embodiment, the storage 12 includes a group storage 121, a rule storage 122, and a drawing storage 123. The group storage 121 stores a group list 131 element groups, which are each a set (group) of elements formed by at least one element included in the drawing. The information processing apparatus 10 handles a drawing representing a configuration of a system such as a plant. The elements in the drawing indicate various devices configuring the system.

The rule storage 122 stores rules, such as semantic models 132, used for retrieving element groups from the drawing and for interpreting the element groups. In the present embodiment, the information processing apparatus 10 may use pattern matching, image recognition, or the like to recognize the drawing and constituent elements of element groups in the drawing in terms of external form and shape, and may use semantic models, graph theory, ontology, and the like to grasp and interpret the contents of the element groups. The rule storage 122 stores the information necessary for such retrieval and interpretation. A semantic model is a model that represents drawings, used in engineering of a process control system, by way of first information that indicates elements included in the drawings and second information that indicates relationships among the elements. The rule storage 122 may also store description rules of the drawings to be subjected to searching and the like. The description rules of the drawings are notation rules that differ for each drawing and may, for example, be a series of rules such as "in this drawing, a tank is indicated by this symbol" or "a solid red line indicates - - -". These examples are not limiting, and it suffices for the rule storage 122 to store at least one piece of information regarding the rules necessary for processing the drawings.

The drawing storage 123 stores data for the drawings 133. The drawings represent a large-scale system, such as a plant, using numerous elements. In each drawing, the type and attribute information on each element, the arrangement of the elements, and the like are specified. Attribute information is information that indicates the properties of the element, conditions at the time of operation, and the like. At least one piece of attribute information is attached to each element in the drawing. For example, as a property of the element "tank", attribute information indicating the material of the tank (such as stainless steel) or the like may be attached to the element. Alternatively, as a condition at the time of operation, for example, a value or the like serving as a condition that a specific operation be performed when the amount of the content exceeds a certain value (such as 500 liters) may be attached as the attribute information. Information indicating which element is located upstream or downstream between two elements in a connection relationship with each other in the drawing may be predetermined, and such information may be stored in the drawing 133 itself. The information indicating which element is located upstream or downstream between elements in a connection relationship may be information instructing that a determination be made from the positional relationship on the drawing, such as that elements at the upper left and upper part of the drawing correspond to upstream elements, or may be information such as From/To information in a digital P&ID. Some or all of the information stored in the group storage 121, the rule storage 122, and the drawing storage 123 may be stored in the external storage apparatus 140. The drawings are maintained as vector data or the like in a digital P&ID. Alternatively, the drawings may be maintained as bitmap data obtained by scanning drawings on paper (such as a handwritten drawing or a drawing created with CAD or the like and printed out), or the result of converting bitmap data to a different format (such as raster data or vector data).

The communication interface 13 includes any appropriate communication module capable of connecting to and communicating with the input interface 14, the display 15, or another apparatus such as the terminal 130, by any appropriate communication technology. The communication interface 13 may further include a communication control module for controlling communication with other apparatuses and a storage module for storing communication data, such as identification information, necessary for communicating with other apparatuses.

The input interface 14 includes one or more input interfaces that receive an input operation from a user 201 and acquire input information based on the operation by the user 201. In the present embodiment, the case of the input interface 14 being configured by a touchscreen integrally provided with a display of the display 15 is described as an example. However, the input interface 14 may instead be configured by physical keys, capacitive keys, a keyboard, a pointing device, or the like. A region in the drawing may be selected by moving a cursor or the like to a desired position by operation of a pointing device, a trackball, a touch pad, or the like.

The display 15 is a display that displays an image of a drawing or other information to the user 201. The display 15 is, for example, configured by a liquid crystal display (LCD), an organic electro-luminescence (EL) display, or the like. At least one of the input interface 14 and the display 15 described above may be formed integrally with the information processing apparatus 10 or be provided separately. For example, the information processing apparatus 10 may specialize exclusively in processing, and the user may confirm the display on the display of the terminal 120, terminal 130, or the like that receives the processing results.

The functions of the information processing apparatus 10 can be implemented by the processor included in the controller 11 executing a program (computer program) according to the present embodiment. That is, the functions of the information processing apparatus 10 can be implemented by software. The program causes a computer to execute the processing of the steps included in the operations of the information processing apparatus 10 to implement the functions corresponding to the processing of the steps. That is, the program is a program for causing a computer to function as the information processing apparatus 10 according to the present embodiment.

The program can be recorded on a computer-readable recording medium. The computer-readable recording medium is, for example, a magnetic recording apparatus, an optical disc, a magneto-optical recording medium, or a semiconductor memory. The program is, for example, distributed by the sale, transfer, or lending of a portable recording medium such as a DVD or CD-ROM on which the program is recorded. "DVD" is an abbreviation of Digital Versatile Disc. "CD-ROM" is an abbreviation of Compact Disc Read Only Memory. The program may be distributed by being stored on a storage of a server and transferred from the server to another computer over a network. The program may be provided as a program product.

For example, the computer can temporarily store, in the main memory, the program recorded on the portable recording medium or transferred from the server. The computer uses a processor to read the program stored in the main memory and executes processing with the processor in accordance with the read program. The computer may read the program directly from the portable recording medium and execute processing in accordance with the program. Each time the program is transferred from the server to the computer, the computer may sequentially execute processing in accordance with the received program. Such processing may be executed by an ASP type of service that implements functions only via execution instructions and result acquisition, without transferring the program from the server to the computer. "ASP" is an abbreviation of Application Service Provider. Examples of the program include an equivalent to the program represented as information provided for processing by an electronic computer. For example, data that is not a direct command for a computer but that has the property of specifying processing by the computer corresponds to the "equivalent to the program".

A portion or all of the functions of the information processing apparatus 10 may be implemented by a dedicated circuit included in the controller 11. In other words, a portion or all of the functions of the information processing apparatus 10 may be implemented by hardware. Furthermore, the information processing apparatus 10 may be implemented by a single information processing apparatus or implemented by cooperation between a plurality of information processing apparatuses, terminals 120, 130, or the like.

The terminal 120 is an information processing apparatus used by a user 202. The terminal 130 is an information processing apparatus used by a user 203. In the present embodiment, an example in which the user 201 operates the information processing apparatus 10 via the input interface 14 and the display 15 is described, but the information processing apparatus 10 may be used via the network 150 from an apparatus such as the terminal 120 or the terminal 130.

The external storage apparatus 140 is a storage apparatus that complements the storage of the storage 12 in the information processing apparatus 10. As described above, some or all of the information stored in the group storage 121, the rule storage 122, and the drawing storage 123 may be stored in the external storage apparatus 140. The external storage apparatus 140 may be implemented by any storage apparatus such as an HDD or SSD.

Example Operations

Figure 3:
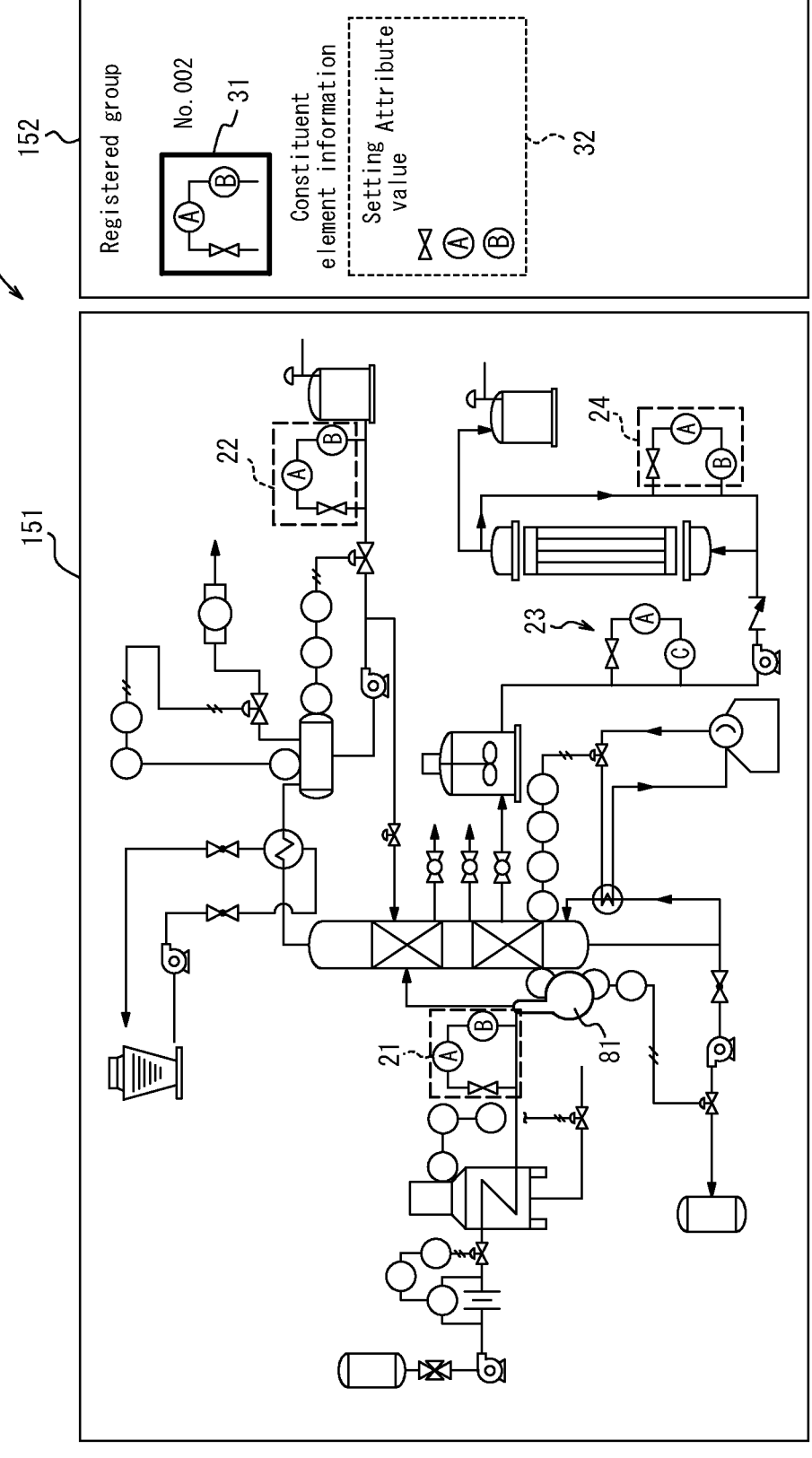
FIG. 3 is a diagram illustrating an example of a screen on a display connected to the information processing apparatus.
Figure 4:
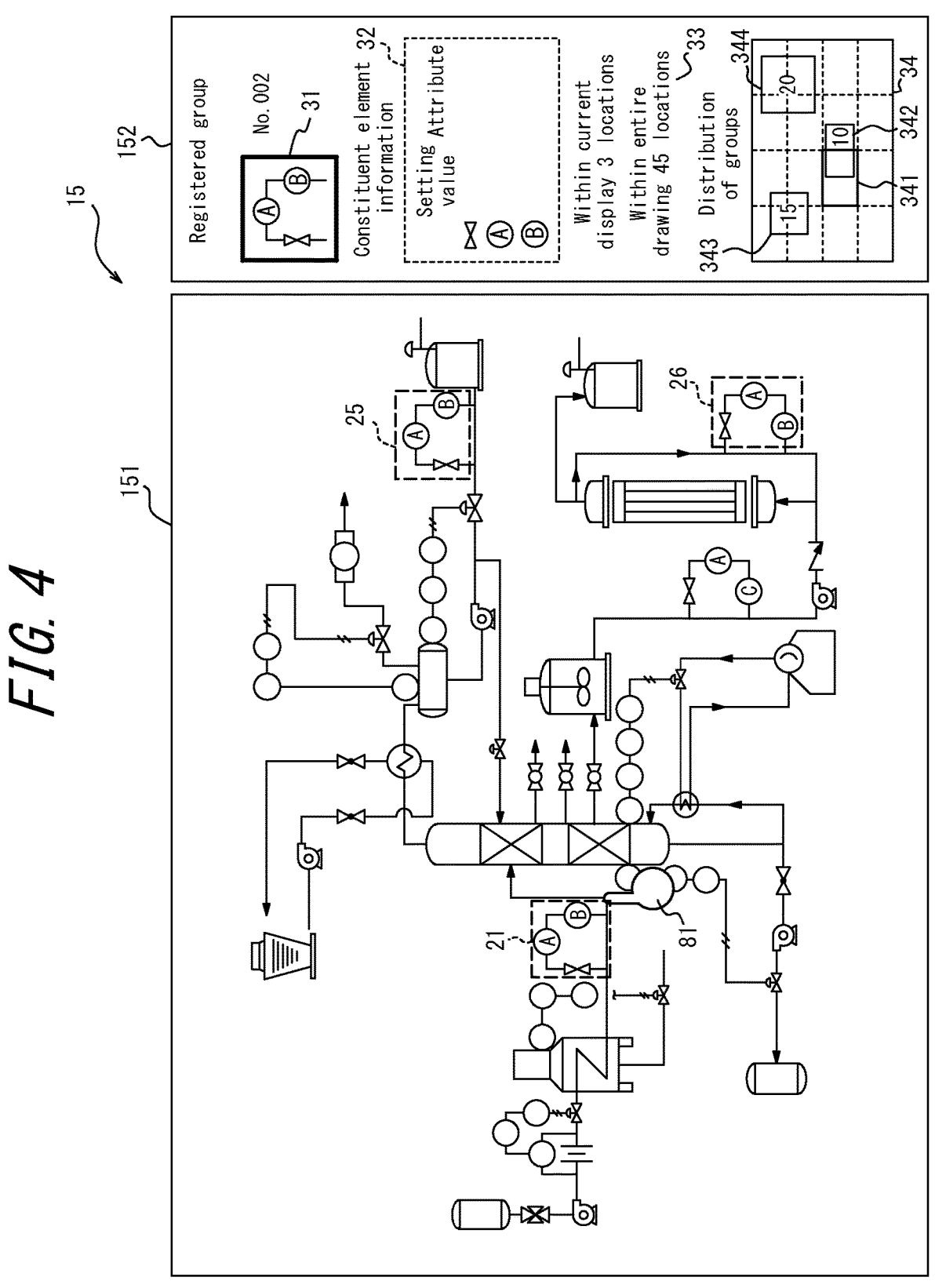
FIG. 4 is a diagram illustrating an example of a screen on a display connected to the information processing apparatus.

FIGS. 2 to 4 are diagrams illustrating examples of screens on the display 15 connected to the information processing apparatus 10. As illustrated in FIG. 2, a display area 151 of a drawing illustrating a configuration of the plant and a display area 152 illustrating information on an element group selected in the drawing are displayed on the screen of the display 15.

FIG. 2 illustrates an example in which a user 201 selects a region 21 in the drawing by a touch operation 81 on the touch panel, and an element group (group) formed by a valve, an element A, and an element B is selected. The selection of the element group may, for example, be performed by a cursor movement operation by a pointing device or the like, instead of a touch operation on the touch panel by a finger, a touch pen, or the like.

The selected element group, the arrangement thereof, attribute information, and the like may be stored in the group storage 121 of the storage 12 as registered group information. In the example in FIG. 2, the selected element group is the second registered group and is assigned an identifier of group No. 002. The information processing apparatus 10 may store a large number of element groups to enable subsequent reuse.

FIG. 2 illustrates an example in which a display area 31 of elements related to the selected group and a display area 32 of information, such as attribute information, set for the group are displayed in the display area 152 on the right side of the screen. The display area 152 may be used as a UI (User Interface) for the user 201 to refer to the information about the group or to perform operations such as editing, information analysis, or screen transition. The information displayed in the display area 152 may be displayed by a pop-up window or the like in the vicinity of the region 21 selected by the user 201 in the drawing.

FIG. 3 illustrates a process in which an element group that conforms to an element group included in the region 21 is retrieved from the drawing. In response to the user 201 selecting the region 21 to select an element group, the controller 11 of the information processing apparatus 10 treats the element group as a search element group, retrieves element groups that conform to the search element group from the drawing, and displays the retrieved element groups together with the drawing displayed on the display 15.

In the example in FIG. 3, the element group selected by the user is formed by three elements: the valve, the element A, and the element B, from upstream to downstream. The controller 11 first retrieves, from the drawing, a valve that is identical to the valve farthest upstream in the search element group (a valve for which attribute information, such as model number and setting, and necessary conditions match). Next, the controller 11 checks whether there is an element A that is connected adjacent to the downstream side of the retrieved valve. Next, the controller 11 checks whether there is an element B at the downstream end. If all the elements and their arrangement match the search element group, the controller 11 determines that they are the same group. In the example in FIG. 3, the element groups 21 to 24 in FIG. 3 are extracted as candidates through the process of searching for the element A. However, since the element group 23 includes an element C different from the search element group as the element farthest downstream, the controller 11 determines that the element group 23 does not belong to the search target.

In this way, the controller 11 identifies the element farthest upstream, for example, in the element group included in the search element group as a priority element to be prioritized and retrieves an element conforming to the priority element in the drawing. Next, the controller 11 determines in order, starting from the priority element, whether other adjacent elements conform to the search element group. Accordingly, even if a priority element is detected, in a case in which an adjacent element does not conform, the process of comparing with the search element group is suspended with respect to the priority element at the moment when the adjacent element does not conform, thereby making the process more efficient. The controller 11 determines which element is farther upstream, among at least two elements in a connection relationship with each other in at least one drawing, based on the connection relationship of the elements in light of information on the drawing. Specifically, information indicating which element is located upstream or downstream between two elements in a connection relationship with each other, for example, may be predetermined, and the controller 11 may determine which element is located upstream by referring to this information. Alternatively, for example, if there is a description rule that elements that are more upstream are listed to the left or above in the drawing, the controller 11 may determine which element is upstream based on the description rule, by referring to the positional relationship of the plurality of elements that are in a connection relationship with each other. In that case, if a description rule is applied in the drawing so that an element that is upstream is listed to the left or above as a general rule, but for a specific fluid (such as a gas), an element that is upstream is listed below, the controller 11 may determine the element that is farther upstream based on such a description rule. Alternatively, as described above, if the drawing itself contains information (such as From/To in a digital P&ID) indicating which element is upstream or downstream among elements, the controller 11 may use this information to determine which element is upstream. In addition, the priority element is not limited to the element farthest upstream in the search element group. An element with a high degree of importance in a drawing or an element group may be determined according to a priority order in rule data stored in the rule storage 122 or the like in the system, or may be set by user designation.

The controller 11 retrieves from the drawing, as an element group conforming to the search element group, an element group for which the type of each element forming the element group, the attribute information held by each element, and the arrangement (order of connection) between elements are determined to match the search element group, but the criteria for determining conformity to the search element group are not limited to these examples. For example, as an element group that conforms to the search element group, the controller 11 may retrieve an element group for which the type of each element forming the element group and the arrangement between elements match the search element group, even if at least a portion of the attribute information does not match. The controller 11 may receive a setting from the user 201 indicating what range of element groups are to be determined to conform to the search element group. Settings like these that are frequently used may be stored in the rule storage 122 or the like and used as needed. New settings or changes to existing settings by the user may also be stored in the rule storage 122 or the like and reused.

FIG. 4 illustrates an example in which element groups that conform to an element group included in region 21 of the display area 151 are retrieved from the drawing and displayed. The controller 11 may display the drawing on the display 15 so that the retrieved element groups are displayed in a different manner from the other elements. In FIG. 4, the element groups 21, 25, and 26 that are determined to conform to the search element group 21 are displayed in a manner different from other elements. For example, the controller 11 may display the elements that conform to the search element group in a different color from other elements or with a specific mark attached thereto. Alternatively, the controller 11 may display the retrieved element groups by changing the line type or by attaching information identifying the group, such as a group number or a group name. The controller 11 may combine any of the above-described display manners. In this way, since the retrieved element groups are displayed on the display 15 in a different manner from other elements, the user 201 can easily recognize the retrieved element groups at a glance in the drawing displayed on the display 15.

In the example in FIG. 4, a display area 33 on the right side of the screen displays the number of element groups retrieved as element groups conforming to the search element group. The display area 33 displays that the number of element groups conforming to the search element group is 3 in the drawing displayed in the display area 152 and is 45 in the entire drawing (such as the entire drawing of the plant), including other pages not displayed in the display area 152.

In the display area 34 of FIG. 4, the distribution of element groups conforming to the search element group in the entire plant is displayed. The frame 341 indicates the section illustrated in the display area 151. Rectangles 342, 343, 344 indicate regions where the element groups to be retrieved are found in the entire plant. Among the constituent elements of the rectangle 343, there are 10 element groups conforming to the search element group, three of which are displayed in the display area 151. Among the constituent elements of the rectangle 343, there are 15 element groups conforming to the search element group, and among the constituent elements of the rectangle 344, there are 20 element groups conforming to the search element group. In the example in FIG. 4, the distribution of the element groups conforming to the search element group is indicated by rectangles, but the display method is not limited to this example. For example, the controller 11 may indicate the existence of one element group with a point, and indicate the existence and concentration of element groups by the density of points, or may display a geometric figure, such as a circle, of a different size according to the number of element groups. The controller 11 may also only display images according to the distribution of element groups conforming to the search element groups, or may display such images together with the quantity of element groups. In this way, the controller 11 may display on the display 15 an image indicating the distribution in the drawing of each of the retrieved element groups. The user 201 can easily grasp where the retrieved element groups are located in the drawing by referring to the image illustrating the distribution of the retrieved element groups. Such a display is useful when a user wishes to perform operations specifically on a certain group in the design and maintenance of a drawing. Such operations may include correcting elements or confirming the distribution of the search element group. The controller 11 may also retrieve element groups that conform to the search element group after setting a specific area selected by the user 201, rather than the entire plant, as the search target range.

When an element group specified by the user 201 is registered (stored in the storage 12 as a search element group), and element groups conforming to the element group are extracted from the drawing, the controller 11 may store positional information for the extracted element groups in the storage 12. The positional information for the element group may, for example, be the page of a divided drawing (or a drawing number), the layer when multiple drawings are superimposed, coordinates in the drawing that specify the location of the element group, and/or how far down the element group is from piping or wiring above the element group, reference piping, or the like. By storing such information, the information processing apparatus 10 can use the information on a group that has been detected once, without needing to retrieve the group again.

When a search element group is selected, the controller 11 may retrieve element groups conforming to the search element group in the drawing and store the positional information and the like of the retrieved element groups in the storage 12 automatically, even without an explicit instruction from the user 201 for retrieval or registration of the retrieval results. This enables the user 201 to use the retrieval results as needed. For example, the user 201 can easily extract the groups using a tablet terminal or other device when out of the office or the like, and then use the automatically stored information on the retrieval results when later performing operations, such as editing drawings, in earnest.

In the present embodiment, after the conformity of the upstream valve and the downstream element A adjacent thereto is determined, the controller 11 simply considers that the element group does not conform and stops processing for the next downstream element when that element (for example, the element C) does not conform to the element B. Different processing may, however, be performed as necessary. For example, if the upstream valve and the element A conform and only the last element is different, then the element group for which conformity is being verified shares commonality with the search element group. In some cases, performing processing based on this commonality could make operations more efficient. Therefore, upon detecting that the valve and the element A conform, the controller 11 may store an element group for which a plurality of elements conform to the search element group in the storage 12, even if the next element (element B) does not conform. The controller 11 may at this time store element groups in the storage 12 after classification into element groups with the element C as the downstream element, the element D as the downstream element, and so forth. By performing such a process, in a search for one group (search element group), an upper-level group that is part of the search element group and contains a smaller number of common element groups can be extracted and later reused as necessary. For example, the controller 11 may designate the initially selected element group formed by the valve, the element A, and the element B as a variation (subordinate group) of the higher-level "group including the valve and the element A upstream" and store the variation in the storage 12. Examples of hierarchizing element groups will be described in detail in the fourth and fifth embodiments.

(Operating Procedures)

Next, with reference to FIG. 5, operations of the information processing apparatus 10 will be described. The operations of the information processing apparatus 10 described with reference to FIG. 5 correspond to an information processing method according to the present embodiment, and the operation of each step is performed based on control by the controller 11. FIG. 5 is a flowchart illustrating example operations of the information processing apparatus 10 according to an embodiment of the present disclosure.

In step S1, the controller 11 receives a selection of an element group in the drawing via an operation by the user 201 on the input interface 14. The element group selected here can be a set of elements that perform a certain function. Specifically, the controller 11 receives the selection of the element group by a touch panel operation or the like. The selection of the element group may instead be received via a cursor movement by the operation of a pointing device, or the like. An evolutionary method for selecting element groups will also be described in the seventh and eighth embodiments. Step S1 can be omitted, since an element group that has already been selected (stored in the storage 12) may be used as the search element group, without a new selection by the user.

In step S2, the controller 11 stores the selected element group in the storage 12. The controller 11 thereby registers the selected element group. Specifically, the controller 11 stores the types of the elements forming the group and the connection relationship or arrangement of the elements in the storage 12. If necessary, the controller 11 also stores the attribute information attached to each element in the storage 12. Furthermore, the controller 11 may set the retrieval conditions for retrieving element groups from the drawing according to an instruction from the user. That is, the controller 11 may receive a setting of a retrieval condition from the user, such as to (a) retrieve, as element groups that conform to the search element group, element groups formed by elements such that the type of the elements and the arrangement between elements are identical to the search element group, despite at least a portion of the attribute information on each element being different, or (b) retrieve only element groups such that the type of each element forming the element group, the attribute information attached to each element, and the arrangement between the elements match. Alternatively, the controller 11 may receive a setting indicating that elements whose attribute information is within a certain range are to be regarded as having the same attribute information. These retrieval conditions may also be selected from setting conditions stored in the rule storage 122 or the like, and setting conditions may be customized by the user or newly set by the user independently. In either case, the setting conditions may be stored in the rule storage 122 for subsequent reuse.

In step S3, the controller 11 retrieves, from the drawing, elements that conform to a priority element to be prioritized among the elements included in the search element group. Specifically, the controller 11 retrieves from the drawing element groups that conform to the search element group with an element that is farther upstream as a priority element. The retrieval of the search element group is performed using the rules stored in the rule storage 122 described above. As a result of the search, the controller 11 proceeds to step S4 if the priority element exists in the drawing (YES in step S3), and ends the process of the flowchart if the priority element does not exist (NO in step S3).

In step S4, the controller 11 retrieves elements that conform to an element adjacent to the priority element included in the search element group from among the elements adjacent to the elements that conform to the priority element and were retrieved from the drawing. After sequentially repeating such a process, the controller 11 determines whether, in the retrieved element groups, there is an element group in which each element other than the priority element conforms to the search element group. When such an element group exists (YES in step S4), the process proceeds to step S5, and when such an element group does not exist (NO in step S4), the process is terminated.

In step S5, the controller 11 determines that the retrieved element groups (the locations on the drawing that satisfy all element types and arrangements) conform to the element group for which the selection was received in step S1.

In step S6, the controller 11 stores information about the retrieved element groups, such as positional information, in the storage 12. The controller 11 may end the processing of the flowchart in step S6 after storing, in the storage 12, information on where the retrieved element groups exist in the drawing. That is, the processing corresponding to S7 and S8 is not essential and may be omitted. Once the element groups are retrieved and the corresponding positional information and the like is stored, such information can subsequently be recalled and used when display or other processing on the drawing is necessary. The controller 11 may subsequently allow the user to refer to the information to check where the element groups are located as needed, or may recall the information and display the positional information when processing is needed.

In step S7, the controller 11 displays the graphics indicating the elements included in the retrieved element groups in a manner different from other elements on the display 15. For example, the retrieved element groups may be highlighted. A configuration may be adopted so that the processing of step S7 is performed only when the user instructs to display the retrieved element groups in a manner different from other elements.

In step S8, the controller 11 may display on the display 15 an image indicating the distribution in the drawing of each of the retrieved element groups. A configuration may be adopted so that the processing of step S8 is performed only when the user instructs to display the distribution of the retrieved element groups.

The drawing from which the element groups are to be retrieved may include a plurality of drawings, instead of a single drawing. Furthermore, the drawing to be searched may include a plurality of drawings representing the same plant, instead of a single drawing. Alternatively, the drawings to be searched may be drawings of a plurality of plants, rather than drawings of the same plant. One drawing may be maintained as a single file, or as a plurality of files. A drawing among a plurality of drawings may be maintained as a single file, or the plurality of drawings may be maintained together as a single file. In addition, any number of drawings may be searched, regardless of the number of data holding folders, data sheets, and the like.

As described above, the information processing apparatus 10 according to the present embodiment receives from a user a selection of a search element group, which is an element group formed by one or more elements used in a drawing. Specifically, for example, the information processing apparatus 10 receives a selection of at least one element by a user in any drawing among at least one drawing displayed on the display 15, and designates the element group formed by the at least one element as a search element group. The information processing apparatus 10 then retrieves from at least one drawing element groups that conform to the search element group for which the selection was received, and displays the retrieved element groups on the display 15 so that the positions thereof in the drawing can be identified. In this way, element groups conforming to the element group selected by the user are automatically retrieved and displayed on the display in correspondence with the positions thereof on the drawing. The user therefore does not need to extract element groups visually and can easily extract all the element groups conforming to a specific element group from the drawing with a small number of person-hours. Furthermore, since the selection is received of the search element group in the drawing displayed on the display, the user can easily select the search element group. Therefore, according to the present embodiment, the operation to select an element group in a complex and enormous drawing can be streamlined, work time and labor cost can be decreased, and work errors can be reduced.

In the present embodiment, the user selects a search element group in step S1 from the drawing displayed on the display 15 using, for example, the evolutionary method of the seventh and eighth embodiments, but the method of selecting the search element group is not limited to selection from the drawing. For example, apart from the drawing displayed on the display 15, the controller 11 may illustrate the configuration and shape of a plurality of candidate search element groups in a diagram or the like at a position outside the drawing, or may display a plurality of registered element groups (stored in the storage 12) selectably as menu information, such as text, to enable the user to select a desired search element group. Alternatively, the controller 11 may, for example, provide a UI for the user to designate a desired search element group.

The information processing apparatus 10 retrieves from the drawing element groups for which the type of each element forming the element group and the arrangement between elements match the search element group, or element groups for which the attribute information attached to each element additionally matches. Accordingly, the information processing apparatus 10 can automatically retrieve element groups formed by elements of the same type and the same arrangement between elements as the search element group, or element groups for which even the attribute information attached to each element additionally matches. The way in which the attribute information matches, such as complete matching or partial matching (matching of principal attributes or designated attributes), may be freely set by changing the settings or by user designation. Partial matching is selected when attribute information can be regarded as identical if the principal attribute information matches. For example, information that is naturally different between elements in a drawing, such as Tag No., is excluded from the determination of conformity. Such rule information for determination is also stored in the rule storage or the like and may be used as necessary.

The information processing apparatus 10 retrieves from the drawing elements that conform to a priority element to be prioritized among the elements included in the search element group, and then retrieves an element that conforms to an element adjacent to the priority element included in the search element group from among elements adjacent to the retrieved element that conforms to the priority element. Specifically, the information processing apparatus 10 retrieves elements in order starting from the element that is farther upstream among the elements included in the search element group, for example. In this way, the information processing apparatus 10 narrows down the search target by searching in order starting from the priority element among the elements included in the search element group, thus enabling efficient searching. In other words, when retrieving an element group formed by three elements from the drawing, the controller 11 passes over locations where the first element (priority element) is not present, and if it determined that the first element is present but the adjacent second element is not present, the controller 11 suspends the retrieval as non-conforming at that point. Therefore, according to the present embodiment, searches can be performed efficiently, without wasteful processing.

Second Embodiment

In the present embodiment, a configuration is described for performing a common process selected by the user 201 on each element group in a plurality of identical element groups, thereby enabling performance of the same process on each element group in a batch with a simple operation. The same reference signs are attached to configurations in common with the first embodiment, and a detailed description is omitted.

Example Operations

In the second embodiment, the controller 11 first acquires and registers a plurality of element groups that are identical and formed by one or more elements used in at least one drawing. The controller 11 may acquire the plurality of identical element groups by retrieving, from the drawing, element groups identical to an element group selected by the user, as in the first embodiment, or by reading, from the storage 12, a plurality of identical element groups stored in advance in the storage 12.

Figure 6:
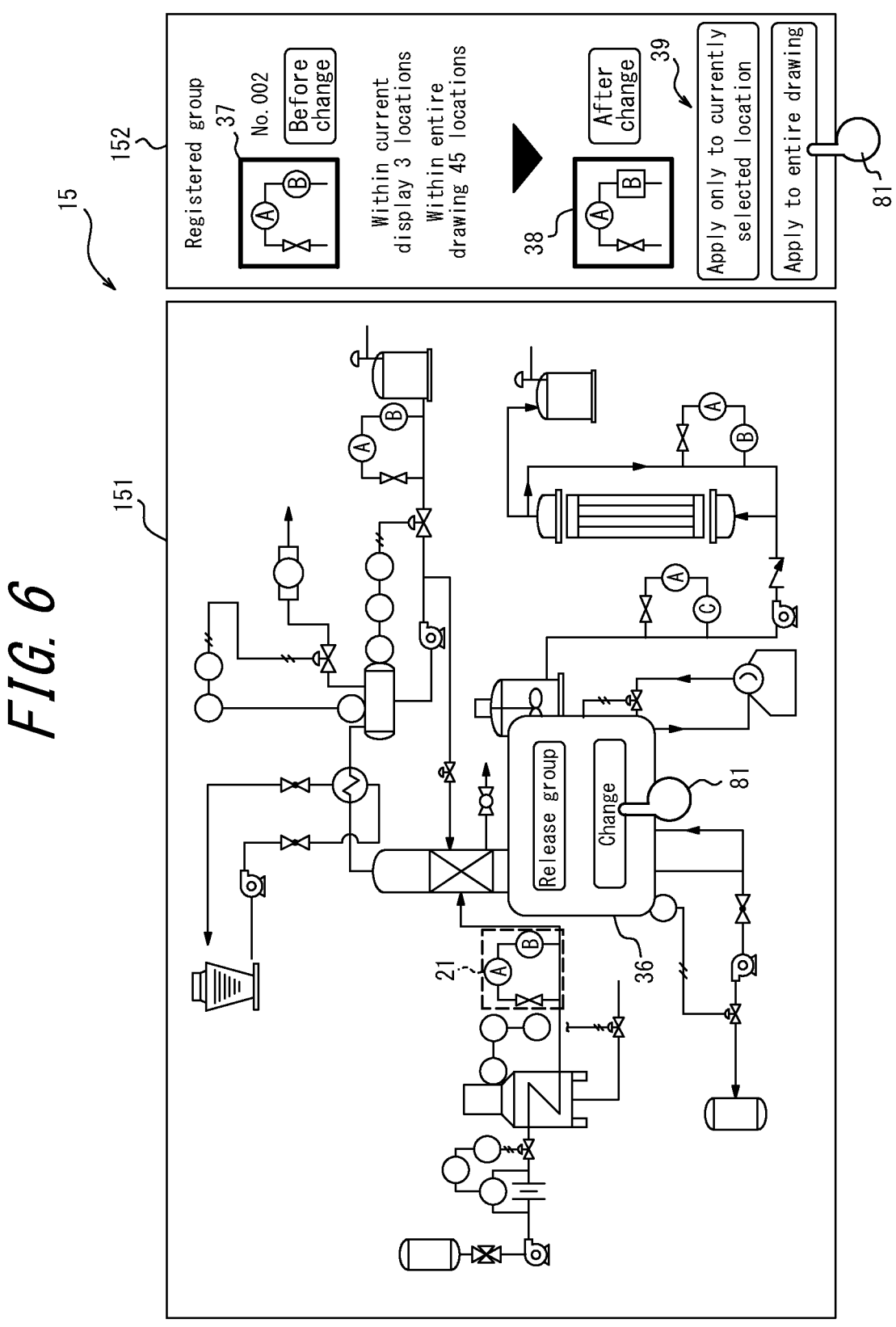
FIG. 6 is a diagram illustrating an example of a screen on a display connected to the information processing apparatus.
Figure 7:
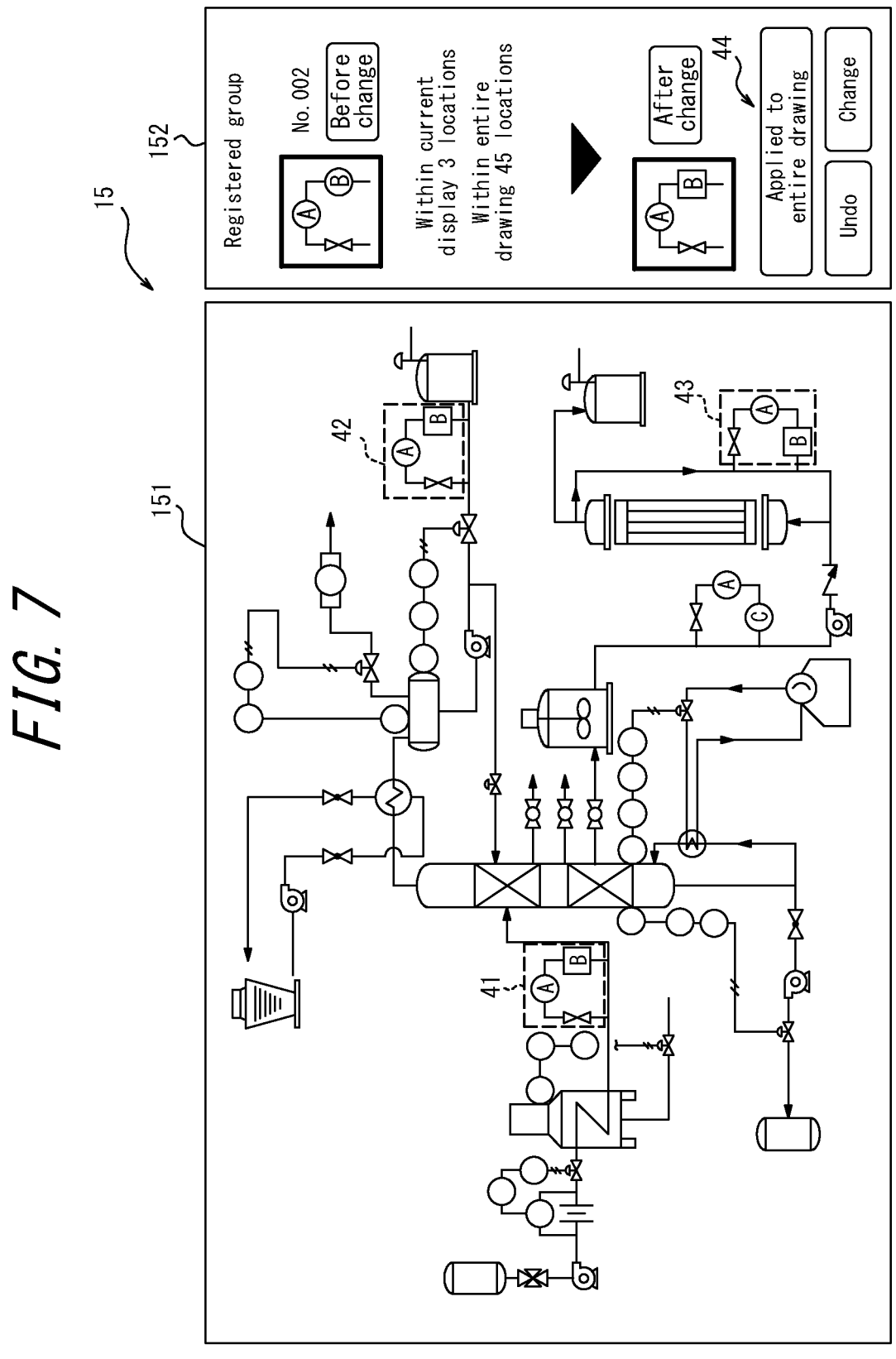
FIG. 7 is a diagram illustrating an example of a screen on a display connected to the information processing apparatus.
Figure 8:
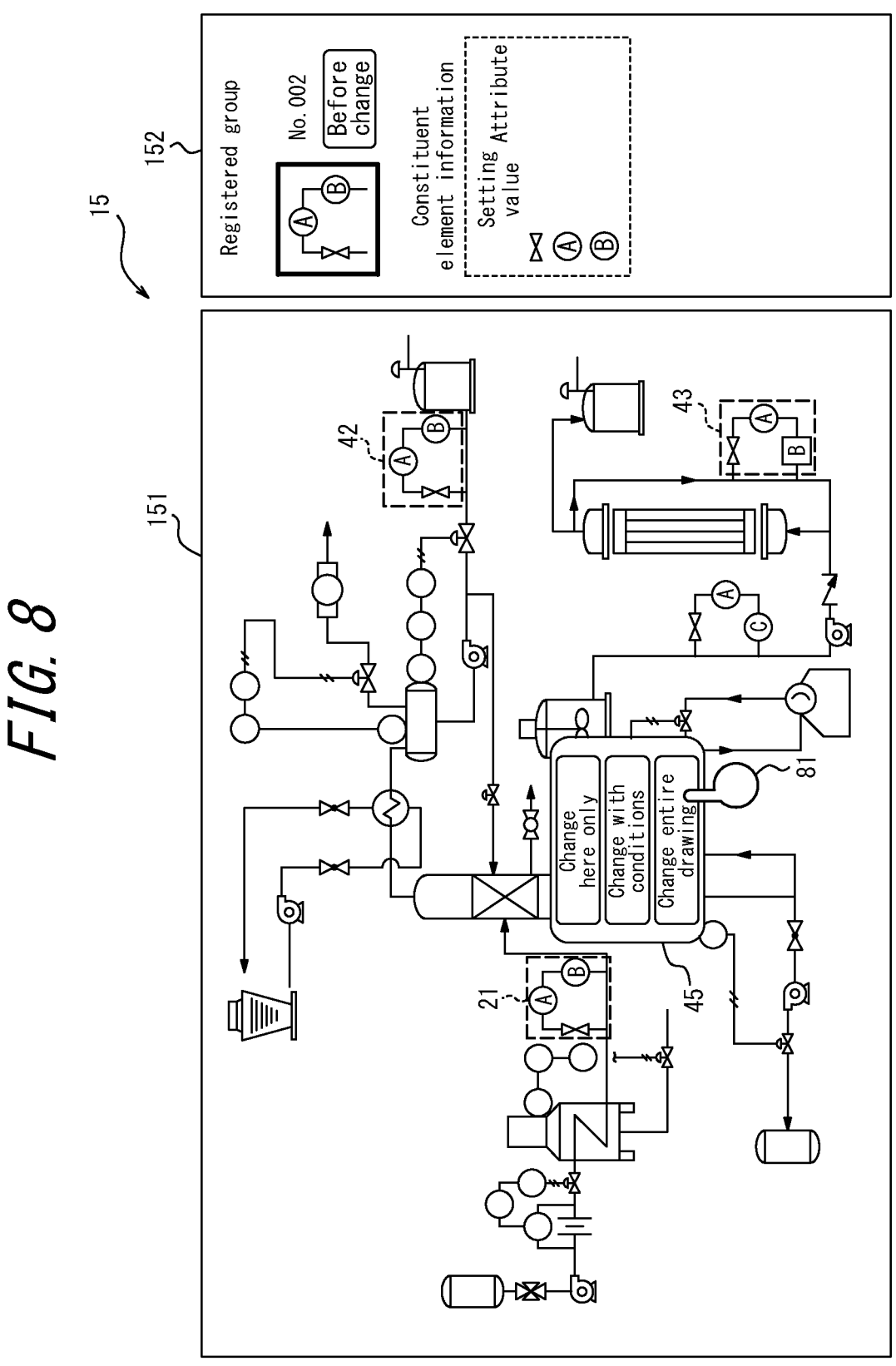
FIG. 8 is a diagram illustrating an example of a screen on a display connected to the information processing apparatus.

An example of performing a process for correction or the like on a registered plurality of element groups will be described below. FIGS. 6 to 8 are diagrams illustrating examples of screens on the display 15 connected to the information processing apparatus 10. In FIGS. 6 to 8, an element group identical to an element group formed by the valve, the element A, and the element B included in the region 21 has been selected (acquired) in advance. As illustrated in the display area 152, the number of element groups identical to the element group formed by the valve, the element A, and the element B included in the region 21 is 3 in the drawing currently displayed in display area 151 and is 45 in the entire drawing (such as the drawings of the entire plant) including this drawing. The controller 11 may highlight the locations in the drawing of these element groups by changing colors or the like.

In FIG. 6, (an element group within) the region 21 has been selected by a user 201 as a processing target. The user 201 moves a cursor displayed on the screen by designating the portion indicated by 81 by contact with a finger, touch pen, or the like on the touch panel, or by operating a pointing device such as a trackball, to select a process, via the UI 36, to be performed on the element group (group). In the example in FIG. 6, "change" is selected. Next, the user 201 sets the content of the change. In the example in FIG. 6, as illustrated by the display areas 37 and 38, the user 201 sets a process for changing the element B from being indicated by a circular symbol to a rectangular symbol. Next, the user 201 selects, via the display area 39, the range over which the change is to be applied. In the example in FIG. 6, "apply only to currently selected area", which targets only the currently selected region 21 (one location), and "apply to entire drawing" which targets the range of the entire drawing (45 locations) are displayed as options. The options are not limited to these. For example, the change may be applied only to the locations (3 locations) found in the drawing currently displayed in the display area 151, or an option such as "apply to part of drawing" may be prepared to apply the change only to the drawing over a range designated by the user. The following describes the case in which "apply to entire drawing" is selected.

By correcting one element group in a plurality of identical element groups in the drawing (by designating the element group to be processed, the content of the processing, and if necessary, the range over which processing is to be applied), the controller 11 can also apply the correction to identical element groups at other locations in the drawing. As illustrated in FIG. 7, the circular symbol indicating the element B is changed to a rectangular symbol in all of the element groups 41 to 43 formed by the valve, the element A, and the element B. The controller 11 may highlight the locations that were changed (the locations to which the change was applied) in a different manner than other locations to make the changed locations identifiable. At the time a user designates an element group 21 to be processed in a drawing as illustrated in FIG. 6, the positions of identical element groups found in the drawing may be indicated, as in FIG. 7. In this case, if the element groups have previously been retrieved (stored in the storage 12) and have been retrieved from the drawing and stored in the storage 12 together with identifying information (such as positional information), the element groups need not be retrieved again. When the user designates the element group 21 that has previously been retrieved in such a case, the information processing apparatus 10 responds by using retrieved information for immediate display of the locations of the element groups 42 and 43 previously retrieved in the drawing in a different manner from other locations, as illustrated in FIG. 7. On the other hand, in the case in which the element group 21 designated by the user for processing is an (unretrieved) element group not stored in the storage 12, the information processing apparatus 10 performs a process to retrieve the element group from the drawing and store the element group in the storage 12 together with identifying information (such as positional information) in the drawing. After the retrieval, the information processing apparatus 10 can display the locations of the retrieved element groups 42 and 43 in the drawing in a different manner from other locations (indicating the portions of the drawing to be processed), as illustrated in FIG. 7.

The controller 11 may receive a setting of a condition such as "connected to an upstream tank" by a condition setting window or the like, and perform a batch change on only element groups that match such a condition. At this time, the controller 11 may display information such as "15 locations in the entire drawing/one location satisfying condition" to notify the user of the total number of element groups and the number of element groups that match the condition. For editing of a registered element group, the controller 11 may receive a change from a group list or a UI for group editing such as the display area 44 in FIG. 7, or may receive the change by receiving the selection of the location to be changed from the drawing. Here, the process of changing the element B from being indicated by a circular symbol to a rectangular symbol has been described, but the processing content is not limited to this example. For example, attribute information or character information may be set, changed, or corrected, or element groups may be replaced. As long as the process is applicable to element groups, the process to be performed on a plurality of element groups in a batch is not limited to these examples.

The controller 11 may, for example, display the UI 45 illustrated in FIG. 8 so that the user 201 can select, at the time of selecting the location to correct, whether the process to be performed is an individual change or a batch change to be applied to the entire drawing. Furthermore, after selection of the group batch change, the controller 11 may display a UI for selecting whether the applicable range is the "entire drawing", a "portion (with conditions)", or the like and a UI for inputting conditions, and may receive a selection from the user. Here, the condition is a condition for narrowing down the element groups to be subjected to the change process from among registered element groups, such as "element groups with a tank upstream (in the same element group)" or "element groups with a setting value of - - -". In the example in FIG. 8, the options are "change here only"

(only the selected 21), "change with conditions", and "change entire drawing". When "change with conditions" is selected, a condition such as "element groups with a tank upstream" is set by a non-illustrated condition setting screen. When the user selects a condition, the controller 11 may display information on the quantity, such as "15 locations in entire drawing" and "one location corresponding to set condition", as well as other information such as information on the positional distribution of the locations.

In response to a user 201 designating a location in the drawing for performing a process (such as a change) while not being aware that the location to be processed has already been registered (detected) as an element group, the controller 11 may display that the location is an already-registered element group. The controller 11 may display the message "already registered (retrieved)" or the number assigned at the time of registration, or may display the corresponding location in the drawing in a different manner than other locations. The controller 11 may display information such as the number of element groups in the drawing. In the case of the element group being unregistered, the controller 11 may display a message such as "unregistered" as information to make the user aware, or may promptly retrieve element groups from the drawing and display information on the corresponding element groups (positions in the drawing and number). In addition, the user 201 may be permitted to select, at the time of change, whether to change only an individual location designated by the user 201, to change predetermined locations in the drawing, or to perform a batch change on the entire drawing.

(Operating Procedures)

Figure 9C:
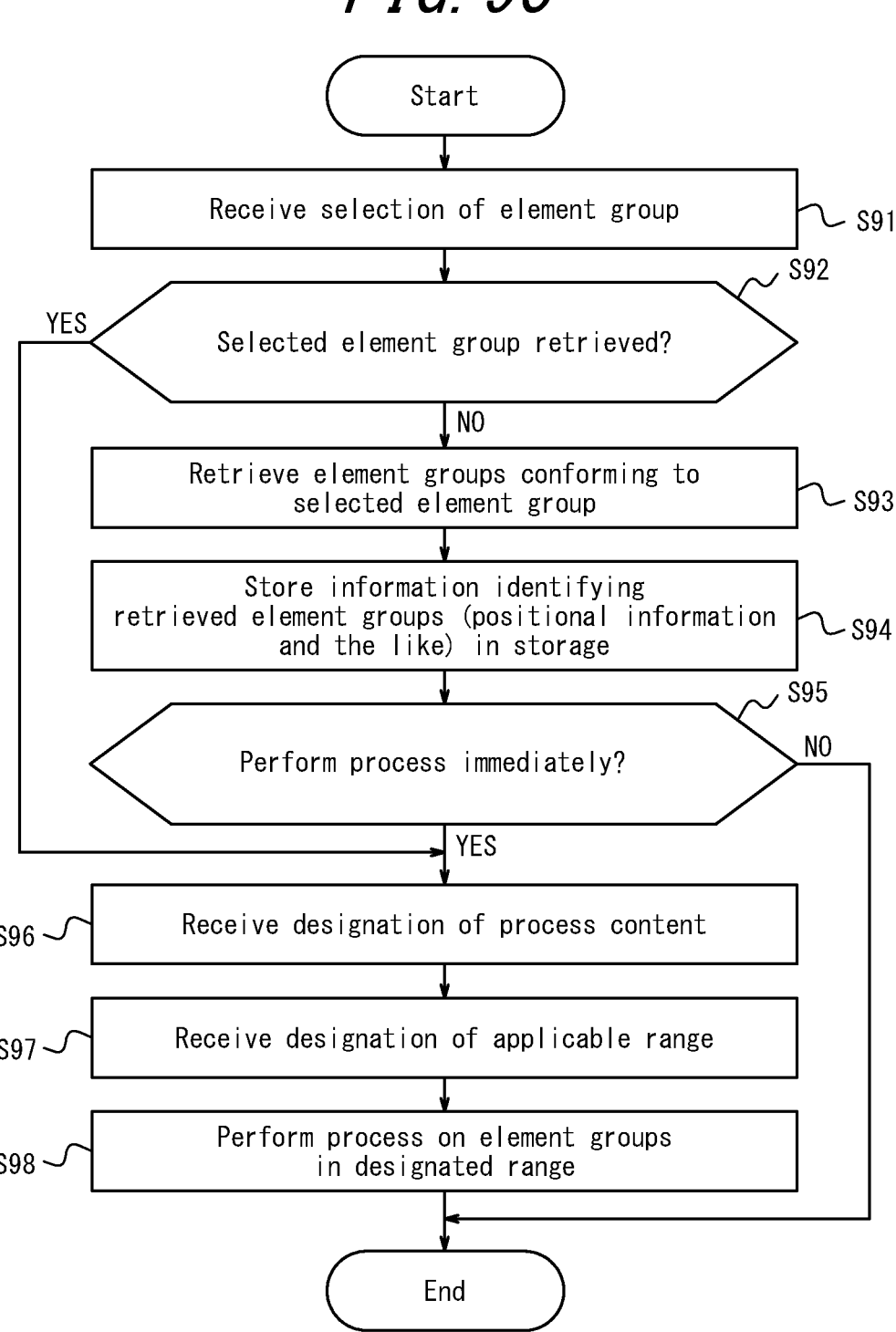
FIG. 9C is a flowchart illustrating example operations of the information processing apparatus according to an embodiment of the present disclosure.

Next, with reference to FIGS. 9A to 9C, operations of the information processing apparatus 10 will be described. The operations of the information processing apparatus 10 described with reference to FIGS. 9A to 9C correspond to an information processing method according to the present embodiment, and the operation of each step is performed based on control by the controller 11. FIGS. 9A to 9C are flowcharts illustrating example operations of the information processing apparatus 10 according to an embodiment of the present disclosure.

In step S11, the controller 11 receives a designation from the user of an element group (search element group) to be processed in the drawing. In the case of the search element group being an unretrieved element group that is designated for the first time and is not yet stored in the storage 12, the element group needs to be newly retrieved from the drawing. The case of the search element group already having been designated, retrieved, and stored in the storage 12 is described in step S4 of FIG. 9B.

In step S12, the controller 11 retrieves element groups in the drawing that conform to the search element group designated by the user. The element groups may, for example, be retrieved by the method described in the first embodiment.

In step S13, the controller 11 retrieves from the drawing element groups that conform to the search element group designated by the user and stores information identifying the element groups (for example, positional information identifying their respective positions in the drawing) in the storage 12. If no further processing is to be performed immediately, the controller 11 may terminate the process of the flowchart at this point. The element groups stored in the storage 12 can be recalled and used when further processing is necessary. The processing up to this point is for retrieval from the drawing of unretrieved element groups. In the case of performing a process on retrieved element groups, the process is performed according to the flow of FIG. 9B. If time has passed since the process of FIG. 9A, the process may be performed starting from S14 (element group selection) of FIG. 9B. On the other hand, if the element groups selected and retrieved in FIG. 9A are to be processed as is, it suffices to perform the process from S15 of FIG. 9B onward, since the element groups have already been selected.

In step S14, the controller 11 receives a designation from the user of an element group to be processed in the drawing. If the element group has previously been retrieved (retrieval results stored in the storage 12), the controller 11 notifies the user by displaying on the display 15 that the element group is a registered (retrieved and stored) element group in response to the designation of the element group. The controller 11 may display the corresponding element group in a different manner from other element groups in the drawing. Alternatively, the controller 11 may display the text information "retrieved (registered) element group", or a mark, for the corresponding element group on the drawing, or in a menu, operation screen, or the like outside the drawing. If the element group designated here as the processing target has not yet been retrieved, the retrieval process of FIG. 9A is performed. It suffices to perform the process from step S12 onward at this time, since the element group has already been designated.

In step S15, if element groups have been retrieved, the controller 11 receives a designation of the content of a process for the selected element groups from the user. The process for the element groups is to change, correct, replace with a different element group, convert to a different data format, or the like. Examples of the process include a process to replace all or some of the elements in the element group with at least one element selected by the user, a process to change the types and/or arrangement of the elements, and a process to change the attribute information for at least one of the elements.

In step S16, the controller 11 receives a designation from the user of a range over which the process is to be applied. The controller 11 may, for example, receive a selection of any of the following (1) to (3) as the applicable range.

(1) If the user designates the entire drawing, all the element groups in the drawing that conform to the element group selected in step S11 or S14 are processing targets. For example, if a certain element group is found at 100 locations in the drawing, all of the element groups at the 100 locations become processing targets. The "change entire drawing" in FIG. 8 is an example of (1).

(2) If the user wishes to perform the process on an element group in multiple locations in a batch, but the target to be processed is only a portion of the element groups among the element groups in the drawing that conform to the element group selected in step S11 or S14, the user sets conditions to designate the applicable range of the process. For example, the user may select only the drawing currently displayed on the screen or a range of applicable drawings from the screen, or the user may designate only the element groups that meet a specific condition (for example, element groups with a tank upstream), so that the process is applied only to the designated range. In this case, if the number of element groups to be processed is X, then $1 < X < 100$. The "change with conditions" in FIG. 8 is an example of (2).

(3) The process can also be performed on only one location, i.e. only on the element group selected on the drawing by a touch on the touch panel or by designation with the cursor. In this case, the number of element groups to be processed is 1. The "change here only" in FIG. 8 is an example of (3). In any of cases (1) to (3), as illustrated in the drawings, assistance for user designation of the range selection may be provided by a user interface (UI). While an element group is selected, options for the range over which the process is to be applied may be displayed to prompt the user to make a selection. The user may be prompted to designate a range by inputting a setting. Examples of the UI are illustrated in 39 of FIGS. 6 and 81 of FIG. 8.

In step S17, the controller 11 performs the process designated in step S16 in a batch on each element group in the applicable range designated in step S16. For example, if (1) is selected in step S16, the controller 11 performs the process on all the element groups in the drawing that conform to the element group selected in step S11 or S14. If (2) or (3) is selected in step S16, the controller 11 performs processing only for the corresponding element groups. The controller 11 then terminates the process of the flowchart.

In the above description of the operations of the controller 11, the flowcharts are divided into FIGS. 9A and 9B, but these flowcharts may be used as a single flow (operation) with a determination process added. That is, when receiving the selection of an element group in step S14, the controller 11 may determine whether the element group has been retrieved, proceed to S15 if the element group has been retrieved, and perform the process from S12 onward if not. When the process is continued in S13, the designation of the processing content is received in S15, whereas when the process is not continued immediately, the process may be terminated at S13. An example of a processing flow including such a determination process is illustrated in FIG. 9C. In FIG. 9C, the process of step S91 is the same as that of step S11 in FIG. 9A and step S14 in FIG. 9B. In step S92, the controller 11 determines whether the selected element group has been previously retrieved. If the element group has been retrieved (YES in step S92), the controller 11 proceeds to step S96, whereas if not (NO in step S92), the controller 11 proceeds to step S93. The process of step S93 and step S94 is the same as that of step S12 and step S13 of FIG. 9A. In step S95, the controller 11 determines whether the process is to be performed immediately. The controller 11 may, for example, determine that the process is to be performed immediately if an instruction is received from the user within a certain time after the process of step S94 is performed. In the case of performing the process immediately (YES in step S95), the controller 11 proceeds to step S96, whereas the controller 11 terminates the process otherwise (NO in step S95). The process of step S96 to step S98 is the same as that of step S15 to step S17 of FIG. 9B. After completing the process of step S98, the controller 11 ends the process of the flowchart.

As described above, the information processing apparatus 10 performs the user-selected process on each element group in the plurality of identical element groups in the drawing, and can thereby perform the same process on each element group in a batch with a simple operation. In addition, the information processing apparatus 10 performs the process on each element group included in the plurality of element groups in response to receipt of the selection of the processing for any of the element groups included in the plurality of element groups. Therefore, the information processing apparatus 10 can perform the common process on all the element groups included in the plurality of element groups without omission.

The information processing apparatus 10 receives the selection of any process, such as batch replacement of an element group (the element group itself or a portion of the elements in the element group), batch change of the types and/or arrangement of the elements, batch change of attribute information on the elements, or the like as the common process, thereby enabling the user to have the desired process performed efficiently. The information processing apparatus 10 may display the plurality of element groups that are subject to the common process on the display 15 in a manner different from the elements that are not included in the plurality of element groups. In other words, the controller 11 highlights the display so that the positions of the element groups can be easily identified in the drawing. For example, the controller 11 may highlight the display by changing the color or line type, by adding a symbol, or by a combination of these. Therefore, the user can easily confirm the element groups that are the target of the common process to be performed in a batch. Furthermore, the information processing apparatus 10 may acquire a plurality of element groups by retrieving from the drawing the element groups that conform to a search element group for which a selection is received from the user. The information processing apparatus 10 is thereby capable of automatically acquiring the plurality of element groups to be subjected to the common process in a batch.

The above processes (group replacement and setting change processes) may be executed by the user sequentially designating "change/replace this group (element group) with this content" or the like. The information processing apparatus 10 may instead detect that a registered group has been changed by an authorized person and automatically reflect the change. Alternatively, the information processing apparatus 10 may periodically perform processing at each predetermined period of time based on changes made by each authorized person.

Third Embodiment

The present embodiment describes a configuration in which not only completely identical element groups but also partially different element groups are automatically retrieved as element groups conforming to a search element group selected by a user, are classified based on the difference from the search element group, and are stored in the storage 12. According to the configuration of the present embodiment, the user can easily extract defective or deficient elements. The same reference signs are attached to configurations in common with the first embodiment, and a detailed description is omitted.

The information processing apparatus 10 of the present embodiment also retrieves element groups that are partially different from the search element group as element groups conforming to the search element group. That is, in the configuration of the first embodiment, although attribute conditions and the like that should match can be set by user settings, in principle, the targets for retrieval are only element groups that are completely identical to the selected element group. However, if some attribute settings are omitted or include mistakes due to user error or the like, some conditions may not match even for element groups that are in fact identical, and element groups that should be retrieved might not be retrieved. The information processing apparatus 10 of the present embodiment detects such element groups without omission. In the case of omissions from the retrieval, the number of element groups that actually exist in the drawing and the number of detected element groups (which should have been retrieved) do not match, resulting in retrieval omissions and leaving element groups containing errors and deficiencies in the drawing. Extracting the omissions individually by hand, or finding and correcting errors, is a very laborious operation, so the present embodiment is for eliminating the labor of correction while performing detection without omissions. Accordingly, the aforementioned "partially different element groups" are element groups with minor differences from the search element group, and do not include element groups that have major differences and should be evaluated as being a different element group. A minor difference from the search element group is assumed to be a difference in the attribute information or element notation. Specific examples of element groups that partially differ are provided below.

Figure 10:
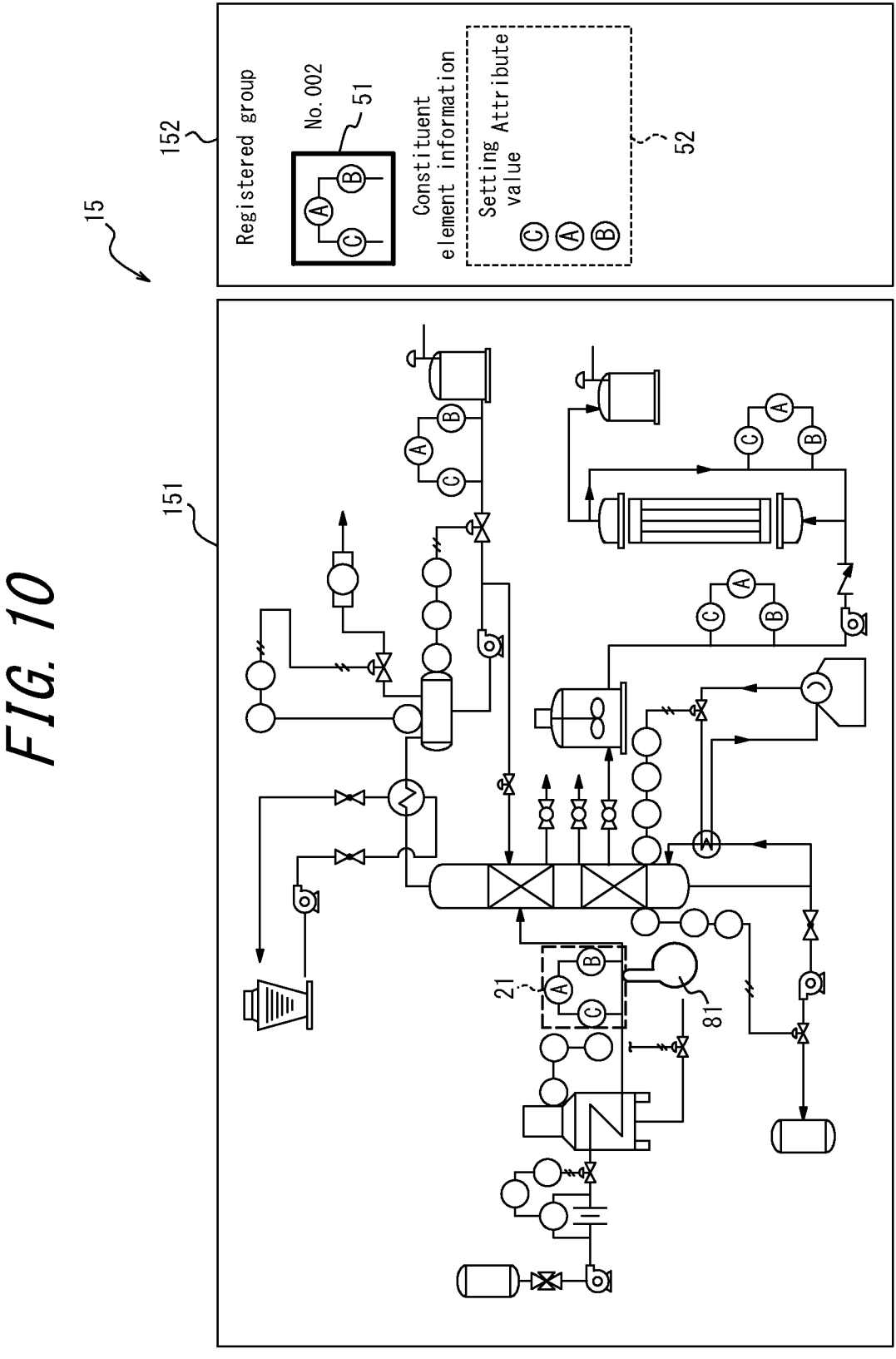
FIG. 10 is a diagram illustrating an example of a screen on a display connected to the information processing apparatus.

FIGS. 10 to 15 are diagrams illustrating examples of screens on the display 15 connected to the information processing apparatus 10. FIG. 10 illustrates an example in which a user 201 selects a region 21 in the drawing by a touch operation or the like, and an element group (group) formed by an element C, an element A, and an element B is selected. As in the first embodiment, the selection of the element group may be performed by a cursor movement operation by a pointing device or the like, instead of a touch operation on the touch panel.

In response to the user 201 selecting the region 21 to select an element group, the controller 11 of the information processing apparatus 10 treats the element group as a search element group, and retrieves element groups that conform to the search element group from the drawing. The controller 11 retrieves from the drawing not only element groups that are identical to the search element group but also element groups that are likely to be identical but are partially different from the search element group. At this time, the controller 11 may also store information indicating the nature of the difference (differences). If only element groups that are completely the same as the search element group are retrieval targets, element groups that are actually the same (a retrieval target) may be determined to be different element groups due to a mistake, an omitted setting, a defect in a portion of the drawing, or the like. Element groups that should be retrieved may thus be omitted. The information processing apparatus 10 according to the present embodiment addresses such a problem by including not only completely identical element groups but also partially different element groups as element groups conforming to the search element group. The controller 11 displays the retrieved element groups on the display 15 in correspondence with the positions on the drawing.

Figure 11:
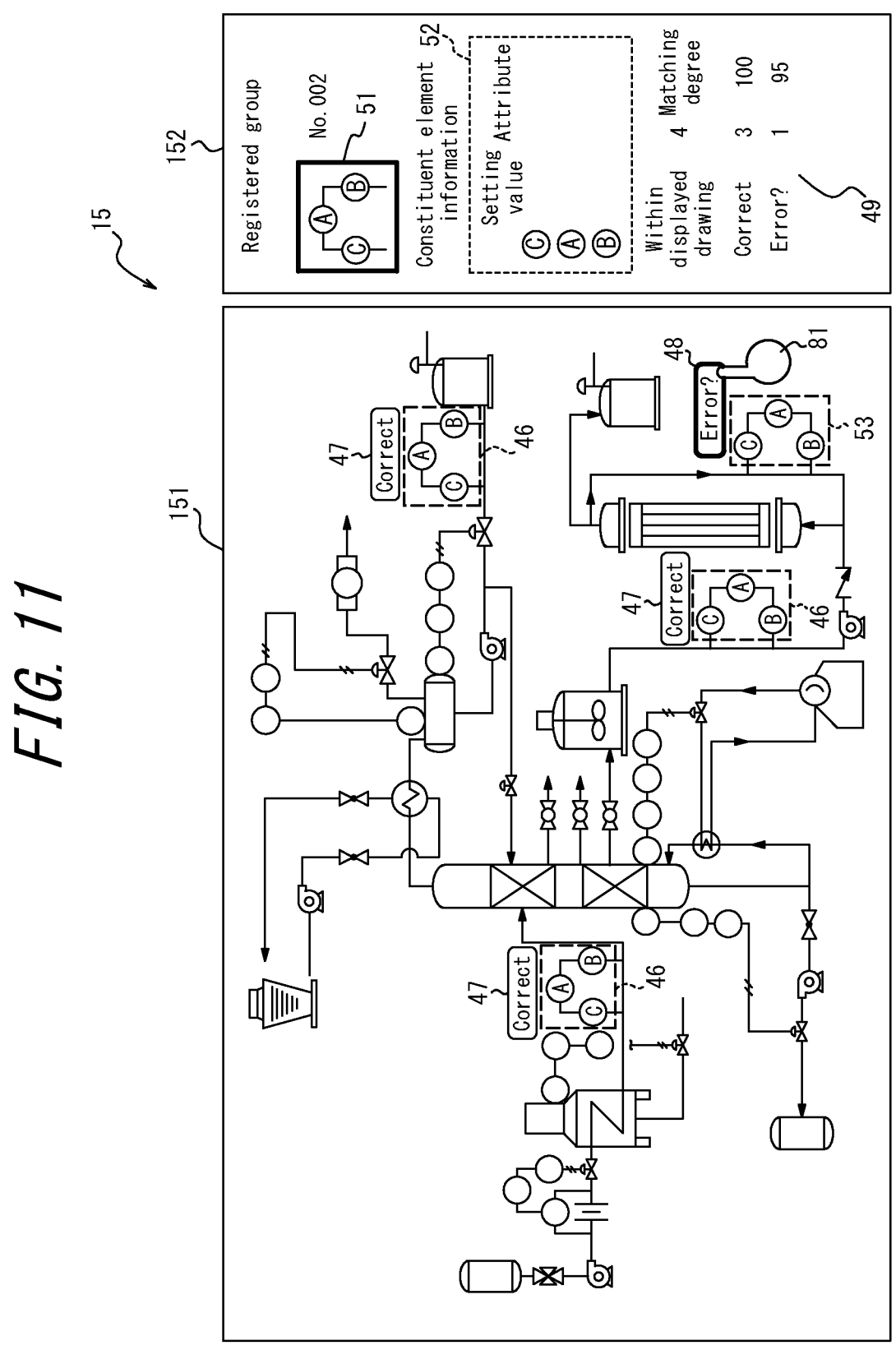
FIG. 11 is a diagram illustrating an example of a screen on a display connected to the information processing apparatus.

FIG. 11 illustrates a screen with the retrieval results. The element group 46 is an element group that conforms to the search element group. The element group 46, which completely matches the search element group, has a "Correct" mark 47 attached nearby to indicate a complete match. The element group 53, which partially does not match the search element group, has an "Error?" mark 48 attached nearby to indicate a non-complete match with the search element group. As described below with reference to FIG. 12, the model number of the element B in the element group 53 differs from that of the element B in the search element group. The "Error?" mark 48 is therefore attached near the element group 53. The number of retrieved element groups corresponding to "Correct", and the number of elements corresponding to "Error?" along with a numerical value indicating the matching degree, are displayed in the display area 49. The "Error?" mark 48 may be displayed with a different color, line type, and the like than the "Correct"

mark 47. In the example in FIG. 11, the marks are used to distinguish between the element group 46 and the element group 53, which are highlighted with the same line type (dashed line), but the method of displaying these element groups may be changed to distinguish between them. The above example is not limiting, and a variety of expressions or symbols distinguishing between two types of element groups, i.e. a non-problematic element group that matches the search element group completely, and an element group that is thought to be the same as the search element group though partially differing, may be used.

Figure 12:
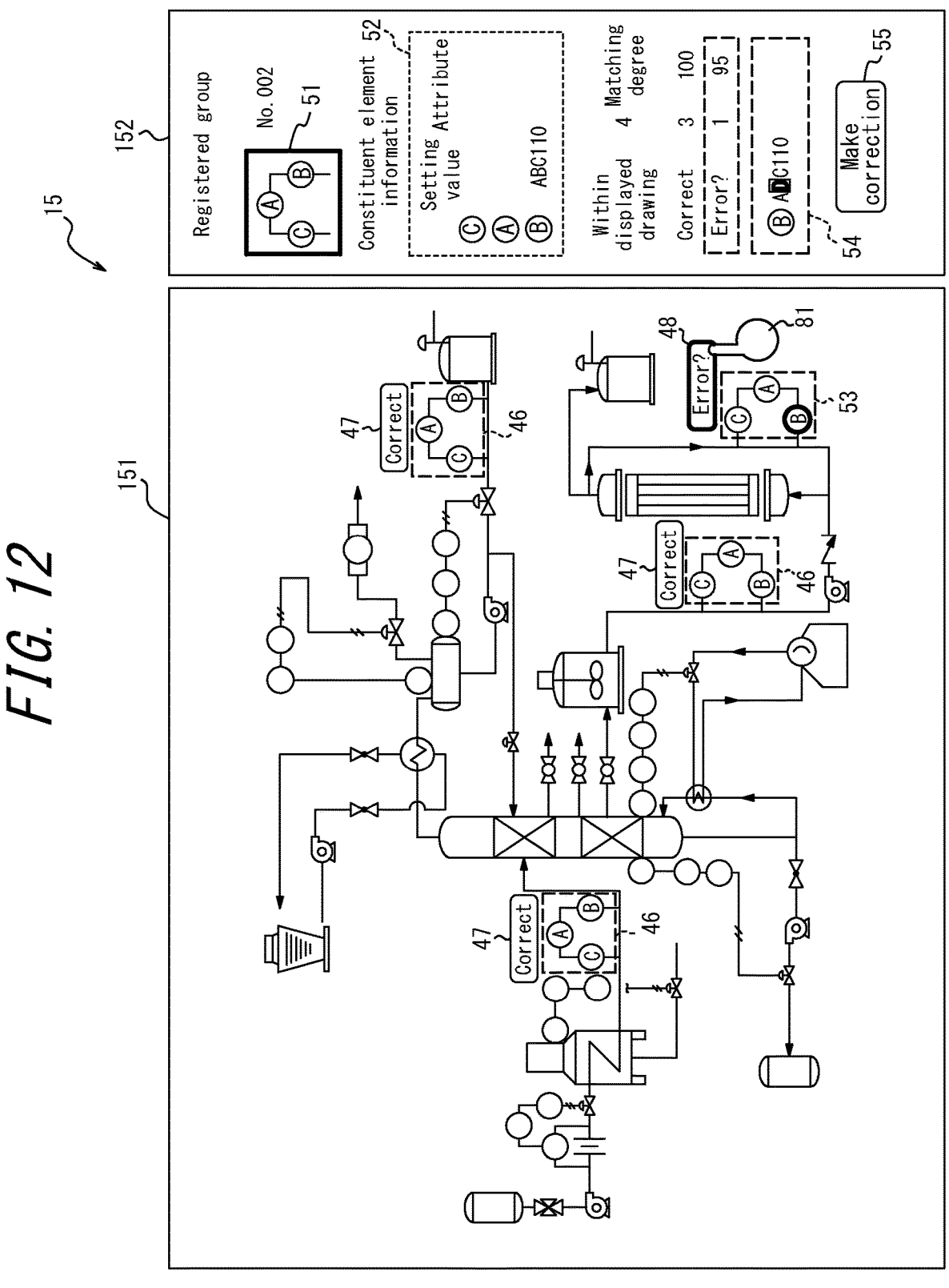
FIG. 12 is a diagram illustrating an example of a screen on a display connected to the information processing apparatus.

In response to the selection of the "Error?" mark 48 by the user, the information processing apparatus 10 displays the content of the difference between the element group and the search element group on the display 15. In FIG. 12, the graphic of the element B in the element group 53 is displayed in a different color, line type, or the like from the other elements to indicate that the element B does not completely match the search element group. More detailed information is displayed in the display area 152. In the example in FIG. 12, the model number of the element B of the element group 53 is different from that of the element B in the search element group. The search element group is displayed in the display area 51. The model number "ABC110" of the element B in the search element group is indicated in the display area 52. The model number "ADC110" of the element B in the element group 53 is indicated in the display area 54, and by the second character "D" of the model number being highlighted, that character is displayed as being different from the search element group. A "Make correction" button 55 is displayed at the bottom of the display area 152 to enable the user to select a correction instruction. The user confirms this information and makes a correction based on the fact that the model number "ADC110" does not exist or is a mistake for ABC110. The information processing apparatus 10 correct the model number "ADC110" of the element B in the element group 53 to the model number "ABC110" of the element B included in the search element group in response to the selection (execution) of the button 55 by the user 201.

Figure 13:
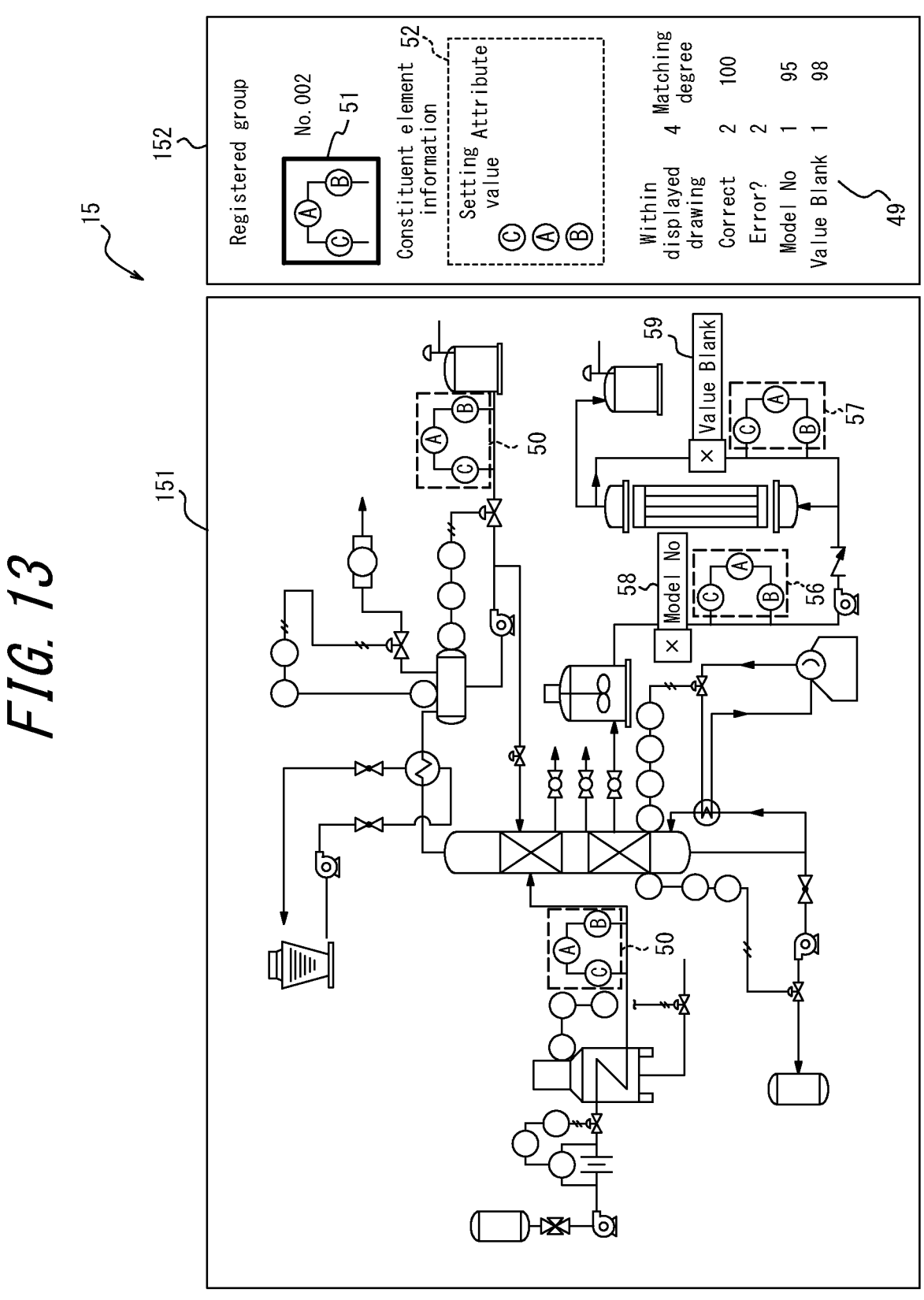
FIG. 13 is a diagram illustrating an example of a screen on a display connected to the information processing apparatus.

FIG. 13 illustrates an example of the display when the element group 56 and the element group 57 do not completely match the search element group. The model number of the element B in the element group 56 is different from that of the element B in the search element group. Therefore, a "Model No." mark 58 is displayed near the element group 56 to indicate that the model number is different from that of the search element group. The difference from the element B of the search element group is that no value has been set for the element B of the element group 57. Therefore, a "Value Blank" mark 59 is displayed near the element group 57 to indicate that no value has been set. Such a display indicates that the controller 11 has not determined that the element group appearing to be the same element group (but with a partial difference) is a different group due to the difference from the search element group, but rather has extracted the element group as an identical element group (candidate), and enables the user to recognize "what the difference is" without the need for a special operation or the like.

Figure 14:
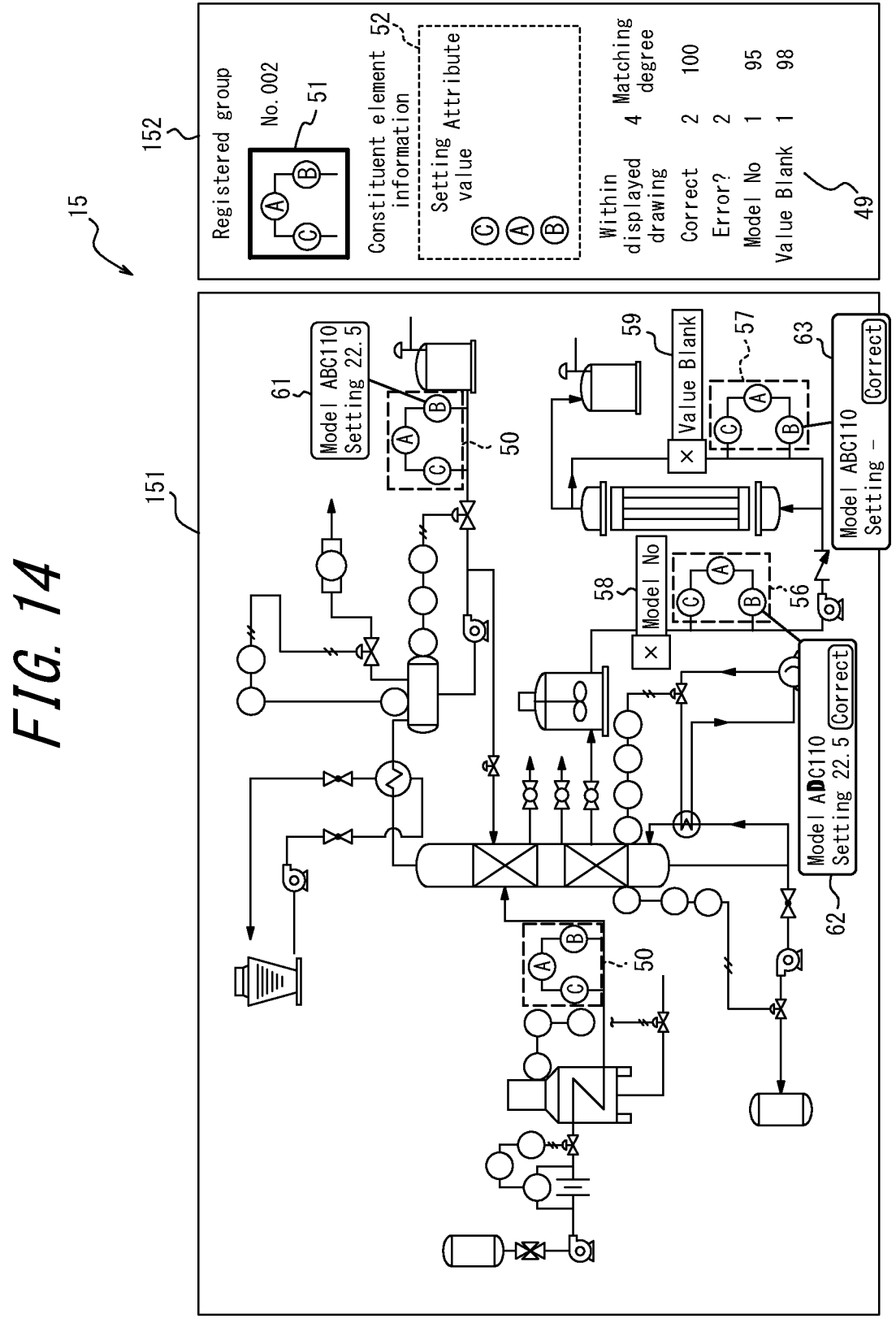
FIG. 14 is a diagram illustrating an example of a screen on a display connected to the information processing apparatus.

FIG. 14 illustrates an example in which the content that does not match between the element groups 56 and 57 and the search element group is displayed in correspondence with each element group. Since the element group 46 completely matches the search element group, there is no display indicating an abnormality (a difference from the search element group), and the correct model number and setting value are displayed in an accompanying image 61. A "Model No." mark 58 indicating that the model number is different from that of the search element group and an image 62 indicating the content of the attribute information set for the element group are displayed for the element group 56. A "Value Blank" mark 59 indicating that the value set for the search element group is blank in the element group and an image 63 indicating the content of the attribute information set for the element group are displayed for the element group 57.

The images 62 and 63 respectively display the model number of an element that does not completely match the search element group, the content set in the setting value, and a "Correct" button for correcting these values. The image 62 displays the model number "ADC110" of the element B in the element group 53, and the letter D, which is the difference from the search element group, is highlighted. The image 63 displays that no value has been set for the element B of the element group 57. Therefore, the user 201 can confirm whether the element groups 56 and 57 do not completely match the search element group in any respect by referring to the images 61, 62, and 63 and comparing the settings of each element group with each other. In addition, after confirmation, the user 201 can select (execute) the "Correct" button to correct these values to be the same as the search element group (a completely matching element group) or to be any value. The information processing apparatus 10 may, in response to the user 201 selecting (executing) the "Correct" button, correct only that element or correct, in a batch, all elements that do not completely match the search element group.

Only two attribute items are displayed in the images for the sake of illustration, but when a large number of items exist, such as when a dozen or several dozen items exist, the controller 11 may provide a correction button for each item so that correction can be made for each item. Alternatively, as illustrated in FIG. 14, the controller 11 may allow all items to be corrected at once with a single correction button. The controller 11 may display a plurality of buttons to "correct only specific item", "correct all in a batch", and the like, so that the user can select and execute one of the buttons.

The controller 11 may extract, from a large number of attribute items, only those items that differ from the search element group in a certain element group, and display the items in the images 62 and 63. Such processing enables the user to promptly recognize the items that are different even when a large number of items exist, and prevents the display of the drawing itself from being blocked by the display of too much information regarding the element group. In other words, the visibility of information can be improved.

Figure 15:
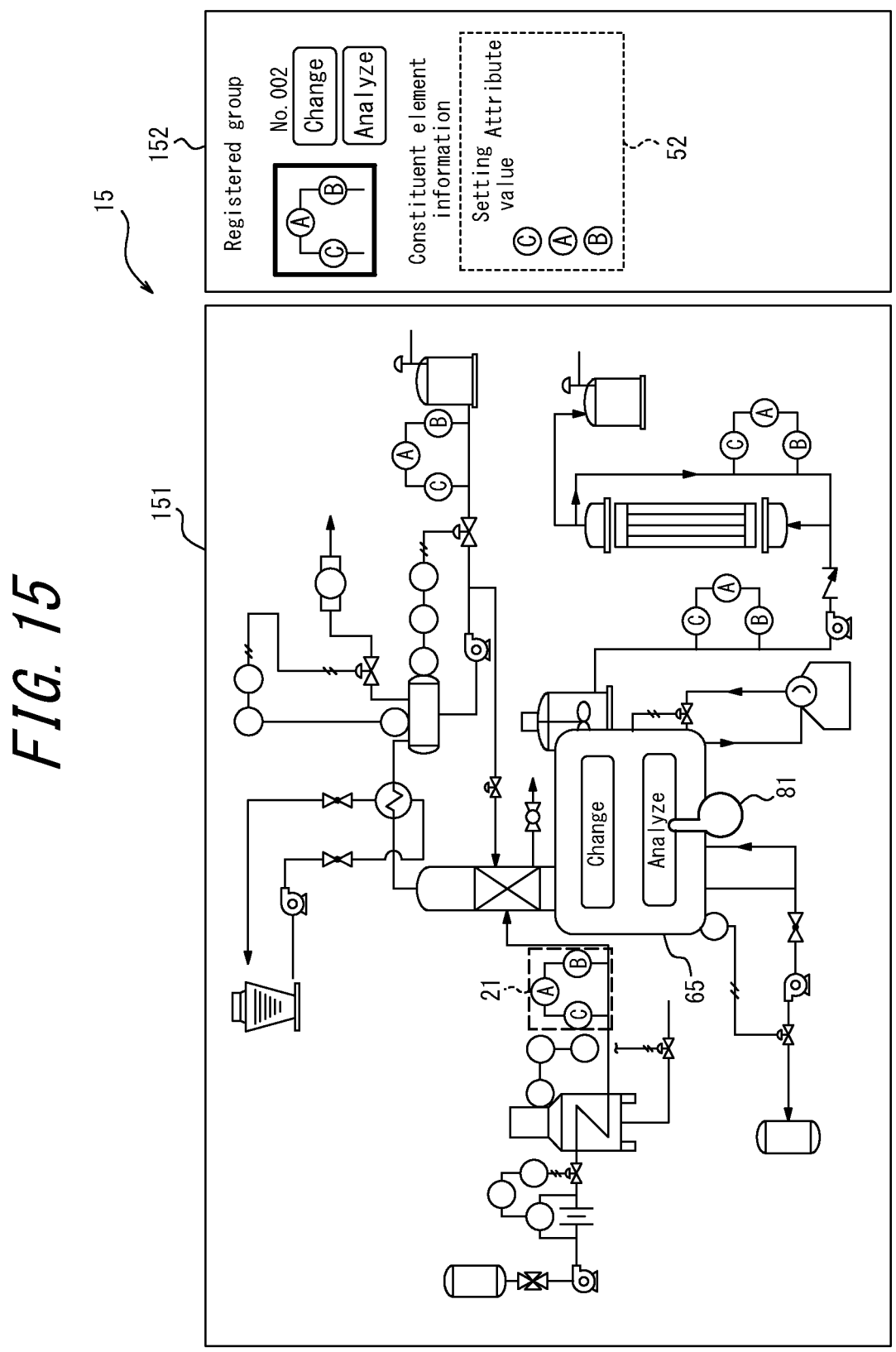
FIG. 15 is a diagram illustrating an example of a screen on a display connected to the information processing apparatus.

The information processing apparatus 10 may classify the retrieved element groups by difference as a set of identical element groups (including those that are likely to be identical) based on the difference from the search element group, store the set in the storage 12, and display the retrieved element groups on the display 15 so that the classification based on the difference can be identified. The information processing apparatus 10 of the present embodiment displays a screen in which the retrieved element groups are classified based on the difference from the search element groups in response to receipt, from the user, of an instruction to "analyze" the retrieved element groups. FIG. 15 illustrates a case in which, in response to the selection of the region 21, an image 65 for selecting a process to be performed on the selected element group is displayed, and the "Analyze" button is selected by the user. In response to the selection (execution) of the "Analyze" button, the information processing apparatus 10 displays a screen in which the retrieved element groups are classified. The "Analyze" button is also displayed in the display area 152, and the information processing apparatus 10 also displays a screen in which the retrieved element groups are classified when the "Analyze" button in the display area 152 is selected.

Figure 16:
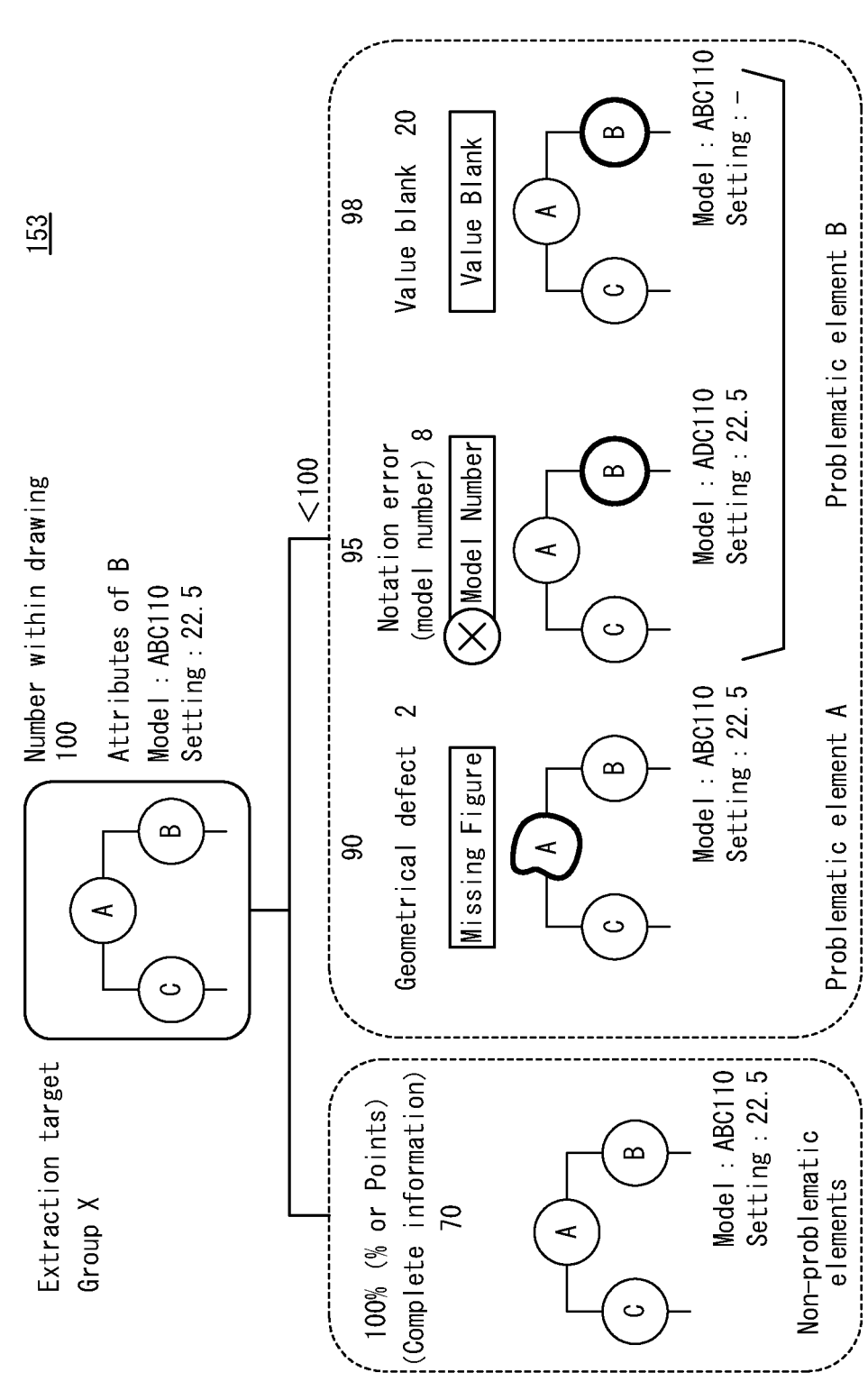
FIG. 16 is a diagram illustrating an example of an image indicating classification based on differences in element groups.

FIG. 16 is a diagram illustrating an example of an image 153 indicating classification based on differences in element groups. In the example in FIG. 16, the search element group is displayed as "Extraction Target Group X". One hundred element groups determined to conform to the search element group (including not only element groups that match completely, but also element groups that generally match but have some differing elements due to the aforementioned mistake, omitted setting, setting error, or the like) are retrieved from the drawing. The element B included in the search element group has the attribute values (attribute information) of "Model: ABC110" and "Setting value: 22.5".

In the example in FIG. 16, there are 70 element groups that completely match the search element group. Of the 100 element groups retrieved, the remaining 30 are classified into three types according to their differences from the search element group. In FIG. 16, there are 2 element groups for which the difference is a geometrical defect, 8 element groups for which the difference is a model number notation error, and 20 element groups for which the difference is that the setting value of the element is blank. The geometrical defect is a problem in the notation of the element (symbol), whereas the model number notation error and the setting value being blank are problems in the attribute information.

The geometrical defect is a distortion of the graphic indicating the element A. For example, the difference is classified as a geometrical defect when it is not possible to determine whether the outline of the symbol indicating the element A is a rectangle or a circle. Distortion of the figure can occur when, for example, the drawing was acquired by scanning. For example, a circular symbol might not be recognized as a circle as a result of no longer being a perfect circle, or being discontinuous, due to a problem with the original paper drawing, the intrusion of a foreign object, or line distortion in the scanning process. A model number notation error refers to the "model number" not matching the search element group due to miscommunication of information, an input error by the operator, or the like. A blank value refers to a value not having been set for the element. The user 201 can easily grasp the defective or deficient elements in the drawing at a glance by viewing the element groups that at least partially do not match the search element group and are displayed after classification based on the differences (i.e. element groups that should be identical to the search element group but are deficient).

Figure 17A:
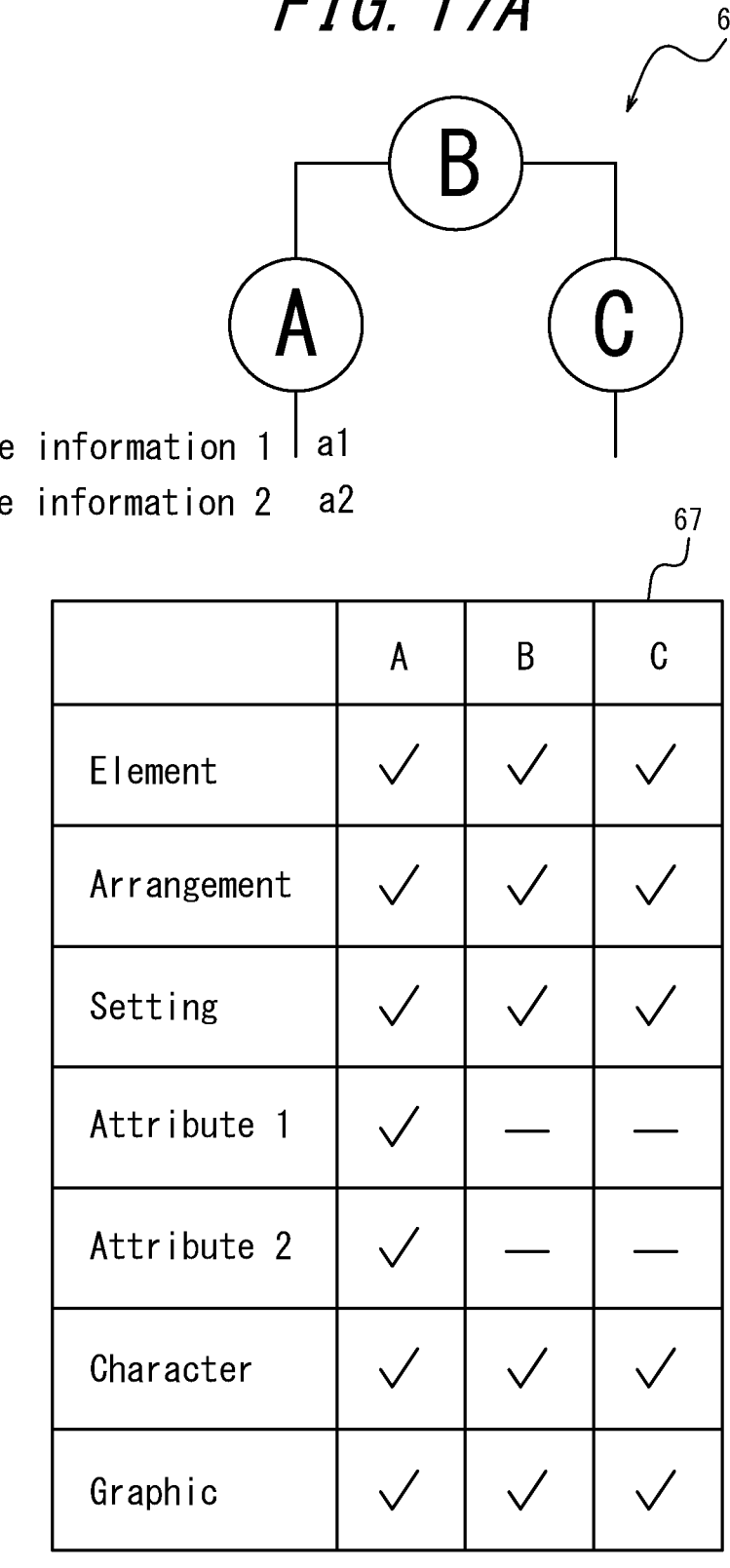
FIG. 17A is a diagram illustrating an example of classification items based on differences in element groups.
Figure 17B:
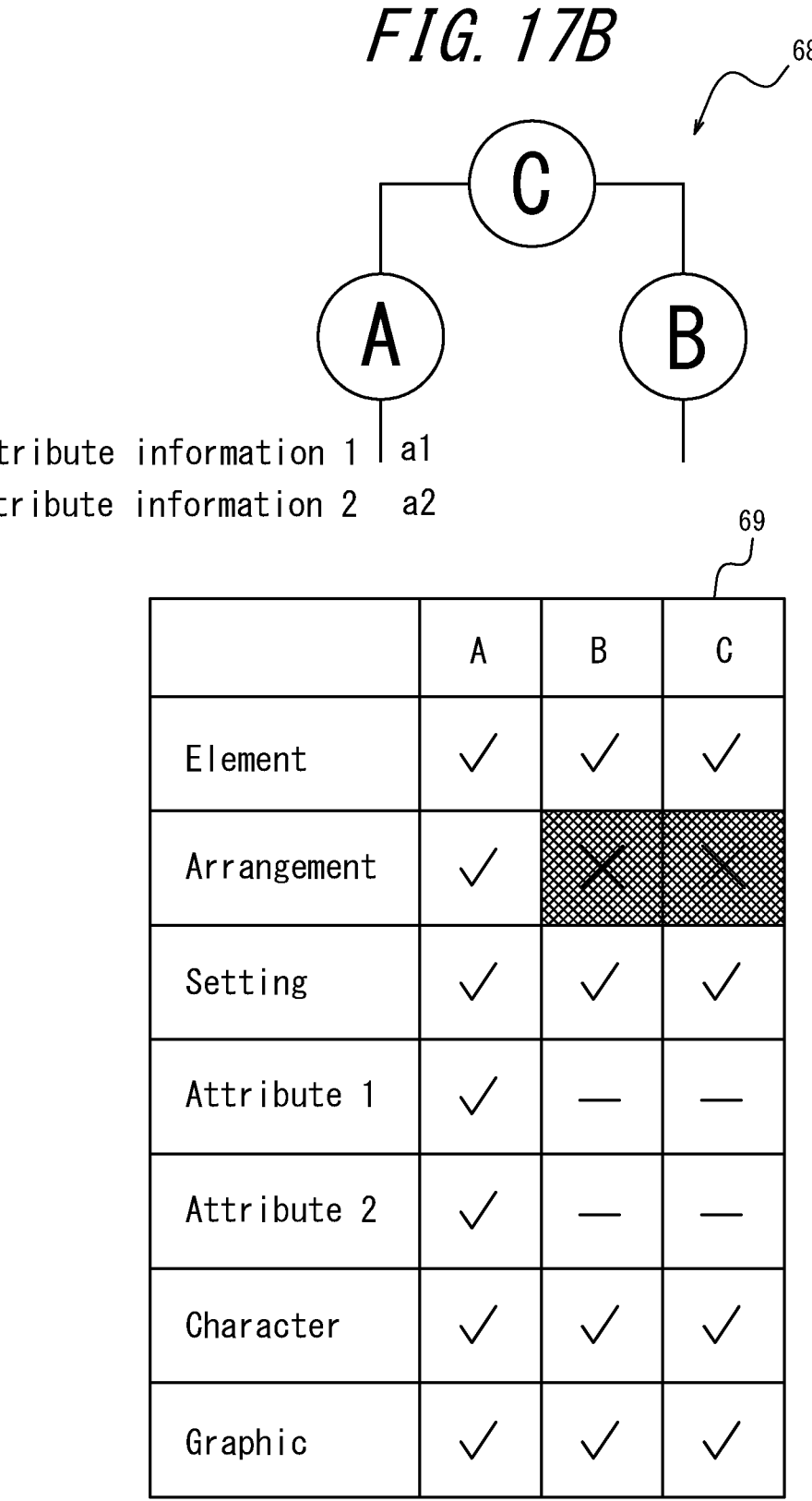
FIG. 17B is a diagram illustrating an example of classification items based on differences in element groups.
Figure 17C:
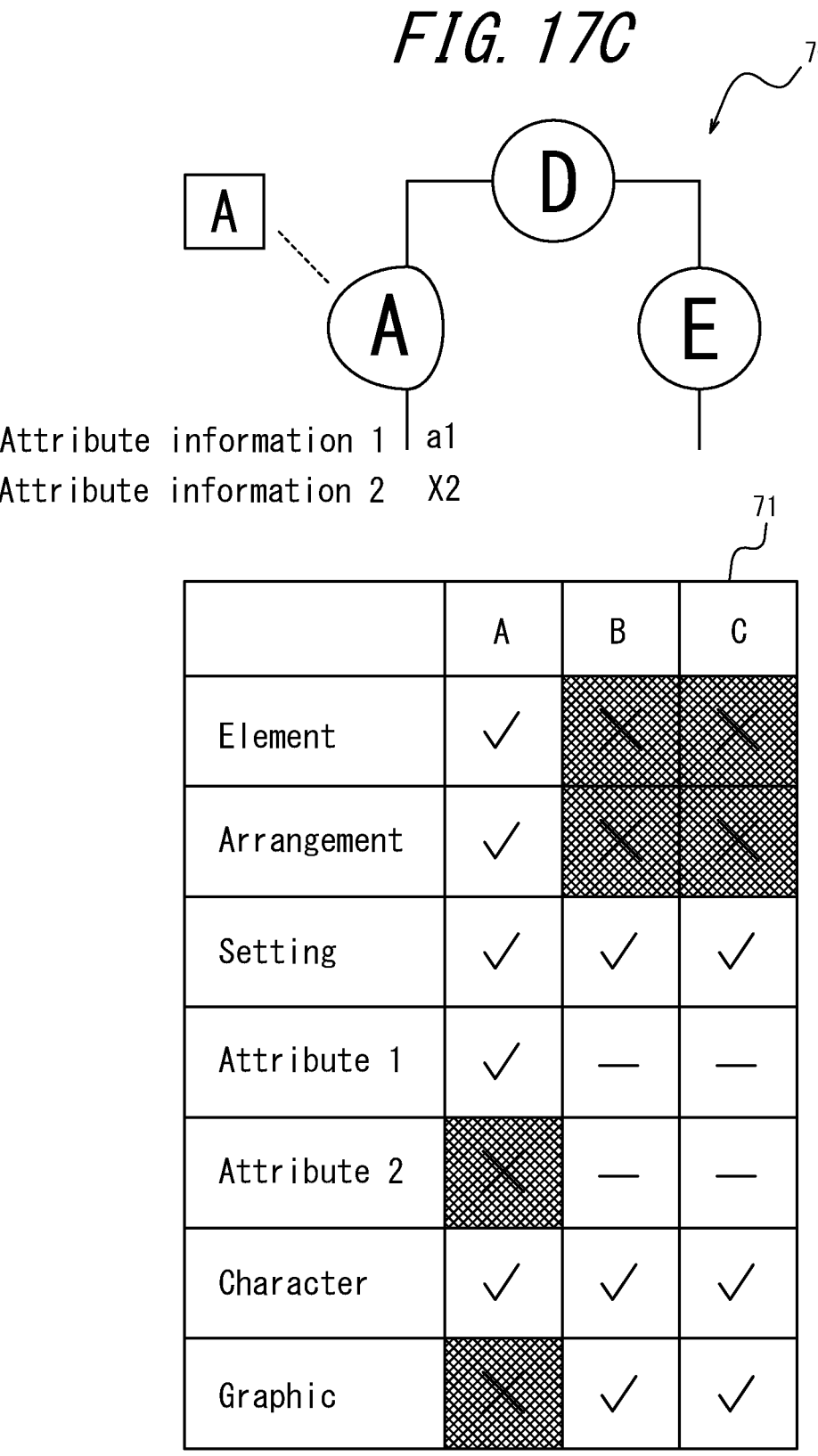
FIG. 17C is a diagram illustrating an example of classification items based on differences in element groups.

The information processing apparatus 10 may quantify and manage the matching degree (similarity), which is a numerical value indicating the degree of conformity with the search element group, of the element groups that are likely to be the same as the search element group but are partially different. The calculation of such a matching degree will be described with reference to FIGS. 17A to 17C and FIG. 18. FIGS. 17A to 17C are diagrams illustrating an example of classification items based on differences in element groups. In FIG. 17A, the element group 66 is an element group that completely matches the search element group. The element group 66 includes an element A, an element B, and an element C arranged in this order. Among the elements of the element group 66, the element A has attribute information 1

(attribute information a1) and attribute information 2 (attribute information a2). The table 67 illustrates that the element group 66 completely matches the search element group.

The element group 68 in FIG. 17B includes the same types of elements A, B, and C as the search element group, but the arrangement of the elements differs from the search element group in that the elements are included in the order of the element A, the element C, and the element B. The remaining content of the element group 68 matches the search element group. The table 69 illustrates the differences between the element group 68 and the search element group. The arrangement row for elements B and C does not match and is marked "X".

The element group 70 of FIG. 17C is formed by elements A, D, and E connected in this order. Although the element group 70 matches the search element group by including the element A, the type and arrangement of the elements differ in that the element group 70 does not include the elements B and C. The graphic and attribute information 2 of the element A in the element group 70 also differ from the search element group. The table 71 illustrates the differences between the element group 70 and the search element group. In FIG. 17C, items that do not match are indicated by "X".

The information processing apparatus 10 may calculate the matching degree by weighting each item related to a difference from the search element group, such as in Tables 67, 69, and 71. The matching degree may be calculated by rules for calculating the matching degree that are stored in the rule storage 122. When the elements forming the element group or the arrangement of the constituent elements differ from the search element group, the matching degree is lowered to 70%, 50%, 30%, etc. as the number of differences increases. When the matching degree is below a predetermined value (for example, 90%), the element group is in fact different from the search element group, and such an element group is not retrieved as an element that might be identical to the search element group.

The information processing apparatus 10 may score the differences according to the size of the degree of importance for determining the similarity or difference, such as −10 points for a different element and −0.5 points for attribute differences, and calculate the matching degree by adding the total negative score to 100 points. In this case, the number of points (points subtracted) is set high for items representing differences that have a large impact on the determination of the matching degree and is set low for items that have a small impact. The matching degree may also be displayed by other notations, such as a percentage. Instead of a point reduction method in which a complete match is 100 points, a numerical value may be calculated as the "degree of divergence", with the numerical value being 0 for a complete match and higher as the degree of divergence is higher.

FIG. 18 is a diagram illustrating an example of scoring based on differences in element groups. In FIG. 18, the "reference" indicates the content of the search element group. "1a" indicates an element group whose constituent elements, the arrangement thereof, and all setting values match the search element group. A matching degree of 100 points is calculated for "1a". Such an element group is evaluated as "completely identical" to the search element group. In the element group of "1b", the constituent elements, the arrangement thereof, and the attributes of element 1 (element C) and element 2 (element A) match the search element group, but the setting value of element 3 (element B) is different. The difference in the setting value of element 3 is evaluated as −2 points, and the matching degree of the element group "1b" is calculated as 98 points. Once the matching degree with the search element group is below a predetermined value (such as 90%), an element group should be evaluated as a different element. For an element group with a matching degree above a certain score (such as 90 points), however, it is suspected that an element group identical to the search element group was incorrectly described for some reason. Therefore, the element group is evaluated as "Error?", indicating that the element group is thought to be identical but contains errors. The element group "1b" is also evaluated as "Error?". The constituent elements, arrangement thereof, and attributes other than the device No. of element 3 match the search element group for the element group "1c", but the device No. of element 3 differs. The element group "1c" is calculated as having a matching degree of 95 points and is evaluated as "Error?". In the element group "2", the type of element 1 itself is different from the search element group, and in the element group "3", the arrangement of elements is different from the search element group. Therefore, these element groups are calculated as having a matching degree below 90 points and are evaluated as "Different". The information processing apparatus 10 may classify the retrieved element groups based on such a score.

(Operating Procedures)

Figure 19:
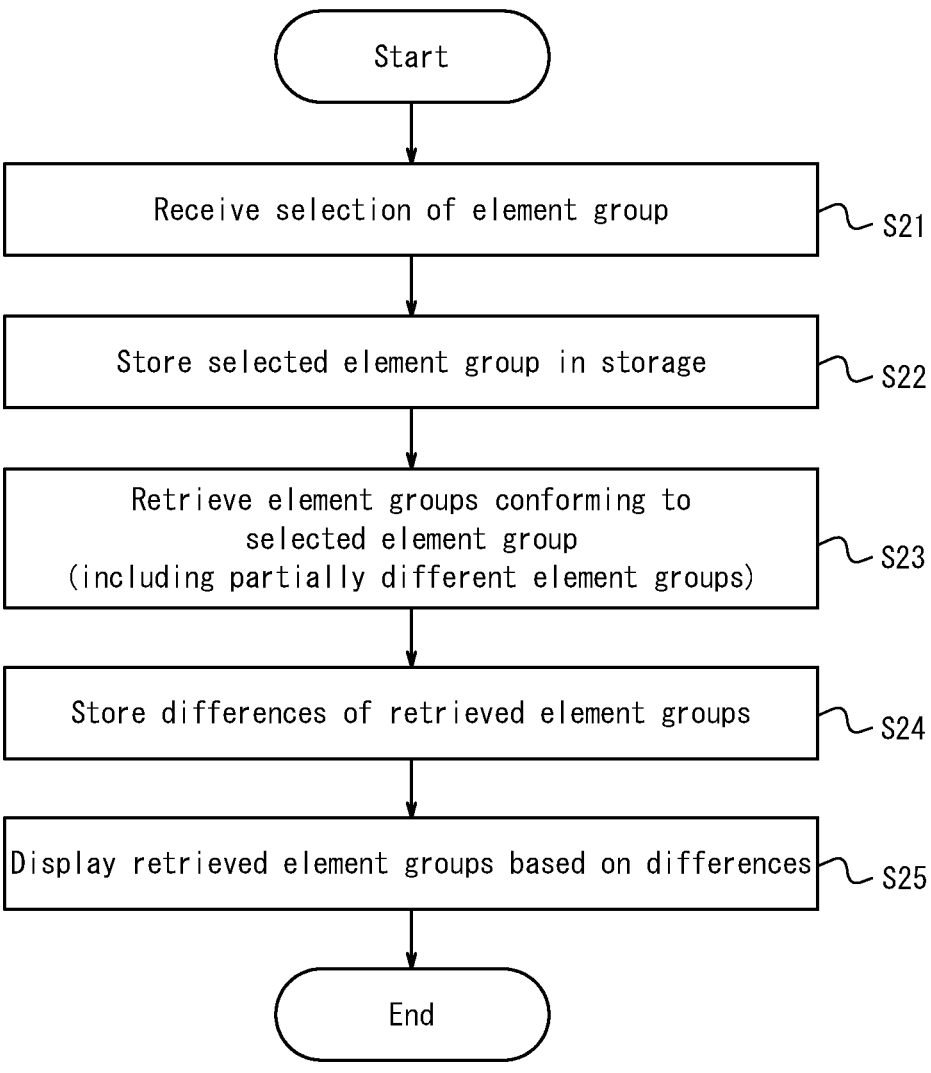
FIG. 19 is a flowchart illustrating example operations of the information processing apparatus according to an embodiment of the present disclosure.

Next, with reference to FIG. 19, operations of the information processing apparatus 10 will be described. The operations of the information processing apparatus 10 described with reference to FIG. 19 correspond to an information processing method according to the present embodiment, and the operation of each step is performed based on control by the controller 11. FIG. 19 is a flowchart illustrating example operations of the information processing apparatus 10 according to an embodiment of the present disclosure.

In step S21, the controller 11 receives from the user a selection of a search element group, which is an element group formed by one or more elements used in at least one drawing. The element groups may be acquired by retrieving the element group selected by the user, or by reading an element group stored in the storage 12, as described in the first embodiment.

In step S22, the controller 11 stores the selected element group in the storage 12. The controller 11 thereby registers the selected element group. This process is the same as step S2 in FIG. 5. When an element group stored in the storage 12 is read and used, this step is unnecessary.

In step S23, the controller 11 retrieves, from at least one drawing, element groups that conform to the search element group (including element groups that are thought to match but are partially different). The retrieval is performed using a rule stored in the rule storage 122.

In step S24, when the retrieved element group has a difference from the search element group, the controller 11 stores information on the difference from the search element group, i.e. information on which element is different, the differing content, and/or a numerical value (matching degree), together in association with positional information or the like in the storage 12. Items related to the differences are, for example, differences in notation, graphical deficiencies, missing data, typographical errors, incorrect numbers, or information not set.

In step S25, the controller 11 displays the retrieved element groups on the display 15 so that the classification of the element groups based on the differences can be identified. At this time, the controller 11 may display a character string and/or an image indicating the type of the difference on the display 15 for each classification of the retrieved element groups. The controller 11 then terminates the process.

As described above, the information processing apparatus 10 automatically retrieves not only element groups that match the search element group selected by the user 201, but also element groups that (most likely) match but are partially different from the search element group as the element groups that conform to the search element group. The information processing apparatus 10 then stores the element groups in the storage 12 based on the differences from the search element group (as they are or after classification as necessary). Accordingly, when the stored information is displayed, the user 201 can refer to the information on the differences or the result of classification based on the differences. Therefore, the user 201 can extract identical element groups without omission, including the content of defects or deficiencies. The information processing apparatus 10 also displays the retrieved element groups on the display 15 so that the differences, the classification based on the differences, the results of analysis, and the like can be identified. Therefore, by viewing element groups that are classified based on differences and displayed, and which (most likely) match the search element group but are partially different, the user 201 can easily grasp at a glance what the differences are, the degree of the matching (divergence), and the like, while detecting without omission defective or deficient element groups (elements in an element group) in the drawing. At this time, a character string and/or an image indicating the type of difference is displayed for each classification of the retrieved element groups. The user 201 can easily recognize how the retrieved element groups differ from the search element group and where the problem is by referring to the character string and/or image. Furthermore, the controller 11 associates the differences between the retrieved element groups and the search element with numerical values and classifies the retrieved element groups into sets of at least one element group based on the numerical values. The user 201 can therefore easily distinguish the differences from the search element group, i.e., whether there is a defect in the drawing, a mistake (incorrect input) in the information, a value that is blank, or the like, and can also easily confirm the conditions, a process for optimization by correction, and the like.

In the storage in S24 and/or the display in S25, the controller 11 may classify the retrieved element groups based on the differences. That is, the controller 11 may classify and display the retrieved element groups at the time of the display in S25 (automatically or according to conditions requested by the user) based on the differences stored in S24. Alternatively, the controller 11 may classify the element groups based on the differences in S24 and display the classified content at the time of display in S25. In the example in FIG. 10, the classification is largely divided between "complete match (Correct)" and "thought to be identical but has non-matching element (Error?)" based on whether there is a difference. In the example in FIG. 12, the differences themselves are displayed to be identifiable by symbols and other identifiers, color changes, or the like. In the example in FIG. 16, classification information based on the differences is displayed, such as whether there is a complete match or a difference, which items are different, the number of each item, and the result of quantifying the matching degree. Any one or more of these may be used alone or in combination. Furthermore, the retrieved element groups may be classified in advance and stored in the storage 12 by the controller 11, stored information may be classified at the time of display, or classification and analysis processes may be performed for both storage and display. The retrieved element groups may be classified focusing on either the differing items or the matching degree, or focusing on both.

For the retrieval in step S23, the controller 11 may receive a setting, from the user 201, of a retrieval condition for retrieving element groups that (most likely) match the search element group but partially differ, and then retrieve the element groups based on the setting. The user 201 can thereby set the desired search conditions according to the application and purpose.

The controller 11 may receive a selection from the user of a common process to be performed on each element group belonging to a set of processing targets, which is any set included in the sets of at least one element group, and perform the common process on each element group belonging to the set of processing targets. Specifically, the information processing apparatus 10 can perform a batch process by performing the same process as in the second embodiment. This enables the user 201 to perform the same process in a batch, with a simple operation, on each element group belonging to the set of processing targets, which is any set of element groups classified based on differences from the search element group. For example, the user 201 can perform batch error correction only on elements that are considered to be mistakes or errors. The information processing apparatus 10 may also receive a selection of a set of processing targets from among sets of at least one element group from the user. The user 201 can thereby select a set of targets for performing the same process in a batch.

Fourth Embodiment

In the present embodiment, a configuration is described in which a common element group is extracted from a plurality of element groups, and the element groups are arranged in a hierarchy so that the extracted element group belongs to a higher level than the plurality of element groups. According to the present embodiment, by performing operations based on the element group belonging to a higher level of the hierarchy, the user can perform operations more efficiently than when performing operations on each of the element groups in the lower level of the hierarchy separately. The same reference signs are attached to configurations in common with the first embodiment, and a detailed description is omitted.

Figure 20:
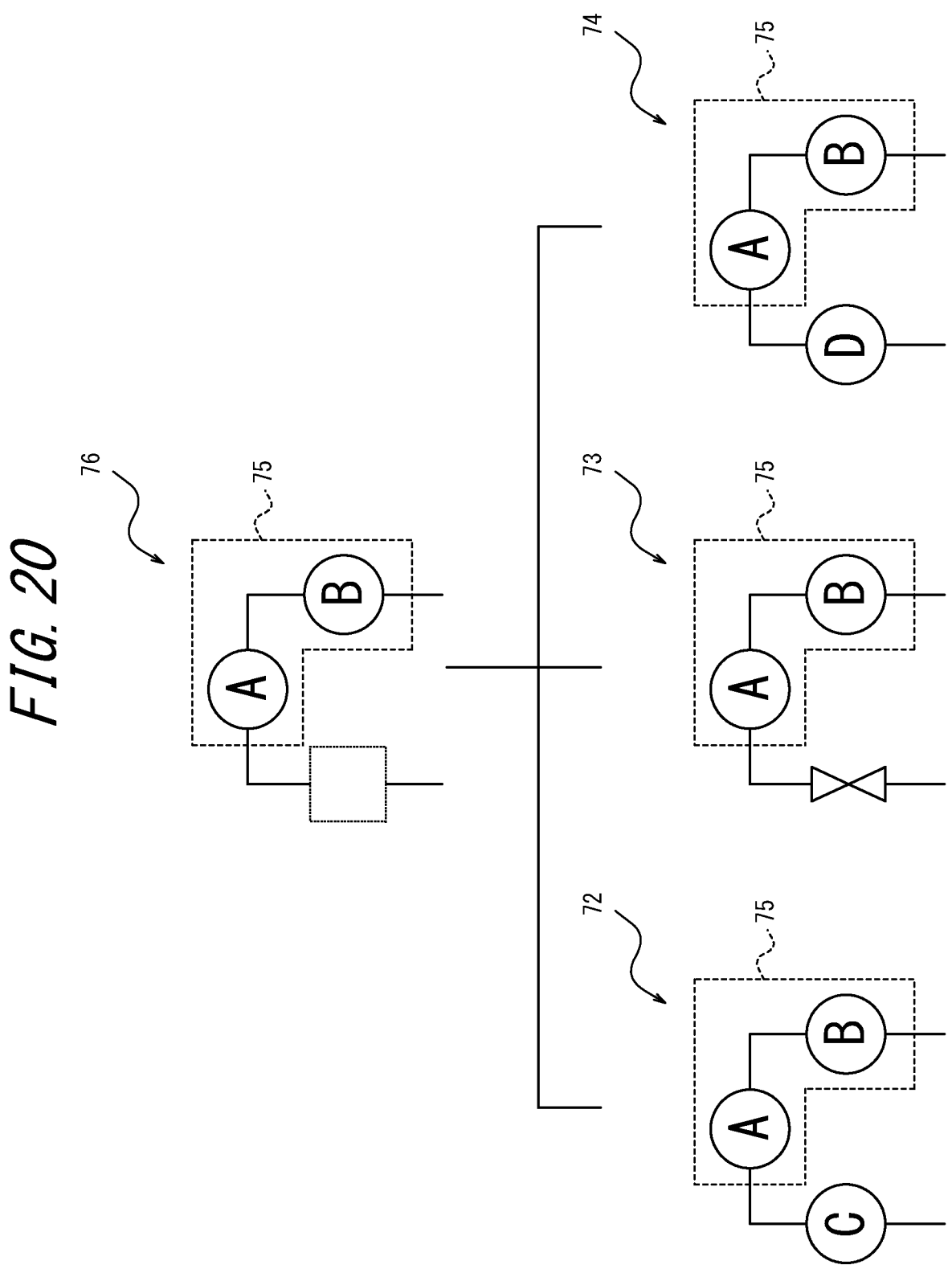
FIG. 20 is a diagram schematically illustrating element groups hierarchized based on an element group included in common.

FIG. 20 is a diagram schematically illustrating element groups hierarchized based on an element group included in common. In FIG. 20, an element group 72, an element group 73, and an element group 74 are element groups formed by three elements and have in common an element group 75 in which two elements, an element A and an element B, are connected. When the information processing apparatus 10 performs some sort of process, such as a batch process, on such element groups 72, 73, and 74 in the drawing, the process for the element group 75 is often common. The process for the element groups may, for example, include design changes, substitution of components, changes to data that is set in the components, conversion to a different data format, and the like. In the case of performing a process related to the elements A and B, which are constituent elements, it is more efficient to perform a common process focusing on an element group 75 (one type) that is common to these element groups than to perform processes separately focusing on each of the element groups 72, 73, and 74 (three types). Therefore, the information processing apparatus 10 of the present embodiment has the user extract, or itself extracts, an element group (common element group) that is common to a plurality of element groups stored in the storage 12, and performs a hierarchization process so that the extracted common element group belongs to a higher level than the plurality of element groups.

Figure 21:
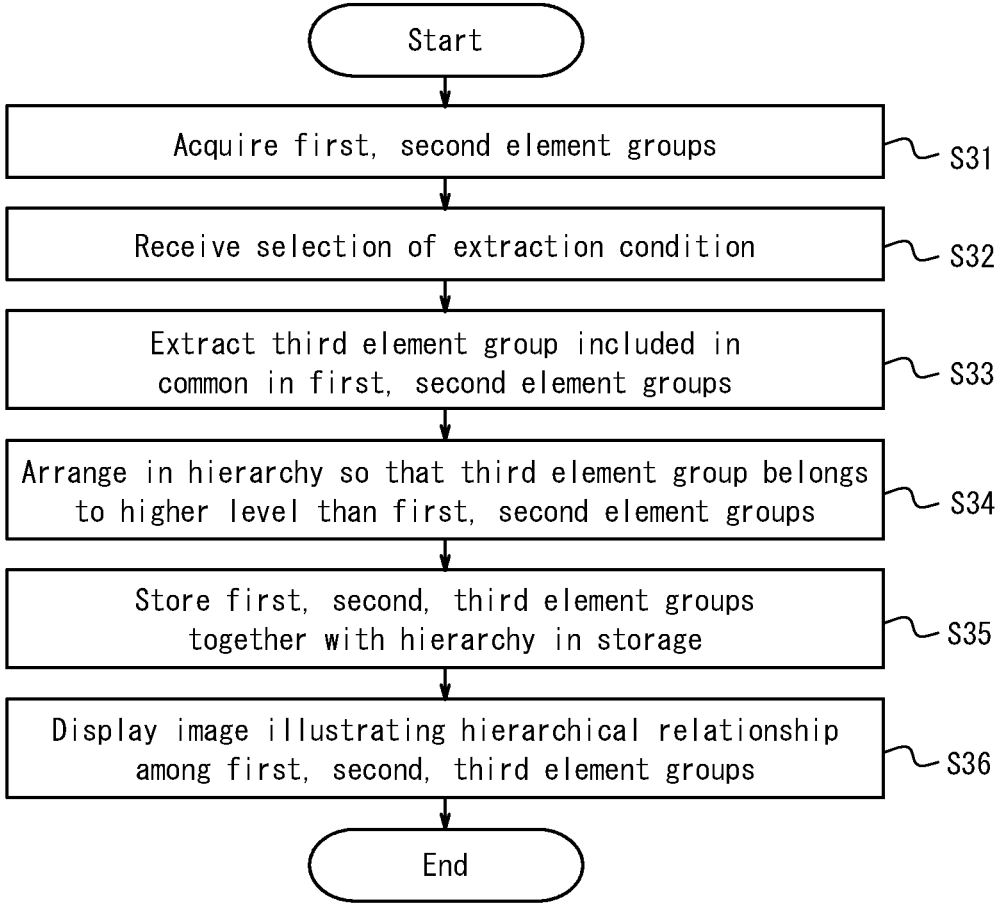
FIG. 21 is a flowchart illustrating example operations of the information processing apparatus according to an embodiment of the present disclosure.

Next, with reference to FIG. 21, operations of the information processing apparatus 10 will be described. The operations of the information processing apparatus 10 described with reference to FIG. 21 correspond to an information processing method according to the present embodiment, and the operation of each step is performed based on control by the controller 11. FIG. 21 is a flowchart illustrating example operations of the information processing apparatus 10 according to an embodiment of the present disclosure.

In step S31, the controller 11 acquires a first element group and a second element group formed by at least two elements used in at least one drawing. The element groups may be acquired by retrieving element groups selected by the user, or by reading element groups stored in the storage 12, as described in the first embodiment.

In step S32, the controller 11 may receive from a user a setting to set a condition for extraction as the element group included in common in the first and second element groups. This step is not required. Although a user who notices that the selected element groups have a common part may instruct that the element groups be reclassified, it is highly efficient if the plurality of element groups selected by the user, or the plurality of element groups already retrieved from the drawing and stored in the storage 12, are automatically reclassified after factoring out a common part, without the user being aware or performing a special operation. Execution condition data or the like, stored in the rule storage 122 or other location, for extracting the common part may be used. When default information is used, the user need not perform any operation or instruction. The user may change this setting as necessary. The extraction conditions may, for example, be as follows.

Among elements included in common in the first and second element groups, connected to each other in an identical arrangement, and for which a corresponding type of each element and attribute information are identical, the elements largest in number are extracted.

At least one element, included in common in the first and second element groups and for which a corresponding type of each element is identical, is extracted, but at least a portion of the attribute information need not be identical.

The element group that is extracted is formed by (i) at least one element included in common in the first and second element groups, connected to each other in an identical arrangement, for which a corresponding type of each element and attribute information are identical, and in which a particular element is adjacent to an identical outside element that is outside the element group, and (ii) the identical outside element.

These are only examples, and the controller 11 may extract an element group formed by a smaller number of elements among the original plurality of element groups so that the number of connections is maximized, or may extract at least one element in common. At this time, the controller 11 may evaluate the elements as being common only in the case of a complete match, including the attribute information, or may evaluate the elements are being common even when a portion of the attribute information is different. Alternatively, the controller 11 may evaluate the commonality of the elements without regard to the attribute information. When evaluating the commonality of elements, such conditions may be used in combination as appropriate, may be set in advance and stored in the rule storage 122 or the like, or may be set or changed by the user as necessary.

In the case of extracting an element group included in common in three or more element groups, a condition of extracting an element group included in common in all element groups may be adopted, or a condition of extracting an element group included in common in some element groups may be adopted.

By performing the hierarchization based on the conditions (exemplified above) set in advance, the information processing apparatus 10 can appropriately arrange the element groups in a hierarchy without performing a special operation, thereby contributing to the efficiency of the work. The user can also freely set the conditions at the time of extraction as the element group included in common in the first and second element groups, which enables appropriate arrangement of the element groups in a hierarchy according to the application or purpose. The information processing apparatus 10 may set any of the above-exemplified conditions in advance as a default condition.

In step S33, the controller 11 automatically extracts a third element group, which is an element group included in common in the first and second element groups, from the first and second element groups. Taking FIG. 20 as an example, a user may select element group 72 (from upstream to downstream, element C, element A, element B), element group 73 (valve, element A, element B), and element group 75 (element D, element A, element B) at different times without being aware of the relationship or the like between the elements, or a plurality of users may select the element groups individually from the drawing (each element group being retrieved from the drawing and stored in the storage together with identifying information, such as positional information on the drawing). Here, the information processing apparatus 10 detects (determines) that elements A and B are common to these elements from upstream to downstream, generates an upper-level element group formed by elements A and B, and hierarchizes the original element group 72, element group 73, and element group 75 in a hierarchy as lower-level element groups. This is an example of an automatic (setting of conditions or the like not necessary) re-hierarchization process based on common conditions, but if hierarchization conditions are stored in the storage 12 or the like, element groups matching the conditions may be re-hierarchized automatically without the user needing to make a selection or the like. Alternatively, if extraction conditions are selected by the user, then the third element group that is an element group included in common in the first and second element groups may be extracted from the first and second element groups based on the conditions selected and set in step S32.

In step S34, the controller 11 arranges the first, second, and third element groups in a hierarchy so that the third element group belongs to a higher level than the first and second element groups.

In step S35, the controller 11 stores the first, second, and third element groups in the storage 12 together with information indicating the hierarchical relationship.

Figure 22:
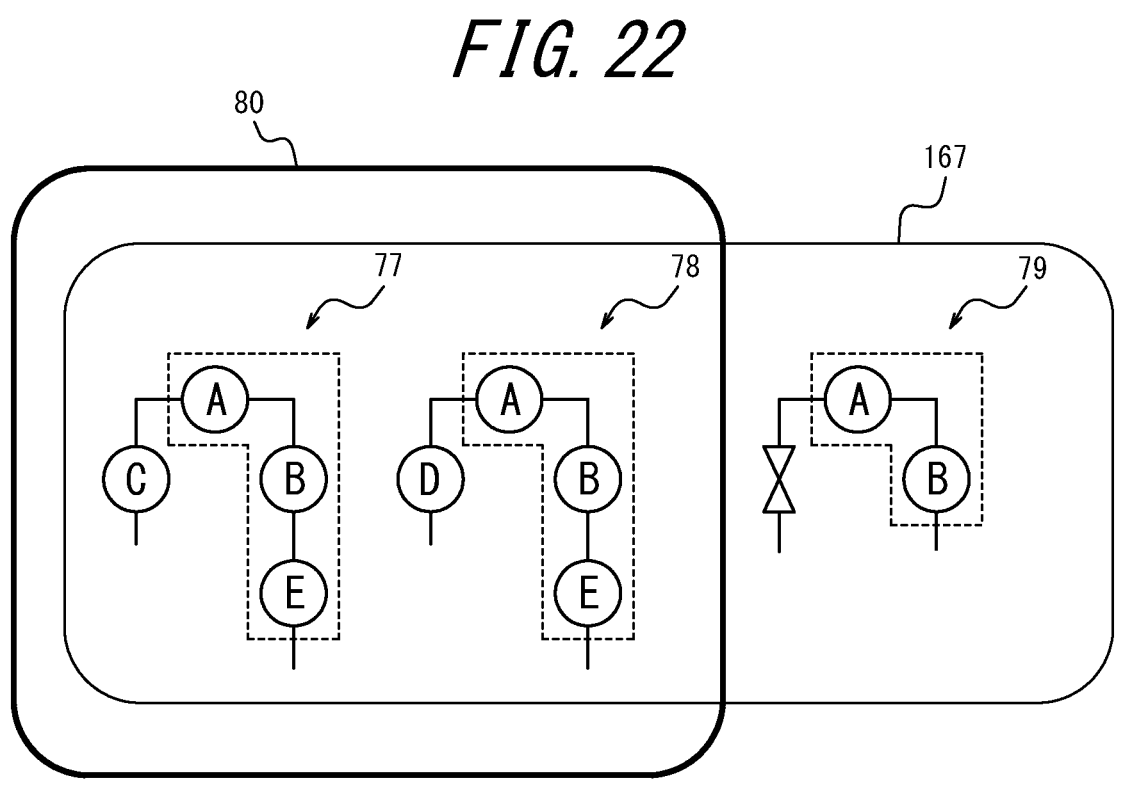
FIG. 22 is a diagram illustrating an example of element groups classified based on an element group included in common.
Figure 23:
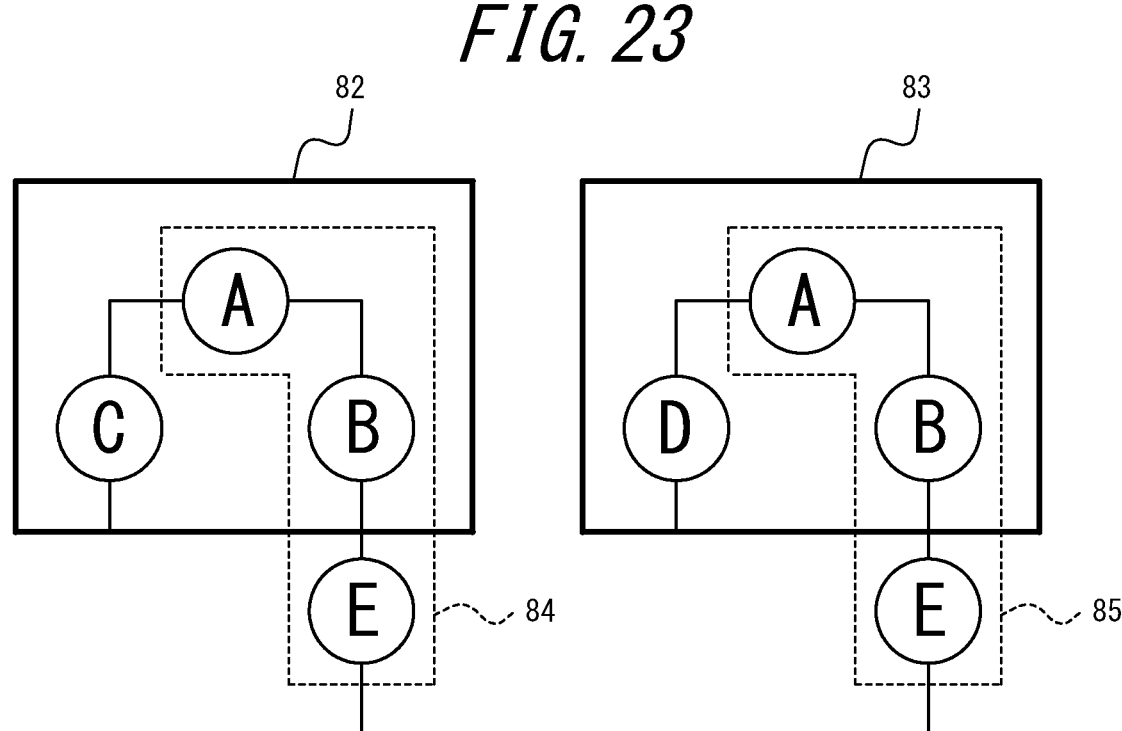
FIG. 23 is a diagram illustrating an example of element groups classified based on an element group included in common.

In step S36, the controller 11 displays an image indicating the hierarchical relationship among the first, second, and third element groups on the display 15. The image illustrating the hierarchical relationship among the elements may, for example, display the hierarchical relationship by means of a tree structure as illustrated in FIG. 20. The image illustrating the hierarchical relationship among the elements may also display the number of element groups belonging to each level of the hierarchy. By the controller 11 displaying such an image on the display 15, the user can easily grasp the hierarchical relationship of the element groups. The controller 11 may display the hierarchical relationship among the elements on the display 15 by way of text information instead of an image. Alternatively, the controller 11 may display the hierarchical relationship by indicating a common element group and displaying a higher-level element group among the selected element groups in the drawing, as illustrated in FIG. 22 or FIG. 23. The controller 11 then terminates the process.

In the present embodiment, a third element group, which is an element group included in common in the first element group and the second element group, is thus automatically extracted and is arranged and stored in a hierarchy such that the third element group belongs to a higher level than the first element group and the second element group. Accordingly, the user can perform operations based on the third element group belonging to a higher level of the hierarchy to perform operations more efficiently than when performing operations on each of the first and second element groups separately.

FIGS. 22 and 23 are diagrams illustrating an example of element groups classified based on an element group included in common. In FIG. 22, the element group 77 and the element group 78 included in the frame 80 have an element group formed by three elements, i.e. an element A, an element B, and an element E, as a common element group. On the other hand, the element group 77, the element group 78, and the element group 79 included in the frame 167 have an element group formed by two elements, i.e. the element A and the element B, as a common element group. Therefore, from the element groups 77, 78, and 79, the element group formed by the elements A, B, and E, or the element group formed by the elements A and B, could be extracted as the element group to belong to the upper level of the hierarchy. The user can set which element group is extracted as the element group to belong to the upper level of the hierarchy according to the application or purpose. If a process is necessary for the element group formed by the elements A, B, and E, the process should be performed on the entire content of the frame 80, not on the individual element groups 77 and 78, for better efficiency. If a common process is necessary for the element group formed by the elements A and B, it is more efficient to process all the element groups within the frame 167, not the three element groups 77, 78, and 79 individually. Suppose that when a user attempts to process a drawing, hierarchical information such as FIG. 22 is displayed as an image or text on a menu for the selected element group. In such a case, the user can select the element group indicated by the frame 80 when wishing to perform a process on the element groups with the elements A, B, and E, and can select the element group indicated by the frame 167 when wishing to perform a process on the element groups with the elements A and B.

If the user selects the element group 77 (formed by elements C, A, B, and E) on a drawing on which nothing is displayed, the controller 11 may inform the user that there is a higher-level element group (indicated by the frame 80) formed by the elements A, B, and E, as illustrated in FIG. 22. After selecting the element group 77, the user may designate the element group indicated by the frame 80 as a processing target via such display control. That is, a process on the UI may be performed, such as selecting the element group indicated by the frame 80 by designation of the frame 80 enclosing the elements A, B, and E, or displaying a selection menu or the like prompting whether to select the higher-level element group indicated by the frame 80. Even without such display assistance, in the case in which the user designates the element group 77 and instructs that a process be performed on the elements A, B, and E, a message may be displayed to confirm "apply process to upper-level element group 80 including elements A, B, and E?", and the user may select to perform or not to perform the process. Alternatively, the controller 11 may automatically perform the necessary process without such confirmation.

In FIG. 23, element groups 82 and 83 have an element group formed by an element A and an element B as a common element group. On the other hand, the element B of the element group 82 and the element B of the element group 83 are both adjacent to an element E that exists outside the element group. Therefore, the information processing apparatus 10 may extract the element group formed by the elements A, B, and E as common element groups 84 and 85 and reconstruct the hierarchical structure of the element groups. Even if the user does not intend this, the information processing apparatus 10 (controller 11) may detect that the element E is also common when, for example, the element groups selected by the user from the drawing are 82 and 83, and may include this element in a larger element group and store the element group in the storage 12 as a higher hierarchical level, or may inform the user that a higher hierarchical level can be formed.

Fifth Embodiment

In the present embodiment, a configuration is described in which an element group that conforms to a first element group is extracted from a drawing by focusing on the first element group, and the extracted element group is further subdivided (a lower hierarchical level is generated) into second and third element groups based on a predetermined condition. According to the configuration of the present embodiment, while focusing on specific element groups, the user can efficiently perform operations on element groups that also conform to a condition desired by the user. The same reference signs are attached to configurations in common with the first embodiment, and a detailed description is omitted.

Figure 24:
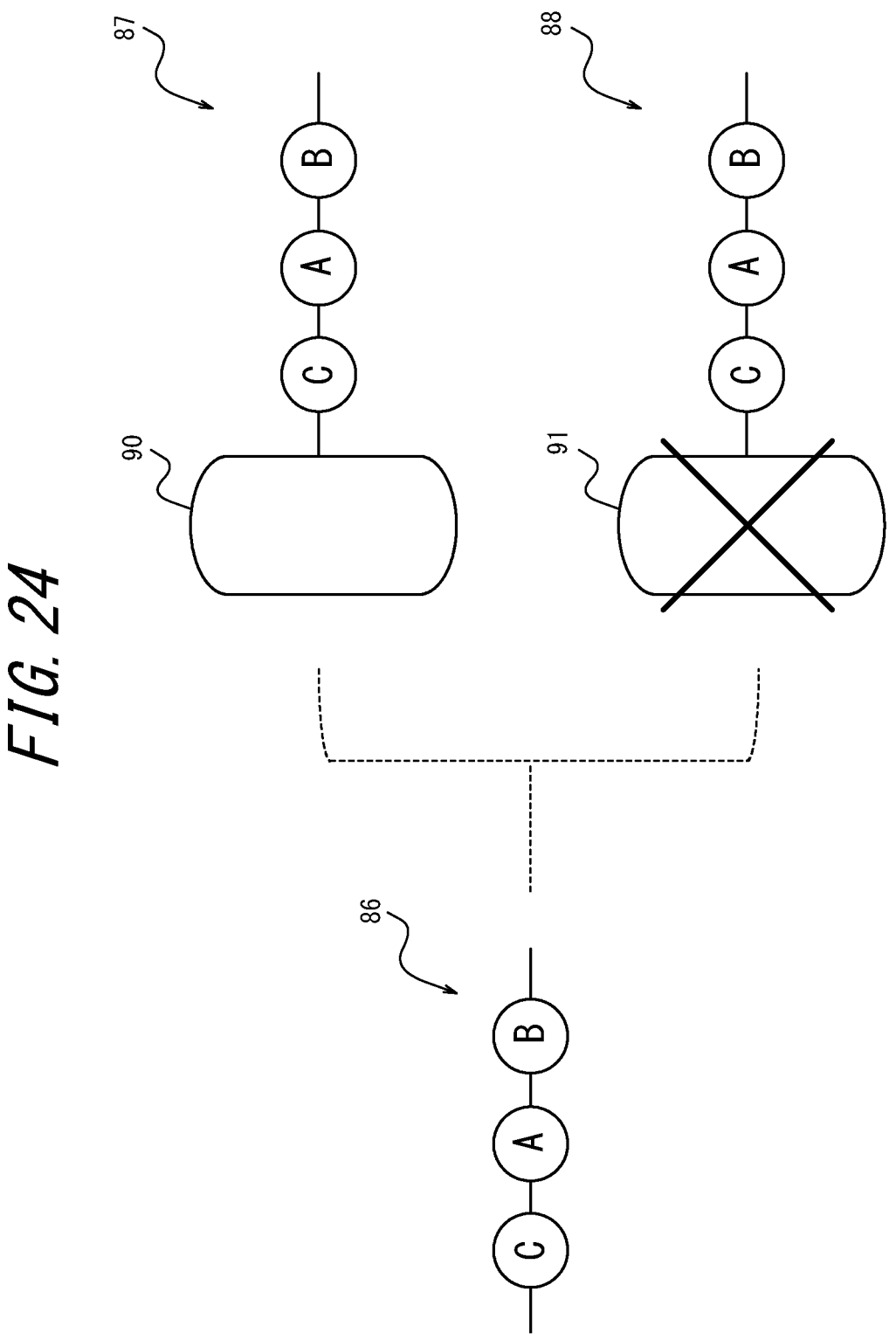
FIG. 24 is a diagram schematically illustrating a process to classify element groups based on an adjacent, connected element.

FIG. 24 is a diagram schematically illustrating a process to classify element groups based on an adjacent, connected element. An element group 86 is formed by elements C, A, and B arranged in this order. Among such element groups, the user 201 may wish to perform a common process only on element groups that satisfy a certain condition. For example, the user 201 may wish for the target of the common process to be only the element group 86 to which a tank 90 is connected adjacent to and upstream from the element C. Therefore, based on a certain condition set in advance, the information processing apparatus 10 of the present embodiment subdivides the given element group into a plurality of element groups according to the condition and arranges the element groups in a hierarchy so that they belong to a lower hierarchical level than the original element group. In other words, the information processing apparatus 10 forms a hierarchy so that the original element group belongs to a higher hierarchical level than the subdivided element groups.

In the example in FIG. 24, the information processing apparatus 10 subdivides the element group 86 into an element group 87 to which a tank 90 is connected adjacent to and upstream from the element C, and an element group 88 to which no tank is connected adjacent to and upstream from the element C (including the case where an element other than a tank is connected). The information processing apparatus 10 then arranges the newly generated (based on the condition of whether an upstream tank exists) element groups 87 and 88 in a hierarchy to belong to a lower hierarchical level than the original element group 86. Accordingly, in a case in which the element group 88 is to be treated only as a single fixed set, and a process is to be performed only on element groups with a tank upstream, the user can focus on the element group 87 and proceed with operations efficiently and with no hassle only on the desired element groups, instead of individually retrieving and processing. For example, the user 201 can cause the information processing apparatus 10 to retrieve element groups that conform to the element group 87 (only element groups with a tank connected upstream) and perform a batch process on those element groups. This information is stored in the storage 12 and can therefore be reused when a process is to be performed on the same element groups. The process of classifying, subdividing, and hierarchizing the element groups based on whether a tank is connected upstream is a non-limiting example for the purpose of illustration, and classification into lower hierarchical levels may be performed under various conditions. In some cases, such a condition (- - - is connected upstream) may be frequently used in processing. Such conditions may be stored in the storage 12, element groups that match conditions may be retrieved from the drawing, and a hierarchy may be formed automatically and presented to the user, or formed automatically and stored in the storage 12.

Figure 25:
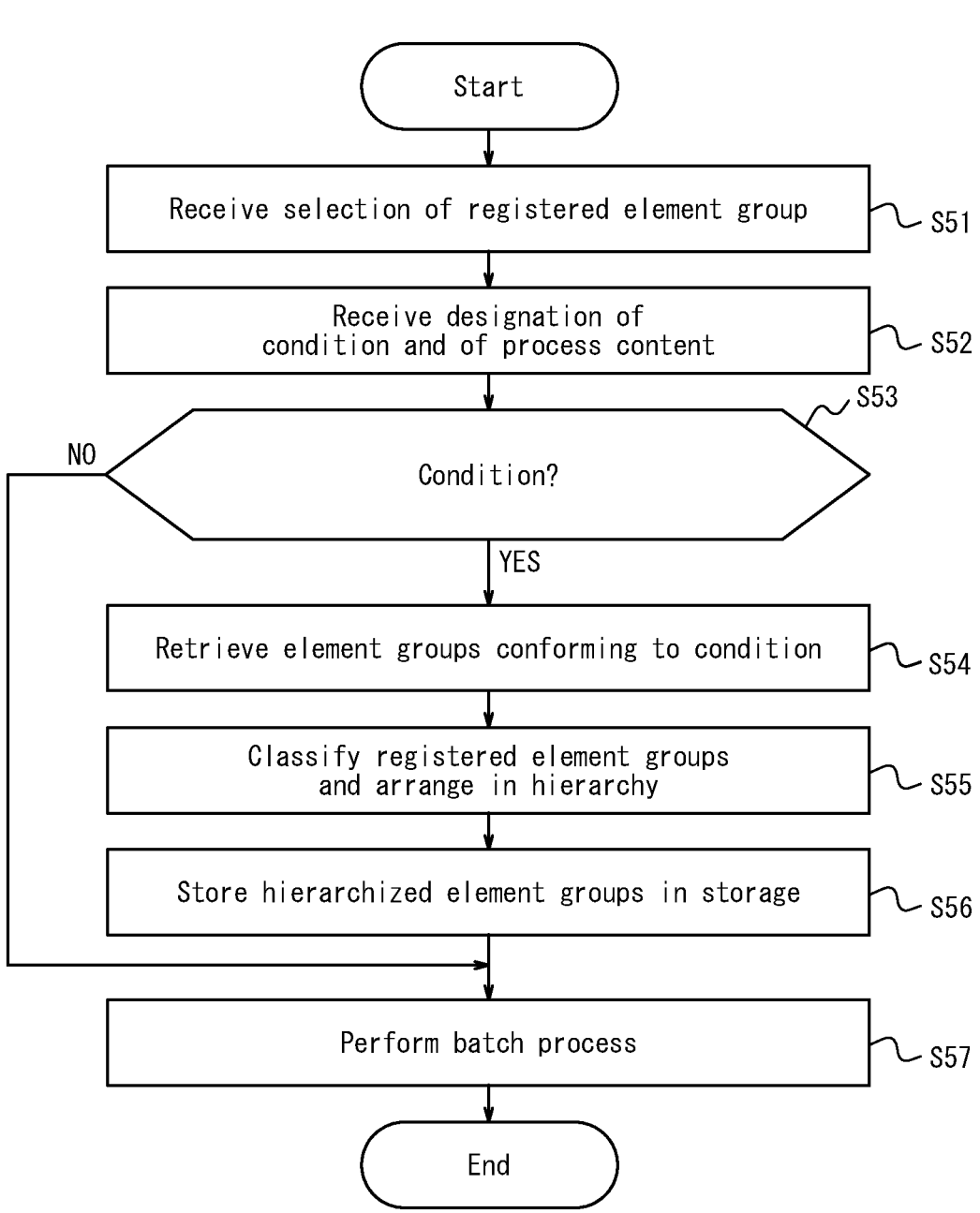
FIG. 25 is a flowchart illustrating example operations of the information processing apparatus according to an embodiment of the present disclosure.

Next, with reference to FIG. 25, operations of the information processing apparatus 10 will be described. The operations of the information processing apparatus 10 described with reference to FIG. 25 correspond to an information processing method according to the present embodiment, and the operation of each step is performed based on control by the controller 11. FIG. 25 is a flowchart illustrating example operations of the information processing apparatus 10 according to an embodiment of the present disclosure.

In step S51, the controller 11 receives from the user a selection of a first element group formed by one or more elements used in at least one drawing. The controller 11 may receive the selection from the user for the element group registered in the group storage 121.

In step S52, the controller 11 receives from the user a designation of processing content for the selected first element group. Here, the controller 11 also receives from the user a designation of a condition for whether all of the element groups conforming to the selected first element group are to be processed, or only those satisfying a certain condition. Such conditions may, for example, include the following An element included in the first element group has a specific relationship with an element outside the first element group (for example, there is a tank upstream).

The attribute information of at least one element included in the first element group satisfies a certain condition.

The element adjacent to the first element group satisfies a certain condition, such as being a specific element or having a specific set value.

As described below, the controller 11 subdivides the element groups conforming to the first element group from step S54 onwards based on certain conditions such as attribute information of the elements included in the element group and adjacent elements. Therefore, according to the information processing apparatus 10, while focusing on specific element groups, the user can efficiently perform operations on element groups that also conform to a condition desired by the user.

In step 553, the controller 11 determines whether the user designates only element groups satisfying a certain condition (such as element groups having a tank upstream) as a processing target. In the case in which only element groups satisfying a certain condition are to be the processing target (YES in step S53), the controller 11 proceeds to step S54. Otherwise (NO in step S53), the controller 11 proceeds to step S57, executes a batch process with all of the element groups conforming to the element group selected in the drawing as processing targets, and terminates the process of the flowchart.

In step S54, the controller 11 retrieves element groups that conform to a certain condition selected in step S52 (for example, that there is a tank upstream) from among the first element groups.

In step S55, the controller 11 classifies the first element groups into a second element group that satisfies a certain condition designated by the user in step S52 (for example, element groups that have a tank upstream) and a third element group that does not satisfy a certain condition (for example, element groups with no tank upstream). Furthermore, the controller 11 arranges the first, second, and third element groups in a hierarchy so that the first element group belongs to a higher level than the second and third element groups.

In step S56, the controller 11 stores the hierarchized first, second, and third element group in the storage 12.

In step S57, in the case in which the user designates only the element groups satisfying a certain condition as the processing targets (YES in S53), the controller 11 performs a batch process for each element group conforming to the second element group that satisfies a certain condition among the first element group. Accordingly, the user 201 can cause the desired process to be performed only on the element groups that satisfy a certain condition among the element groups that conform to the first element group. In step S52, in the case in which the user does not designate only the element groups satisfying a certain condition as the processing targets (NO in S53), the controller 11 executes a batch process with all of the element groups conforming to the element group selected in the drawing as the processing targets, as described above. After completing the process of step S57, the controller 11 ends the process of the flowchart.

As described above, the information processing apparatus 10 of the present embodiment focuses on the first element group to extract from the drawing element groups that conform to the first element group and subdivides the element groups into the second and third element groups based on user-designated conditions. The controller 11 may subdivide into the second and third element groups based on predetermined conditions. Therefore, while focusing on specific element groups, the user can also efficiently perform operations only on element groups that conform to a condition desired by the user. For example, the user can cause the information processing apparatus 10 to perform a batch process on only element groups that meet a specific condition among the first element groups.

Figure 26:
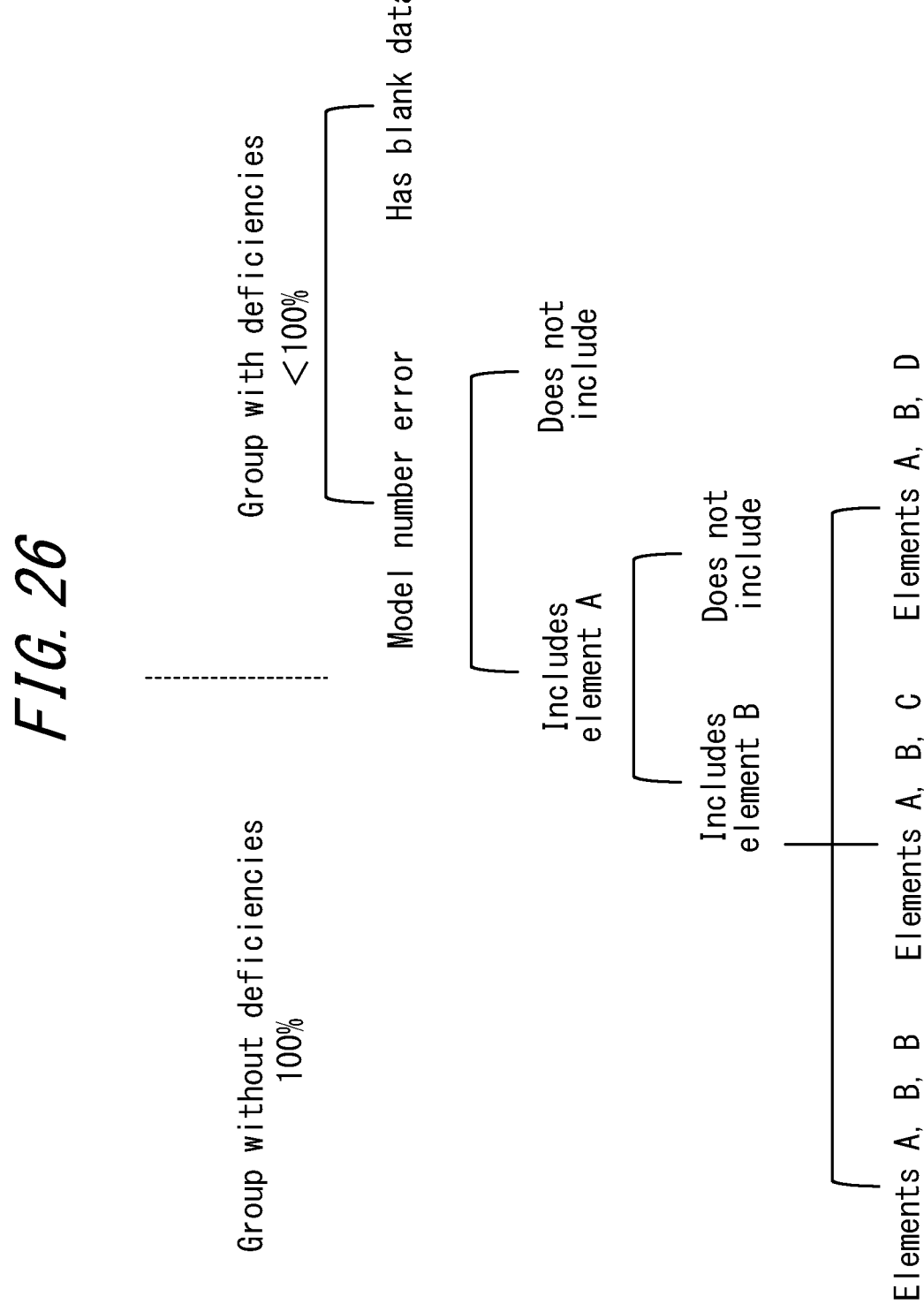
FIG. 26 is a diagram schematically illustrating a process to classify element groups based on their deficiencies.

The controller 11 may display an image indicating the hierarchical relationship among the first, second, and third element groups on the display 15. As an example of such an image, FIG. 26 schematically illustrates a process of classifying the element groups based on their deficiencies. In FIG. 26, element groups at least partially conforming to the first element group are subdivided into a group without deficiencies and a group with deficiencies. In FIG. 26, the degree of conformity with the first element group is indicated in percentages, with "100%" indicating that the element group corresponding to the group without deficiencies completely conforms to the first element group. The "<100%" indicates that the element groups corresponding to the groups with deficiencies do not completely conform to the first element group. The element groups with deficiencies are subdivided into element groups with a model number error and element groups with blank data, and the element groups with a model number error are subdivided into element groups including the element A and element groups not including the element A. The element groups including the element A are subdivided into element groups including and not including the element B, and the element groups including the element B are subdivided into element groups including the elements A, B, B, element groups including the elements A, B, C, and element groups including the elements A, B, D. The controller 11 may also display the number of element groups that conform to each element group in the hierarchy. By the information processing apparatus 10 displaying such an image on the display 15, the user can easily grasp the hierarchical relationship of the element groups.

Figure 27:
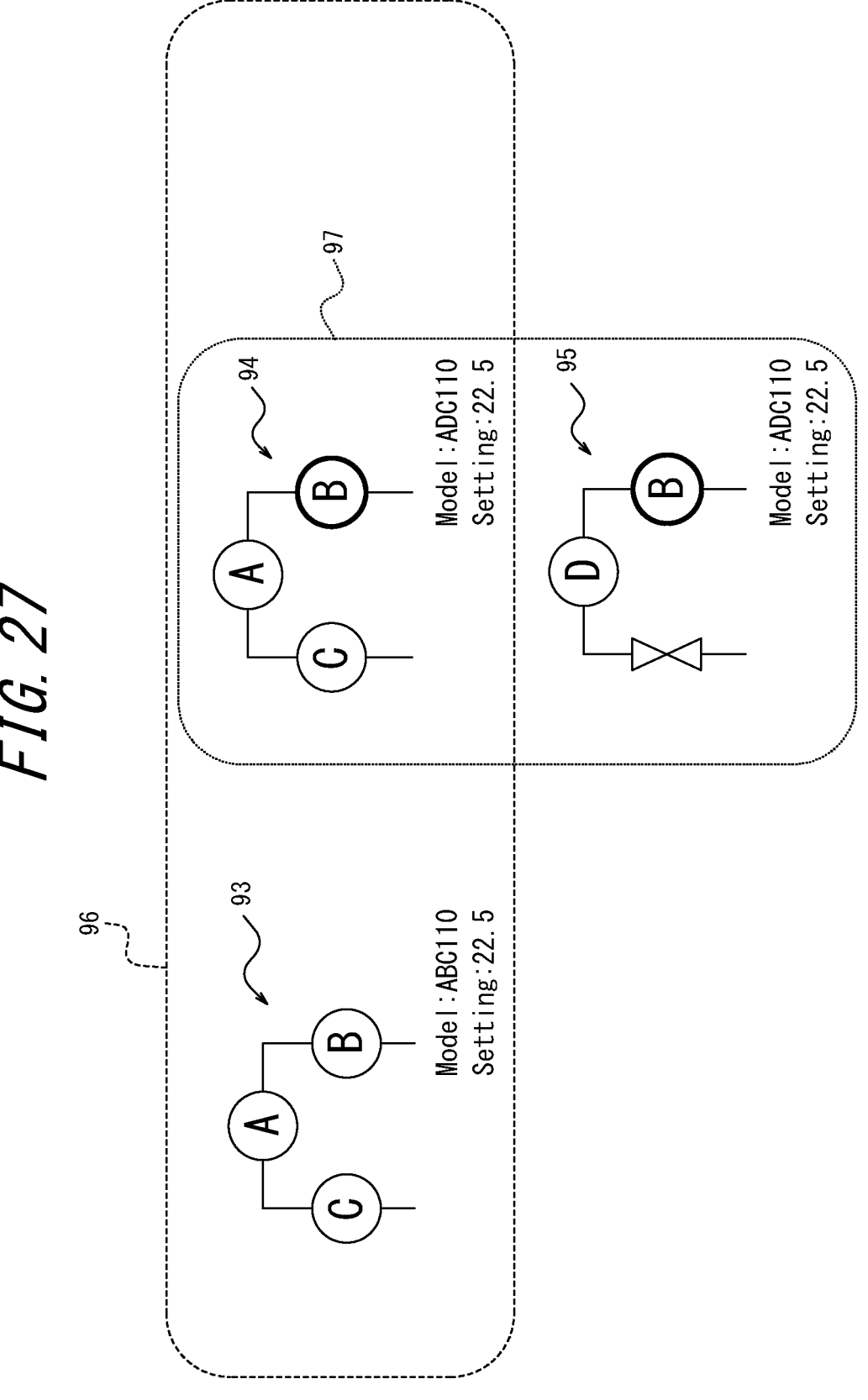
FIG. 27 is a diagram schematically illustrating a process to classify element groups based on various criteria.

FIG. 27 is a diagram schematically illustrating a process to classify element groups based on various criteria. In FIG. 27, the element group 93 and the element group 94 included in the frame 96 are both formed by an element A, an element B, and an element C. The element group 94 and the element group 95 included in the frame 97 both mistakenly have "ADC110" set as the value of the model of the element B, whereas the correct value is "ABC110". In terms of whether these are the same element group (formed by elements A, B, and C in a matching arrangement), the element groups 94 and 95 have nothing in common, but in terms of how the model number of element B is incorrectly listed, the element groups 94 and 95 can be factored out (hierarchized) as a group under a common condition. As can be seen from FIG. 27, the element groups conforming to the element group 94 can be grouped into element groups corresponding to the frame 96, or into element groups corresponding to the frame 97. One element group (element group 94 in the illustrated example) may belong to multiple element groups (groups), and various classifications (hierarchical arrangements) are envisioned depending on the process to be implemented by the user. Therefore, the controller 11 may display an image such as the one in FIG. 27 on the display 15 as an image indicating the hierarchical relationship among elements.

The controller 11 may display at least one drawing on the display 15 in a manner enabling identification of portions corresponding to the first, second, and third element groups. Specifically, the controller 11 may use different colors and lines from other elements for the graphics indicating the element groups, or may indicate the portions corresponding to the element groups by specific symbols or characters. The controller 11 may also display an image indicating how each element group is distributed in the entire drawing. The user can thereby easily grasp which portions in the drawing correspond to the first, second, and third element groups.

Sixth Embodiment

In the present embodiment, a configuration is described in which a communication item from a first user to a second user is displayed in correspondence with a position or a region in a drawing. According to the present embodiment, a second user can easily grasp the position or region to be confirmed or corrected in the drawing and a communication item stored and displayed in correspondence with the position or region, so that multiple people can efficiently perform work such as correction of the drawing. The same reference signs are attached to configurations in common with the first embodiment, and a detailed description is omitted.

Figure 28:
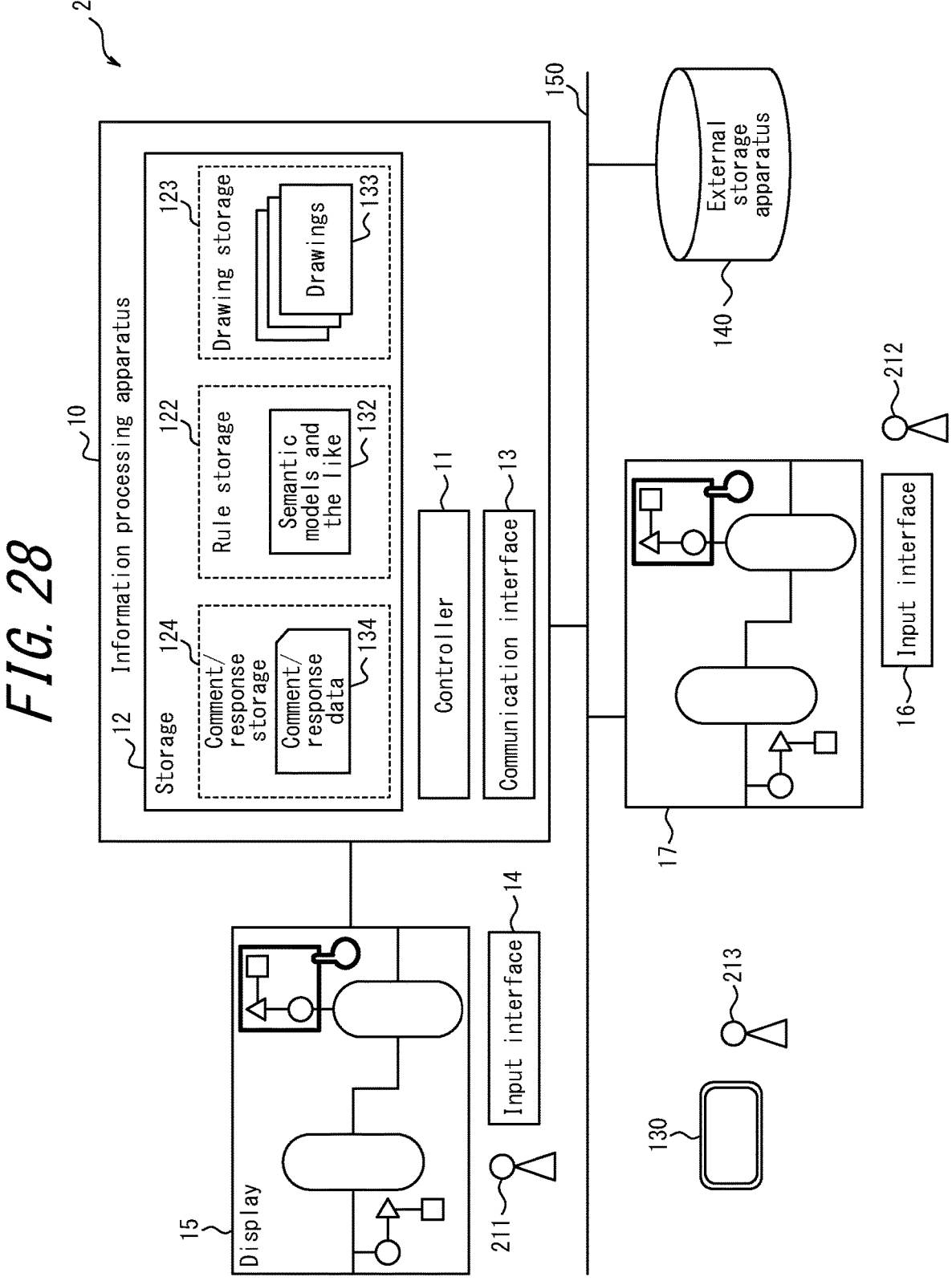
FIG. 28 is a diagram illustrating the configuration of an information processing system that includes an information processing apparatus according to an embodiment of the present disclosure.

FIG. 28 is a diagram illustrating the configuration of an information processing system 2 that includes an information processing apparatus 10 according to an embodiment of the present disclosure. In the information processing system 2, in addition to a user 211 who operates the input interface 14 and the display 15, a user 212 who operates an input interface 16 and a display 17 is also involved in creating the drawings. The information processing apparatus 10 of the information processing system 2 includes a comment/response storage 124 in the storage 12. The comment/response storage 124 stores data indicating a position of a commented area selected in the drawing by one user, a comment content assigned to the commented area, a response by another user to the comment content, and the like. In the present embodiment, such data is referred to as comment/response data. The comment/response data is mapped to a drawing and associated with a position on the drawing. Here, the data is stored in a form that is linked to the element targeted by the comment and positional information, such as coordinates on the drawing, so that the comment/response location can be displayed on the drawing in an identifiable manner.

Figure 29:
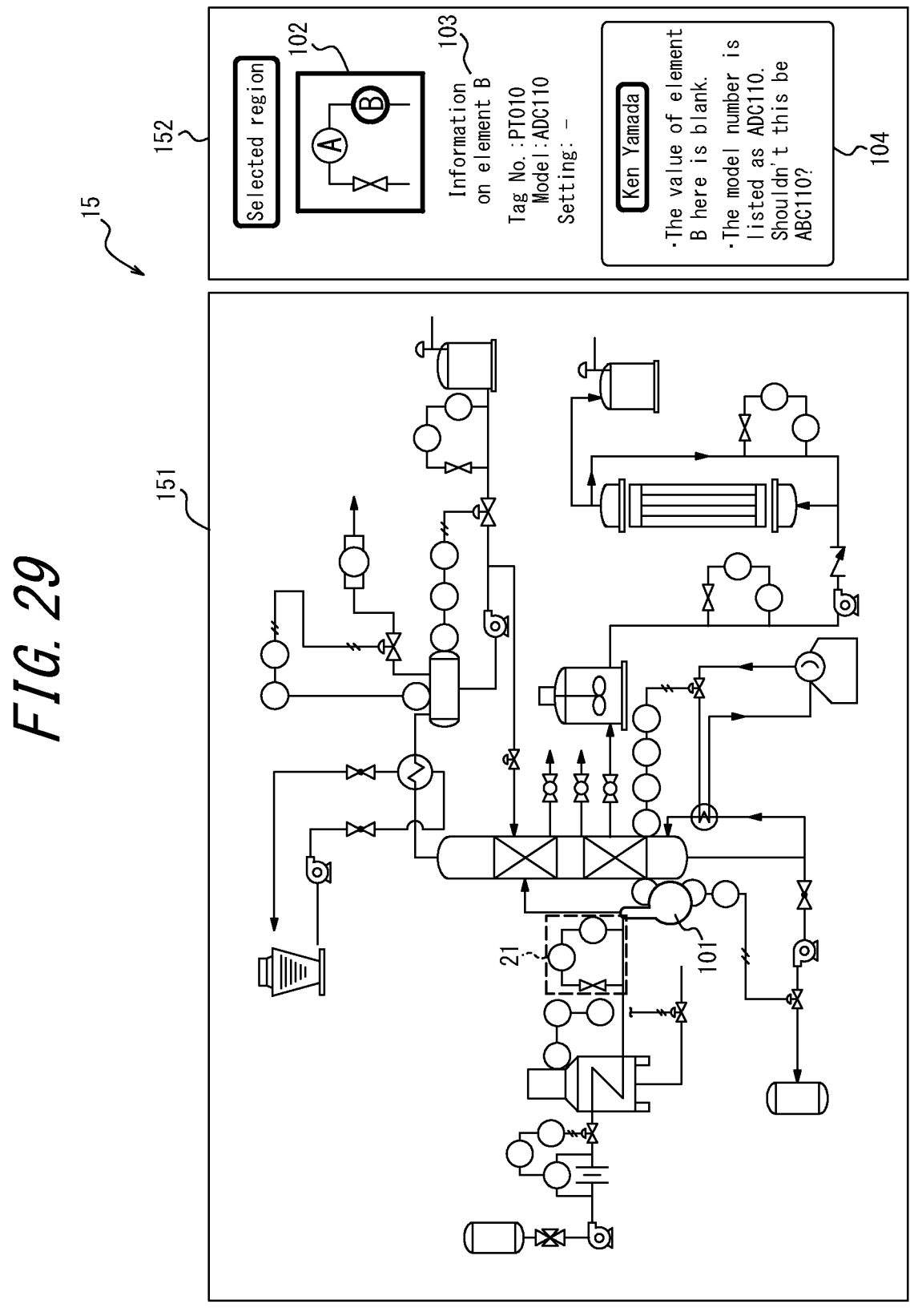
FIG. 29 is a diagram illustrating an example of a screen on a display connected to the information processing apparatus.
Figure 30:
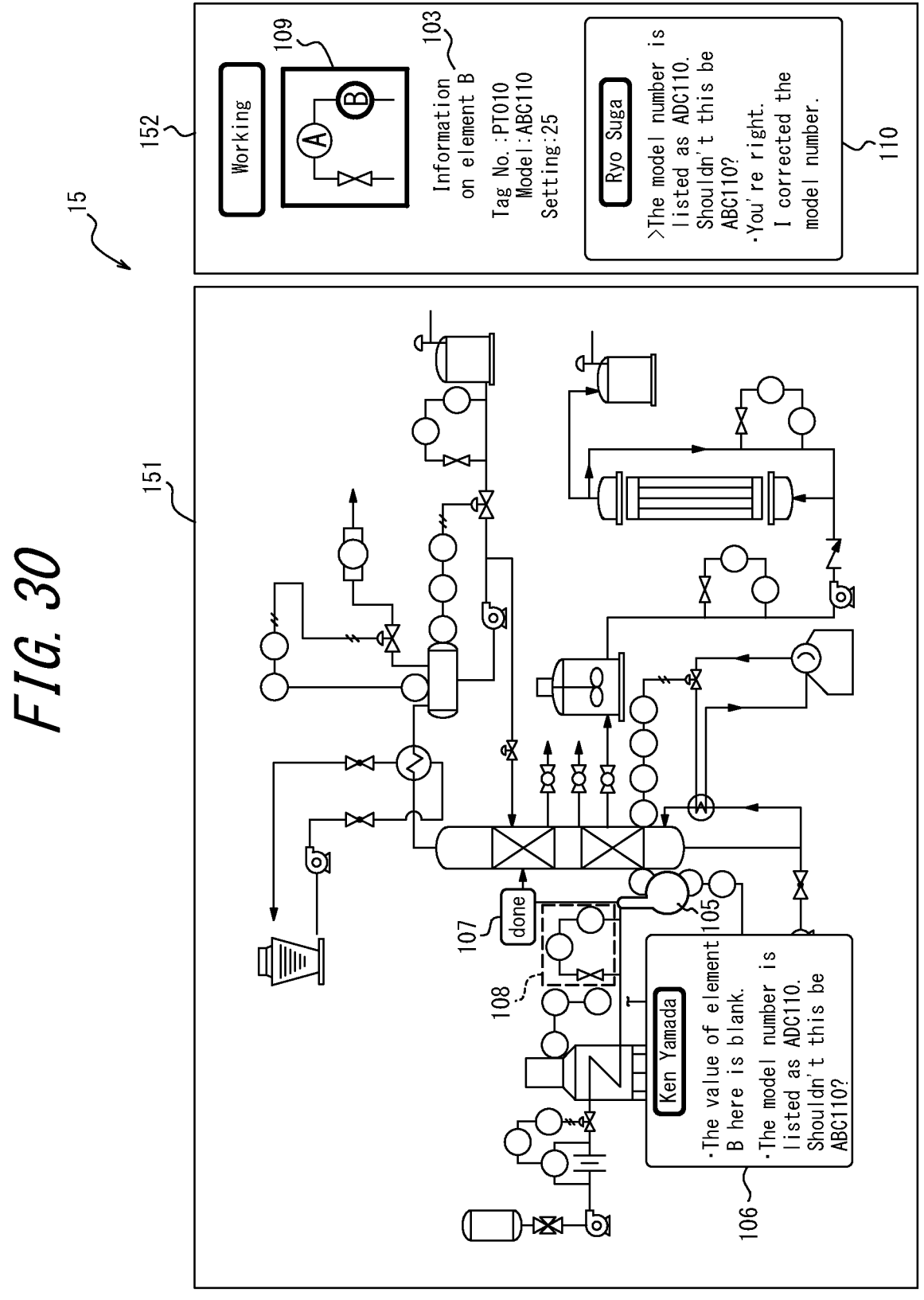
FIG. 30 is a diagram illustrating an example of a screen on a display connected to the information processing apparatus.

FIGS. 29 and 30 are diagrams illustrating examples of screens on the display 15 connected to the information processing apparatus 10. In the present embodiment, an example is described in which a screen identical to the screen displayed on the display 15 operated by the user 211 is displayed on the display 17 operated by the user 212. Hereafter, the user 211 is also referred to as user A (first user), and the user 212 is also referred to as user B (second user). The number of these users may be two or more, and the users are not limited to both being engineers involved in creating or correcting drawings. One user may be a customer, and the other may be an engineer who makes corrections and the like to the drawings in response to customer requests.

In FIG. 29, the user A (a correction requestor or the like) designates a location 21 requiring correction from the drawing displayed in the display area 151 of the screen. In FIG. 29, the user A operates the touch panel with a hand 101 to designate the location 21 requiring correction.

In the case in which the location requiring correction is an area such as an element group (group), the user A selects the area. The selection target is not limited to an element group formed by multiple elements, but may be a single element. The user A designates a point when the location requiring correction is an element, such as a device. Although a variety of existing methods may be used to designate an element or element group, an evolutionary method is described in detail in the seventh and eighth embodiments. The user A designates a location requiring correction, and inputs a communication item, as a message, for the user B regarding the location requiring correction with details such as a comment and desired correction, confirmation request, or the like (the communication item is not limited to correction, but may prompt for confirmation or other operations). Rather than inputting a message, the user A may select a message (a type of comment or request) from a selection button (see FIG. 31B). For example, if the information processing apparatus 10 displays selection buttons such as "model number error", "value setting omission", "distorted graphic", and the like, and the user A selects from among these buttons, the user A can efficiently input an instruction/comment summary without the trouble of text input. When the communication item is inputted by the selection buttons, an operation can be designated efficiently even without keyboard input or the like. Instructions using a smartphone or the like, and efficient input only by operation of a pointing device, are envisioned as examples. When such ready-made messages (tags, common classifications) are used, the communication items share common types, unlike messages that differ from one person providing input to another (which makes the content difficult to summarize). This facilitates subsequent analysis and classification. Specifically, for example, it is easy to tally and quantitatively analyze the breakdown of comments in 100 communication items in the form of 20 model number errors, 70 value setting omissions, and 10 distorted graphics. The method of inputting communication items by text and the method of inputting by selecting from among predetermined options may be combined. For example, after selecting "model number error", the user A may input the model number information that the user A considers to be correct, a detailed communication item, or the like.

In the example in FIG. 29, an element group (21 in the display area 151) selected by the user A is displayed in the display area 102 within the display area 152. In the display area 103, information on the element B included in the selected element group is displayed. In the display area 104, communication items from the user A to the user B are displayed. The information processing apparatus 10 enables the user A to enter a comment on the display area 104 to assign a communication item from the user A to the user B for the position or region in which the selection is received.

FIG. 30 illustrates the user B performing an operation on the screen. In FIG. 30, the location 108 commented on by the user A is highlighted in the drawing. The user B (corrector or the like) selects this location. For example, the user B selects the highlighted location 108 by a touch operation on the touch panel as illustrated by 105, by operating a pointing device or other input device to move the cursor to this location, or the like. In response, a message is displayed in a display column outside the drawing (in the example in FIG. 30, the display area 152 on the right side of the screen) indicating a communication item from the user A to the user B regarding the work plan and the content of the correction. Alternatively, the message may be displayed near the location 108 that corresponds to the commented area on the drawing. In this case, the message may be hidden so as not to interfere with viewing of the drawing until the user B designates the area. The controller 11 may display details, such as the content of the comment, in a form that does not interfere with the visibility of the drawing, for example in a different area or as a pop-up.

The user B confirms the message, and makes corrections or the like according to the content and plan in the message. The response to the message is not limited to a correction and may, for example, be an answer from the user B to a question posed by the user A. In the example in FIG. 30, in the display area 103, the model number is corrected from "ADC110" to "ABC110", and the setting value that was blank is set to a value of 25.

The user B performs work, such as correcting the commented location and setting omitted values, and inputs a response message. The user B may instead perform only such work or only message input. In some cases, the message is unnecessary if work is performed in response to a request. In some cases, the user B might not perform work but only input a message that work is unnecessary, or may perform a correction operation and then input a related communication item. In the example in FIG. 30, communication items from the user B to the user A are inputted in the display area 110.

When the work by the user B is completed, the commented area may be highlighted to indicate that the work has been completed. This may be a mark 107 including a character such as "done" as in the example in FIG. 30, or a character, mark, color, etc. and/or a combination thereof. A setting that the work has been completed is made by the user B providing input indicating completion. Alternatively, in a case in which completion is not finalized without approval from the user A who made the comment, the status of completion may be set by confirmation (approval) from the user A after the user B has made corrections or the like.

When such a mark is assigned, the corresponding user can intuitively see where the commented area is on the drawing, what has been responded to and what has not (what location to respond to next), and so forth. The user can also search for, tally, and analyze locations to which a mark is assigned. For example, when work has been completed for 70 out of 100 commented areas, the information processing apparatus 10 may display the 100 commented areas, 70 work completed locations, 30 remaining, and the like in response to pressing of a tally button or the like (or automatically without instruction).

The information inputted by the user A and the information inputted by the user B may be displayed in different colors. This example is not limiting, and the display of colors, symbols, or the like may be changed for each user to make it easy to identify who has inputted the information. The distribution of operators on the drawing can also be recognized, and in cases such as when a plurality of users are involved in the drawing, and a rule or division of labor is predetermined, such as that a certain worker responds to comments and requests from the user A, it is easy to recognize the workers and the status of their response.

FIGS. 31A and 31B are diagrams schematically illustrating a user interface for correcting the settings of an element. When changing a setting for an element B, the user A selects the graphic indicating the element B, as illustrated in FIG. 31A. In response, the information processing apparatus 10 displays options as illustrated in FIG. 31B, such as the type of correction (comment) to be made, in a selectable manner by a pop-up or the like. In the example in FIG. 31B, "omitted setting", "mistake", and "distorted graphic" can be selected (the options are not limited to this example). The user A selects the necessary correction from among these options and inputs the content of the correction (comment) and the like for the element B. Comments and the like not only from the user A but also the user B may be selected by such presentation of options for processing that eliminates the hassle of input and facilitates classification and correction with common content.

Figure 32:
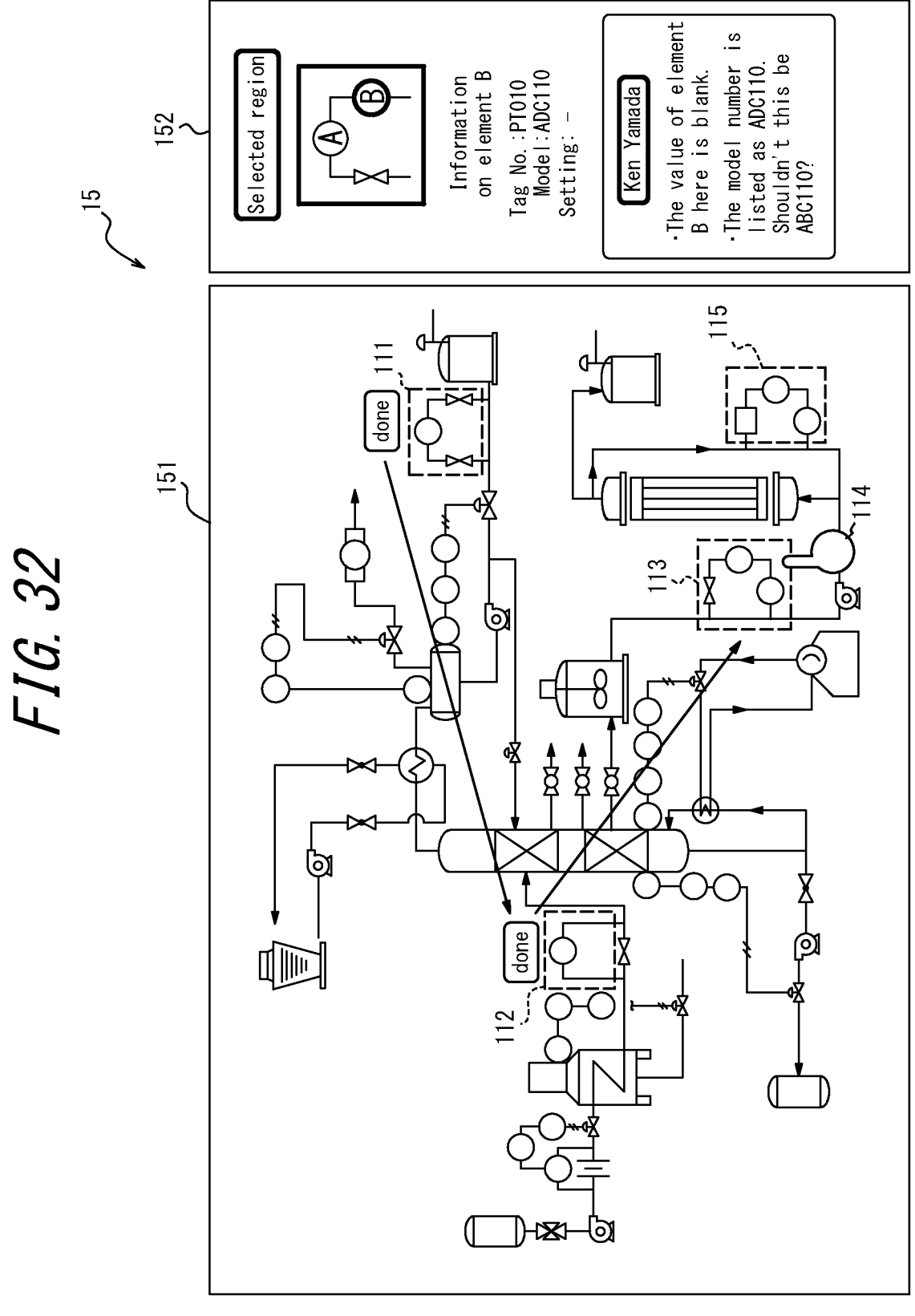
FIG. 32 is a diagram illustrating an example of a screen on a display connected to the information processing apparatus.

FIG. 32 is a diagram illustrating an example of a screen on the display 15 connected to the information processing apparatus 10. Highlighting a commented area in the drawing is effective, as the user can identify the location at a glance. However, when a plurality of commented areas are scattered in a large drawing, the user needs to manually transition between screens by scrolling, move the operation point, and the like to move between commented areas that require a response. To move to the next location after a certain location (commented area) is complete (responded to), an operation such as greatly moving the cursor with a pointing device, keyboard, or the like becomes necessary. In particular, when the commented areas are scattered in a drawing illustrating a vast plant, the screen needs to be scrolled and the operation point moved each time a new commented area is to be confirmed. This may make it difficult to find the commented areas, or require complicated operations to reach the commented areas.

Therefore, the information processing apparatus 10 according to the present embodiment switches between and displays, on the display 15, the positions or regions (commented areas) to which a communication item is assigned in response to a specific input of a simple operation from the user, such as pressing of a "Move to Next Point" button displayed on the screen, or pressing of a specific button of an input device. A simple operation here is a specific operation such as a single button press or a single click. This simple operation is for quickly executing a predetermined button or command with a concise operation (a single click or the like) and differs from an operation that requires time and effort, such as visually searching for an operation point on the screen, continuously turning the wheel of a pointing device to scroll the screen and search, or moving the cursor to the position after searching. Consequently, the position or region to which the communication item is assigned is switched and displayed in response to the operation input (simple operation) from the user. The user can therefore confirm the location to which the communication item is assigned without effort and without omission. Specifically, when the commented areas are recorded and are mapped on the drawing, the information processing apparatus 10 holds the positional information of the commented areas. The positional information of a commented area is information such as which drawing in the case of multiple drawings, the coordinates on the drawing, or matrix information.

The information processing apparatus 10 may then perform control to transition to the next commented area in response to a predetermined operation input (simple operation) to the input interface 14. Such an operation input may be a selection/execution operation, for example on a forward button with a display such as "move to next point" displayed on the screen or a predetermined key (forward button) assigned to an input device such as a keyboard, or may be a click operation with a pointing device. The user can thereby move to and display the next commented area by a simple operation, without having to visually search for the commented areas one by one or perform a complicated operation. Accordingly, the user does not need to look for the location of the commented area, which can prevent omission of confirmation of the commented area. In the example in FIG. 32, the information processing apparatus 10 transitions to the next commented area in order (each time confirmation of a commented area is completed) among the commented areas to be responded to, i.e. the element group 111, the element group 112, the element group 113, and the element group 115, in response to operation input by the user (pressing of a forward button or the like on the input device), and switches the display area and the displayed content as appropriate.

Furthermore, when response operations for the element group are completed, the information processing apparatus 10 may automatically attach a completion mark ("done" in the figure) to the commented area and automatically transition to the next commented area nearby. In this way, even the input operation for switching the commented area is eliminated, making the work even more efficient. As described above, when confirmation from the user A that commented is necessary, the user A also confirms the commented areas (i.e., the areas responded to by the user B) while similarly transitioning between the commented areas. The areas with no new comments may sequentially be assigned a completed status and assigned a completion mark. Therefore, although commented areas were described as an example, such transition control may be performed for both the commented points (areas) and the responded points (areas).

When switching the commented area, the information processing apparatus 10 may simply move to the nearest commented area or move according to a general rule such as from upstream to downstream or from top to bottom on the drawing. The information processing apparatus 10 may also set a degree of importance for the commented areas and transition in descending order of the degree of importance. For example, suppose that among 100 commented areas in the entire drawing, there are 10 commented areas with a high degree of importance, 20 commented areas with a medium degree of importance, and 70 commented areas with a normal degree of importance. In this case, control to simply move to the nearest commented area may result in low priority areas being worked on first while high priority areas are left until later. The information processing apparatus 10 addresses this issue by using information on the set degree of importance (priority) and transitioning between the ten areas with a high degree of importance first, so that the user can respond to these important areas first. After operations to respond to the commented areas with a high degree of importance are finished, the information processing apparatus 10 performs control to transition to the next 20 areas with a medium degree of importance. The degree of importance is an index indicating the degree to which priority should be given to correcting, changing, or otherwise responding to the commented area. For example, the degree of importance is assigned and set by the user who selected the commented area. Specifically, the degree of importance is a rank or value that reflects, for example, the content and degree of the setting error or mistake at the position or region, the degree to which the correction or change is required, and the severity of the effect, on the equipment or the like represented in the drawing, caused by the current content of the position or region. In other words, the degree of importance may be indicated numerically or may be set in steps such as a large, medium, or small degree of importance, or a rank A, B, or C.

Even in the case of receiving operations for the ten areas classified as having a large degree of importance, the information processing apparatus 10 need not randomly determine the order of transition, but may transition in descending order starting from the commented area with the highest degree of importance. In this way, work can be performed preferentially starting from the more important commented areas.

Alternatively, the information processing apparatus 10 may transition in order among the commented areas for which the work content is highly similar. In this case, information prescribing the commonality of the work and the like is set manually or automatically, and transitioning is controlled based on this information. For example, as illustrated in the example in FIG. 31B, if options such as the type of work are prepared, transitions are made using these options so that the same types are responded to together. This enables the user to group together tasks that have similarity or commonality and to proceed with the work efficiently. For example, consider a case in which there are 10 commented areas requiring a response to a setting omission, 10 requiring correction of a mistake, and 10 requiring correction of a distorted graphic as the content of the work. In this case, the information processing apparatus 10 may transition among the 10 commented areas requiring a response to a setting omission, then the 10 requiring correction of a mistake, and the 10 requiring correction of a distorted graphic. This enables the user to perform the same type of work together, making the work more efficient and preventing errors.

These transition rules may be stored in the storage 12 so that the user can select or organize the transition rules. The transition rules may also be applied by the user switching the applicable target between "degree of importance", "similarity (work type)", and the like using an application installed on the information processing apparatus 10. These may be switched on and off. For example, when "degree of importance" and "similarity" are turned ON, the information processing apparatus 10 performs control to transition preferentially among the important commented areas, while at the same time switching in order among a group of work areas that require similar work. Alternatively, even if the user does not select a rule for the transition, the information processing apparatus 10 may, as a default setting, perform control to start with important commented areas and transition in order among a group of commented areas requiring similar work.

In the drawing, there can be a plurality of commented areas that require the same work. Therefore, in the case in which there is a plurality of commented areas that require the same work, and the user A designates any of these commented areas, the information processing apparatus 10 may automatically designate other areas of the same type. If the user A then assigns a communication item to a certain commented area, the information processing apparatus 10 may automatically assign the same communication item to the other similar commented areas. In other words, if there are 10 locations in the entire drawing requiring the same correction when one location is designated, those 10 locations become commented areas. In a case in which the user B performs a response operation for any of the commented areas that require the same work, the information processing apparatus 10 may automatically perform the same response operation for the other commented areas of the same type. Previously, the user A would comment on the 10 locations individually, and the user B would also respond to the 10 locations individually, which was extremely time-consuming and could lead to omissions in extraction and response operations. By contrast, according to the configuration of the present embodiment, once one location is commented, the same locations in the drawing can be automatically detected and marked, and a response to one location can be processed collectively for the other locations. These processes can improve the efficiency of work by the users A and B.

The screen of the display 15 is not limited to the example configurations in FIGS. 29, 30, and 32. FIG. 33 is a diagram illustrating an example of a screen on the display 15 connected to the information processing apparatus 10. In FIG. 33, a display area 154 indicating the work by the user A is on the left of the display area 151 of the drawing, and a display area 152 indicating the work by the user B is on the right of the display area 151. The user can designate location 116 by touching the touch panel or moving the cursor with the input device to select 117, 118, or other regions in the drawing. The information processing apparatus 10 displays the content of the work and response by the user, corresponding tally information, and the like in the display areas 152 and 154. In the example in FIG. 33, the communication items between users are also displayed in the display area 151 of the drawing. A sentence indicating a communication item from the user A to the user B is assigned in association with an element group 118. A request from the user A is displayed in 119, and an answer from the user B is displayed by 161. The content of comments and responses may be displayed as appropriate in the display areas 151, 152, and 154 when a commented/responded area is designated on the drawing. Either comments or the responses may be displayed, or the comments and responses may be displayed together. In the example in FIG. 33, the quantity, progress, and the like of the comments and responses are displayed so that the status can be checked and managed. The user A commented on 45 locations on $\frac{8}{10}$, and the user B responded, but the user A commented again, and 5 locations remain in an unfinished state (see the display areas 152, 154). Furthermore, the user A commented on 30 new locations on $\frac{8}{18}$, and the users can share the information that there currently remains a total of 35 locations requiring a response, i.e. the 5 unprocessed locations and the 30 newly commented locations. In response to the user B selecting (designating) the "new" or "30" portions, the controller 11 may perform control to display the positions, in the drawing, of the 30 locations in correspondence with the drawing and to transition among the commented points, as described above. For the "incomplete 35" as well, the controller 11 can display the positions where the work has not been completed on the drawing, and can transition among the points.

Figure 34:
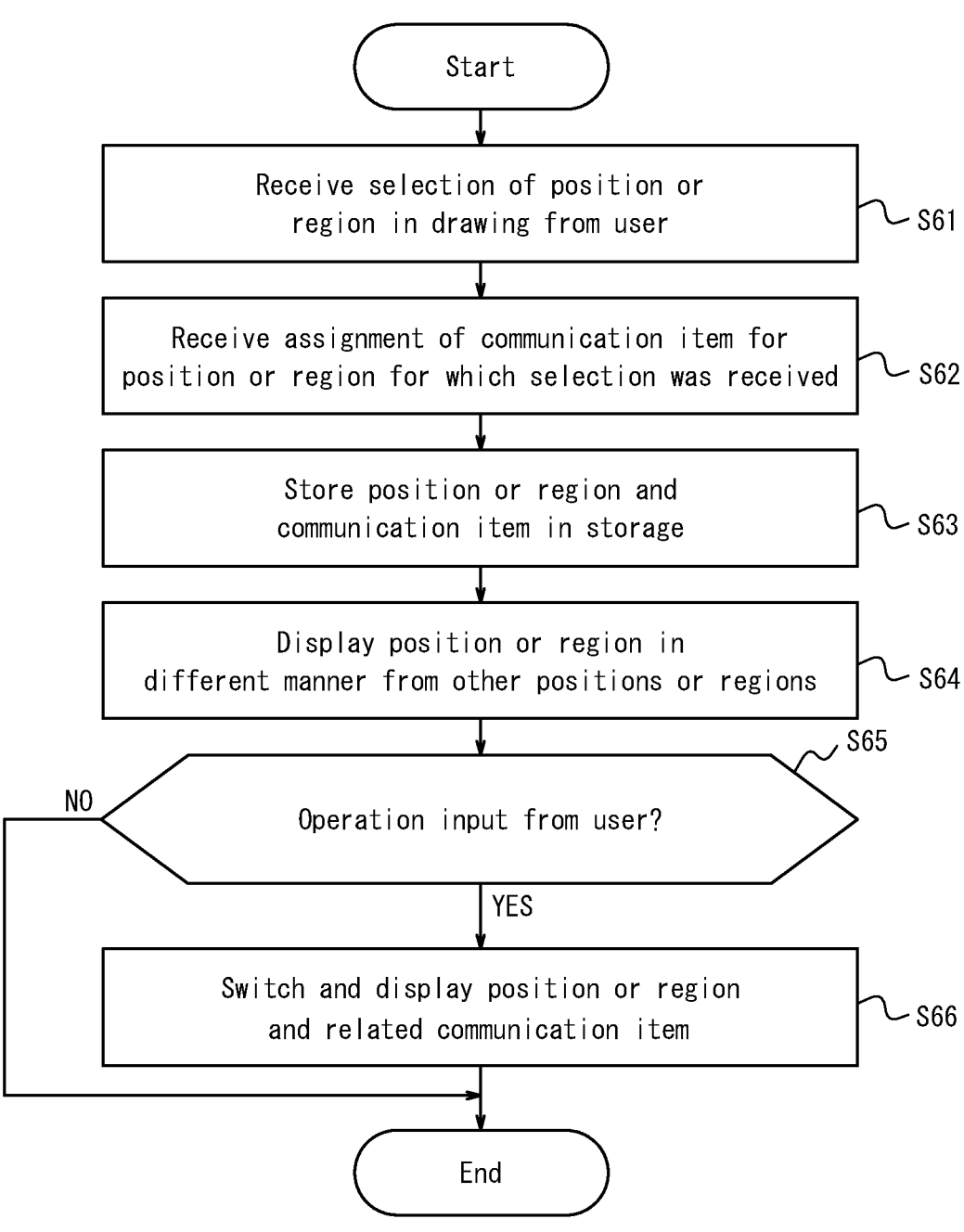
FIG. 34 is a flowchart illustrating example operations of the information processing apparatus according to an embodiment of the present disclosure.

Next, with reference to FIG. 34, operations of the information processing apparatus 10 will be described. The operations of the information processing apparatus 10 described with reference to FIG. 34 correspond to an information processing method according to the present embodiment, and the operation of each step is performed based on control by the controller 11. FIG. 34 is a flowchart illustrating example operations of the information processing apparatus 10 according to an embodiment of the present disclosure.

In step S61, the controller 11 receives a selection of a position or a region (commented point or commented area) in at least one drawing from a first user. While various known methods may be used for the selection of the position or region, details of an evolutionary method will be described later in the seventh and eighth embodiments.

In step S62, the controller 11 receives the assignment of a communication item for a second user from the first user to the position or the region for which the selection from the first user was newly received. Alternatively, the controller 11 receives a selection from the second user for a position or region already selected by the first user and the assignment of a communication item regarding a response. The communication item may include a comment from the first user, a response by the second user, a comment again by the first user, or the like. The selection of a new position or region on the drawing is only made by the user who initially comments. Therefore, for the initially selected position or region, step S61 may be omitted, and a new communication item such as a response or another comment for a selected position or region may be stored in the storage 12 in the form of an addition corresponding to the position or region. As already described, additional processes (response or another comment) are repeated until the process for that position or region is completed.

In step S63, the controller 11 stores marking information indicating the position or the region for which the selection from the first user is received and communication information indicating the communication item in association in the storage 12. As described above, although marking of a new position or region is not necessary in the case of the second user, the controller 11 stores a communication item regarding a response in association with an already marked location. If other communication information has already been stored in association with the marking information, the controller 11 may store the communication information in the storage 12 in association with the other communication information instead of with the marking information.

In step S64, the controller 11 displays the aforementioned communication item on the display 15 in correspondence with the position or region to which the communication item is assigned. Since the communication item from the first user to the second user is displayed in correspondence with the position or region, the second user can easily grasp the position or region to be checked in the drawing and the communication item corresponding to the position or region (the same holds when a response by the second user is communicated to the first user). Accordingly, multiple persons can efficiently perform work, such as correction of a drawing, and communicate information for the work. Here, the controller 11 may display the position or region indicated by the marking information in a different manner from other positions or regions. The drawing may be displayed on the display 15 with emphasis by changing the color or line type, or by adding a mark or the like indicating the first user or the second user. In this case, the color may be changed for each user. In this way, the position or region of the drawing to which the communication item was assigned is displayed with emphasis, thereby enabling each user to easily grasp the position or region of the drawing to which the communication item was assigned.

As described above, the controller 11 switches the position or region to which the communication item is assigned in response to an operation input from the first user or the second user and displays the position or region on the display 15. In step S65, the controller 11 determines whether such an operation input was provided. When such an operation input was provided (YES in step S65), the controller 11 proceeds to step S66, whereas otherwise (NO in step S65), the controller 11 terminates the process of the flowchart.

In step S66, when the user confirms or works on the communication item, from another user, regarding each position or region, the controller 11 displays the content of the communication item regarding the position or region to which the communication item is assigned. When the user finishes checking the position or region and moves to the next position or region, the position or region is switched and displayed on the display 15. Accordingly, the user can check locations to which the communication items are assigned without omission.

The controller 11 may receive a selection of a degree of importance from the first user for each of the positions or regions for which the selection from the first user was received. Then, for each of the positions or regions for which the selection was received from the first user, the controller 11 may store degree of importance information, which is information indicating the degree of importance of the position or the region, in the storage 12 in association with the marking information. Furthermore, the controller 11 may display on the display 15 the positions or regions to which the communication items are assigned by switching the positions or regions in descending order of the degree of importance, in response to an operation input from the first user or the second user. Accordingly, the position or region is switched in descending order of the degree of importance in response to the operation input by the user, thereby enabling the user to confirm the locations to which the communication items were assigned in descending order of need for consideration.

The controller 11 may store response information, indicating whether the second user has responded to a position or region to which a communication item was assigned, in the storage 12 for each piece of marking information, in association with the corresponding marking information. Based on the response information, the controller 11 may then display responded information (for example, an image, mark, or character string indicating "responded") on the display 15 for each of the positions or regions to which a communication item is assigned. The responded information is a marking, as the status of the communication item, indicating that the second user has responded. In this way, an image or the like indicates whether the second user has responded to or confirmed the position or region to which the communication item was assigned by the first user, making it easy for the user to distinguish between locations that have been responded to and locations that have not been responded to. When transitioning between positions or regions, since the portions that have been responded to do not require confirmation, the controller 11 may perform control to switch and transition in order only among the points that have not been responded to.

The controller 11 may receive the assignment of the communication item by character input or an operation to select from among options. Accordingly, the user can assign a communication item to a position or region in the drawing by character input or an operation to select from among options.

The controller 11 may receive assignment of a second communication item from the second user for the position or the region for which the selection from the first user is received. The controller 11 may then store second communication information, which is communication information indicating the second communication item, in the storage 12 in association with the marking information, which is information indicating the position or region for which assignment of the second communication item was received, or in association with other communication information already stored in association with the marking information. Furthermore, the controller 11 may display the second communication item on the display 15 in correspondence with the position or region to which the second communication item is assigned. In this way, not only the communication item from the first user, but also the communication item from the second user are displayed in correspondence with the position or region in the drawing, thereby enabling the user to easily grasp the discussion at the location of interest in the drawing.

Seventh Embodiment

In the present embodiment, a configuration is described in which the elements indicated by all of the graphics even partially included within a region selected by the user are not selected as an element group, but rather the elements to be included in the element group are extracted from the graphics (elements) intersecting (having an intersecting point) with the boundary of the region based on the positional relationship between the boundary of the region and the graphics. According to the configuration of the present embodiment, the user can quickly select the desired element group by a simple operation, without needing to perform a precise and careful operation. The method for the user to select an element group according to the present embodiment can be applied to any configuration of the first to sixth embodiments. The same reference signs are attached to configurations in common with the first embodiment, and a detailed description is omitted.

Next, with reference to FIG. 35, operations of the information processing apparatus 10 will be described. The operations of the information processing apparatus 10 described with reference to FIG. 35 correspond to an information processing method according to the present embodiment, and the operation of each step is performed based on control by the controller 11. FIG. 35 is a flowchart illustrating example operations of the information processing apparatus 10 according to an embodiment of the present disclosure.

Figure 36:
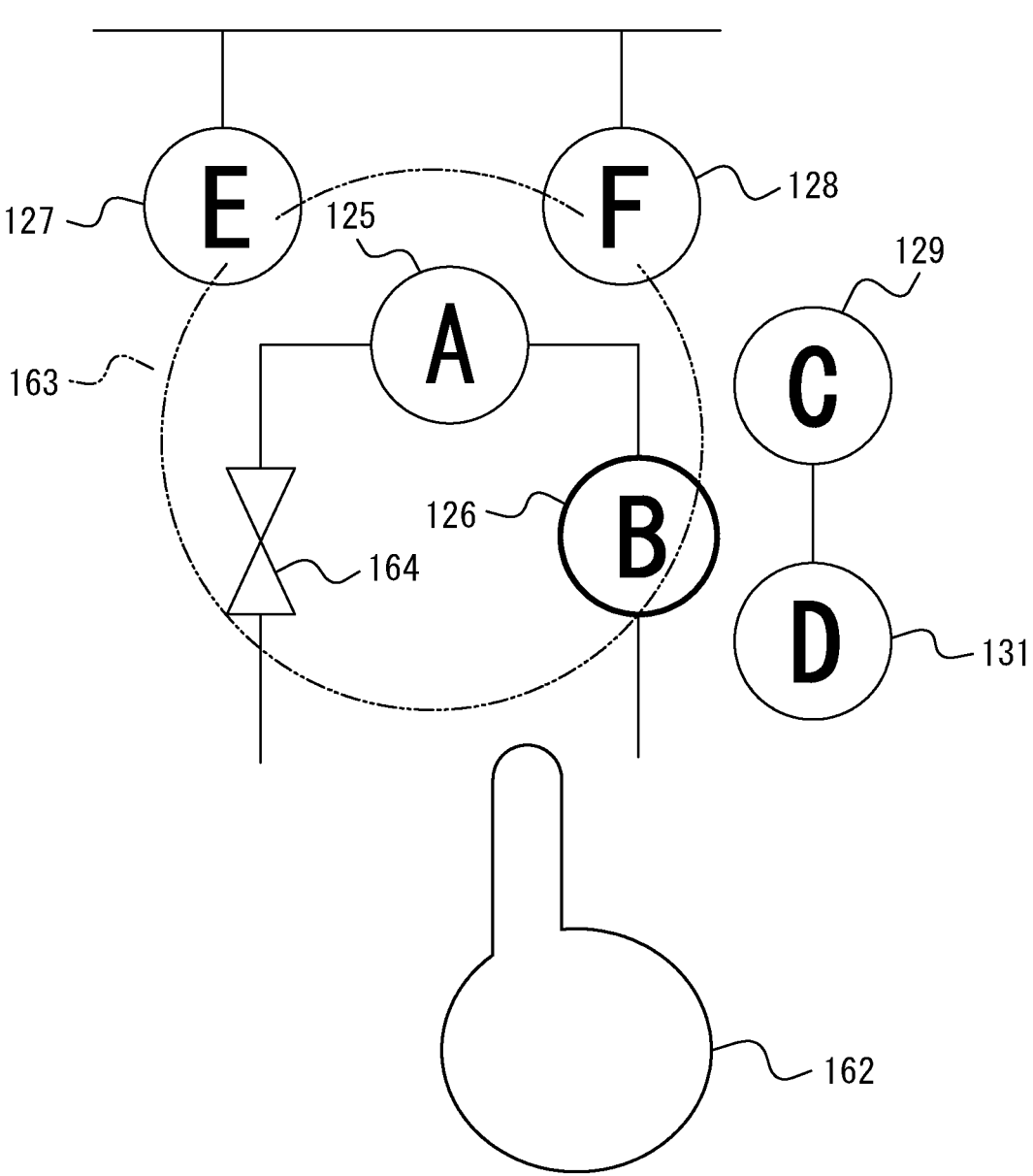
FIG. 36 is a diagram schematically illustrating an operation to select an element group.

In step S71, the controller 11 receives a selection, from a user, of a region in a drawing in which elements are indicated by graphics. FIG. 36 is a diagram schematically illustrating an operation to select an element group. In FIG. 36, a trajectory 163 indicating the periphery (boundary) of the selected region is drawn on the drawing by 162 (which may be a finger or a touch pen touching on the touch panel, or a cursor on the screen operated by an input device) of the user 201, and the region bounded by the trajectory 163 is selected. In FIG. 36, the user 201 is attempting to select a element group formed by a valve, an element A, and an element B. However, only the graphic 164 of the valve and the graphic 125 of the element A are completely contained within the trajectory 163. Besides the graphic 126 of the element B, the trajectory 163 also intersects the graphic 127 of an element E and the graphic 128 of an element F, which the user does not intend to select. The operation to select the region will be described later with reference to FIGS. 38A and 38B.

In step S72, the controller 11 extracts from the drawing first elements indicated by graphics included within the region for which the selection was received (the elements to be selected having not been determined at this point). In the example in FIG. 36, since the graphic 164 and the graphic 125 are included within the region, the controller 11 extracts the valve and the element A as first elements.

In step S73, the controller 11 extracts from the drawing second elements indicated by graphics intersected by the boundary of the region for which the selection was received. In the example in FIG. 36, the trajectory 163 defining the boundary of the region intersects the graphics 126, 127, and 128. Therefore, the controller 11 extracts the element B, the element E, and the element F as second elements.

In step S74, the controller 11 determines whether the positional relationship between the graphic indicating a second element extracted in step S73 and the boundary is a predetermined relationship. When the graphic and the boundary are in a predetermined positional relationship (YES in step S74), the controller 11 proceeds to step S75, and otherwise (NO in step S74) proceeds to step S76.

In step S75, the controller 11 extracts the second element that is a processing target as a third element.

In step S76, the controller 11 determines whether the processing of step S73 to step S75 has been performed for all of the second elements extracted in step S73. When the process has been performed (YES in step S76), the controller 11 proceeds to step S77. When the process has not been performed (NO in step S76), the controller 11 returns to step S73 and continues the process for the other second elements.

In step S77, the controller 11 stores a set of elements, formed by the first elements and the third elements, in the storage 12 as an element group selected by the user 201. The controller 11 then terminates the process of the flowchart.

In this way, the controller 11 does not simply select, as an element group, the elements indicated by the graphics that are even partially included within the region selected by the user, but rather extracts the elements to be included in the element group from the elements indicated by the graphics intersecting with the boundary of the region based on the positional relationship between the boundary of the region and the graphics, and excludes elements that should not be included. Accordingly, the user can quickly select the desired element group by a simple operation, without needing to take time to perform a precise and careful selection operation to prevent the boundary of the selected area from intersecting with the graphics indicating extra elements in an intricate drawing.

As the predetermined positional relationship in step S74, the controller 11 may, for example, determine whether the ratio of the area of the portion, included within the region, of the graphic indicating the second element to the area of the graphic as a whole is a predetermined value (such as 50%) or more. When such a criterion is adopted, the controller 11 includes even elements with graphics partially protruding from the boundary of the region, such as the element B in FIG. 36, in the element group. Therefore, the user can quickly select the desired element group by a simple operation, without needing to take time to perform a precise and careful operation.

Alternatively, when the connection relationship between the elements in the drawing is indicated by connecting lines, the controller 11 may, for example, determine in step S74 whether any of the second elements is connected by the same connecting line as any of the first elements (i.e., whether the elements are in an adjacent relationship along the same connecting line). When such a criterion is adopted, the controller 11 includes elements, among the elements whose graphics intersect with the boundary of the region, for which a portion of the graphic inside the region is in a connection relationship with the first elements (the valve and the element A in the example in FIG. 36), such as the element B in FIG. 36, in the element group. That is, the element B is selected by virtue of being in an adjacent relationship along the same connecting line as the valve and the element A, which have definitely been selected. On the other hand, the elements E and F, for which a portion of the graphic is within the region due to the close position in the drawing to the valve and the element A, are excluded due to not being on the same connecting line. Therefore, the user can quickly select the desired element group by a simple operation, without needing to perform a precise and careful operation.

Alternatively, the controller 11 may, for example, determine in step S74 whether the positional relationship between the boundary of the region and the center of the graphic indicating the second element is a specific relationship. Alternatively, the controller 11 may, for example, determine in step S74 whether the positional relationship between the point where the boundary of the region and the periphery of the graphic indicating the second element intersect and the center of the graphic indicating the second element is a specific relationship.

Figure 37:
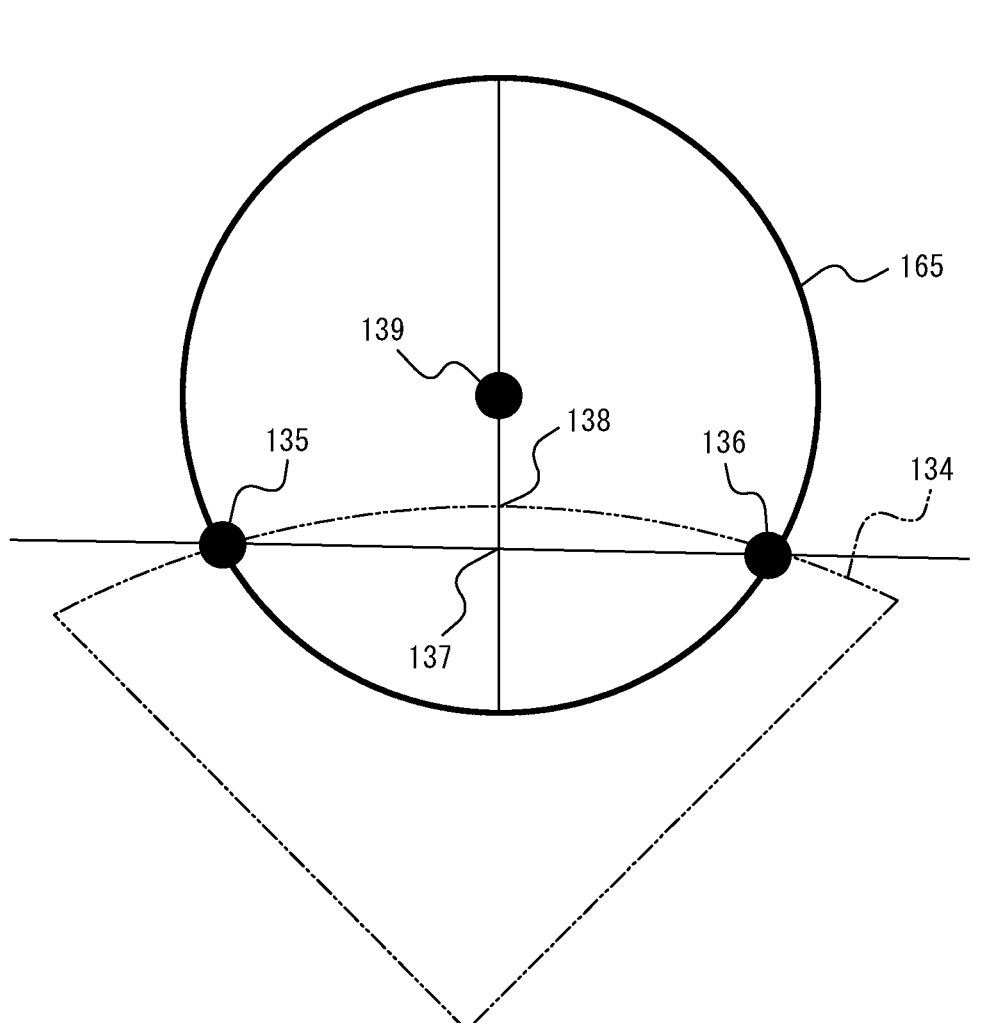
FIG. 37 is a diagram schematically illustrating the relationship between graphics indicating an element group and the selected region.

FIG. 37 is a diagram schematically illustrating the relationship between graphics indicating an element group and the selected region. The periphery of the graphic 165 intersects the trajectory 134 drawn by the user 201 at two intersection points 135, 136. The graphic 165 has a center point 139. The point 137 is the intersection of a first straight line that passes through the two intersection points 135 and 136 and a second straight line that passes through the center point 139 of the graphic 165 and is orthogonal to the first straight line. In the example as illustrated in FIG. 37, the controller 11 may, for example, determine whether the center point 139 of the graphic 165 is included within the region defined by the trajectory 134 as the positional relationship between the boundary of the region and the center of the graphic indicating the second element. Also, as the positional relationship between the point where the boundary of the region and the periphery of the graphic indicating the second element intersect and the center of the graphic indicating the second element, the controller 11 may, for example, determine which side of the center point 139 the point 137 is located on (for example, on the upper or lower side in the drawing). Since the controller 11 extracts the elements to be included in the element group based on such a positional relationship, the user can quickly select the desired element group by a simple operation, without needing to perform a precise and careful operation.

The determination criteria of step S74 illustrated here may be used in combination. That is, the controller 11 may include the second element in the element group when the second element satisfies all of a plurality of criteria, or the second element may be included in the element group when the second element satisfies at least one criterion among the plurality of criteria.

Figure 38A:
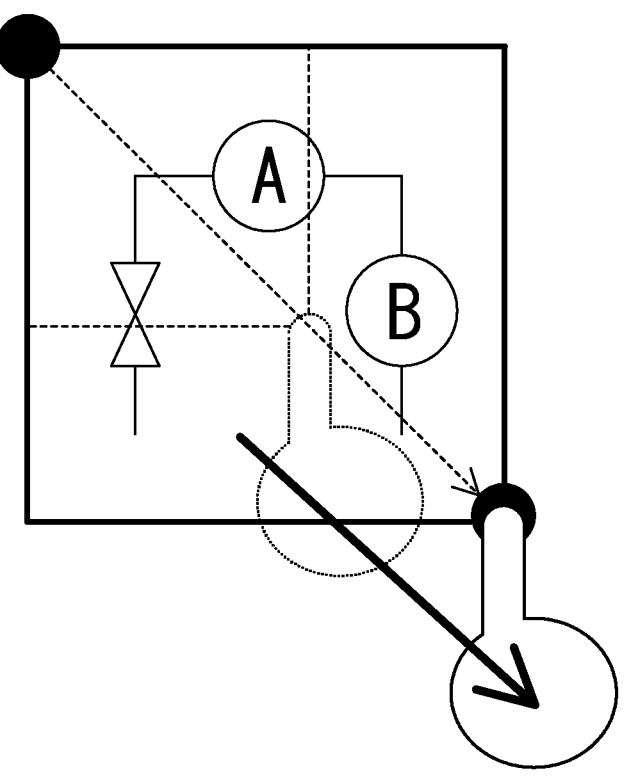
FIG. 38A is a diagram schematically illustrating an operation to select an element group.
Figure 38B:
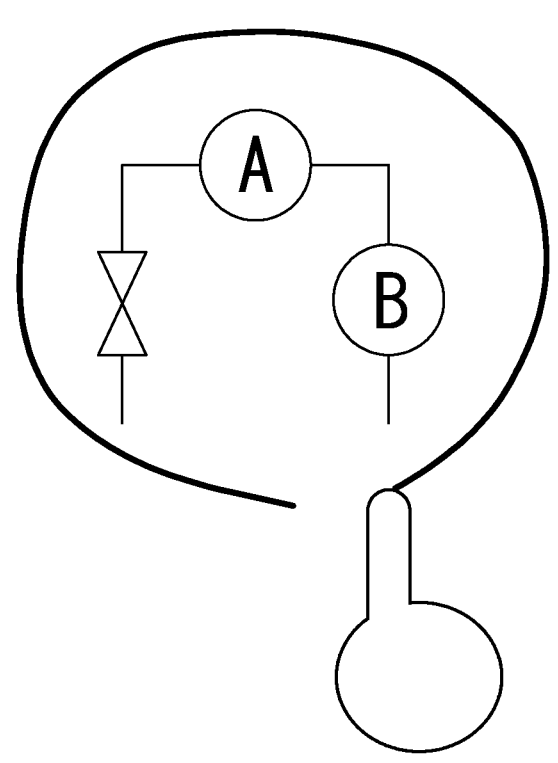
FIG. 38B is a diagram schematically illustrating an operation to select an element group.

The operation by the user 201 to select a region in step S71 will be described with reference to FIGS. 38A and 38B. FIGS. 38A and 38B are diagrams schematically illustrating an operation to select an element group.

In FIG. 38A, the controller 11 receives a first operation for a first position of the drawing via a pointing device or a touch panel and further receives a second operation for a second position of the drawing via a pointing device or a touch panel. The controller 11 then receives, from the user, a selection of a rectangular region having the first position and the second position as ends of a diagonal. Accordingly, the user can easily select a desired element group by a cursor movement operation using the pointing device or by a touch operation on the touch panel.

In FIG. 38B, the controller 11 receives the selection of a region from the user, taking the trajectory traced by an operation with the pointing device or an operation on the touch panel as the boundary of the region. Accordingly, the user can easily select a desired element group by an operation with the pointing device or an operation on the touch panel.

Eighth Embodiment

In the configuration according to the present embodiment, it is determined, based on the time from selection of a region until subsequent selection of a graphic (element) outside the region and/or a positional relationship between the selected region and a subsequently selected graphic (element) outside the region, whether to include the element indicated by the graphic selected after selection of the region as an additionally selected element in the element group selected in the region. Accordingly, it can be automatically determined whether an operation performed after selection of the region is related to the most recent selection operation or is a new selection operation, and an element to be added to an already selected element group can be added by a simple operation. The method for the user to select an element group according to the present embodiment can be applied to any configuration of the first to seventh embodiments. The same reference signs are attached to configurations in common with the first embodiment, and a detailed description is omitted.

Figure 39:
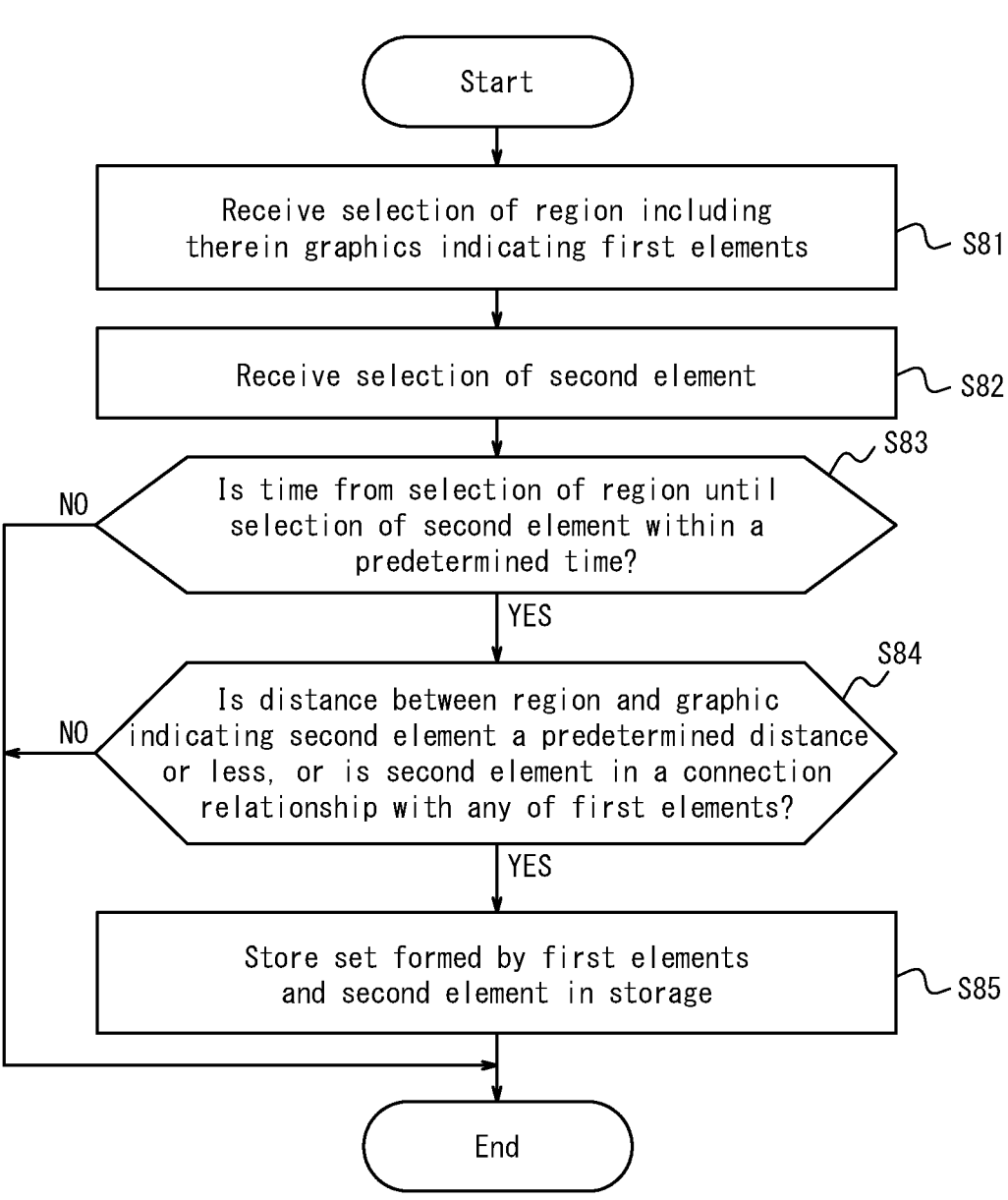
FIG. 39 is a flowchart illustrating example operations of the information processing apparatus according to an embodiment of the present disclosure.

With reference to FIG. 39, operations of the information processing apparatus 10 will be described. The operations of the information processing apparatus 10 described with reference to FIG. 39 correspond to an information processing method according to the present embodiment, and the operation of each step is performed based on control by the controller 11. FIG. 39 is a flowchart illustrating example operations of the information processing apparatus 10 according to an embodiment of the present disclosure. Hereinafter, in the drawings, examples will be described in which the connection relationships between elements are indicated by connecting lines.

Figure 40A:
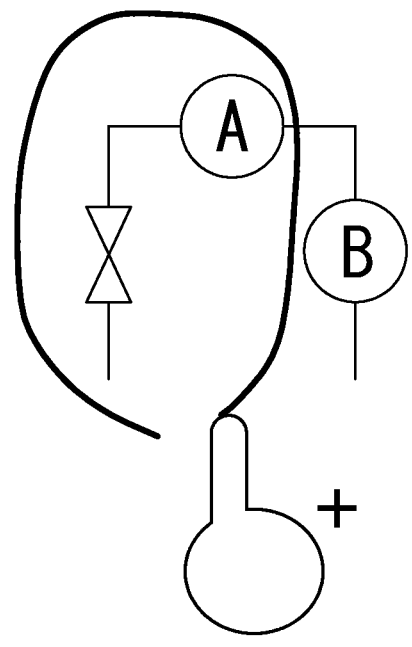
FIG. 40A is a diagram schematically illustrating an operation to select an element group.
Figure 40B:
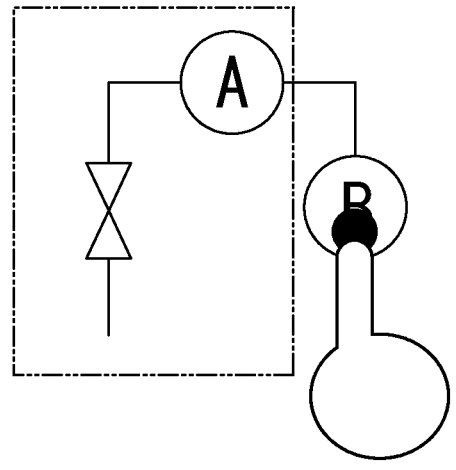
FIG. 40B is a diagram schematically illustrating an operation to select an element group.

In step S81, the controller 11 receives a selection from a user of a region, in a drawing in which elements are indicated by graphics, that contains a plurality of graphics indicating first elements. FIGS. 40A to 41B are diagrams schematically illustrating an operation to select an element group. In FIGS. 40A and 41A, the user 201 selects a region including a valve and an element A as first elements.

After receiving the selection of the region in step S81, the controller 11 receives a selection from the user of a graphic indicating a second element in step S82. In FIG. 40B, the user 201 selects an element B as the second element. In FIG. 41B, the user 201 selects an element C as the second element.

In step S83, the controller 11 determines whether the time from receipt of the selection of the region that includes the graphics of the first elements until receipt of the selection of the graphic indicating the second element is within a predetermined time (for example, 3 seconds). This time may be set to be changeable by the user. When the time is within the predetermined time (YES in step S83), the controller 11 proceeds to step S84, whereas otherwise (NO in step S83), the controller 11 terminates the process of the flowchart.

In step S84, the controller 11 determines whether (1) the distance between the region including the graphic of the first element and the graphic indicating the second element is less than a predetermined distance, or (2) the second element is connected by the same connecting line as any of the first elements. When at least one of the conditions (1) and (2) is satisfied (YES in step S84), the controller 11 proceeds to step S85, whereas otherwise (NO in step S84), the controller 11 terminates the process of the flowchart.

In step S85, the controller 11 stores a set of elements, formed by the first elements and the second element, in the storage 12 as an element group selected by the user. The controller 11 then terminates the process of the flowchart.

Figure 40C:
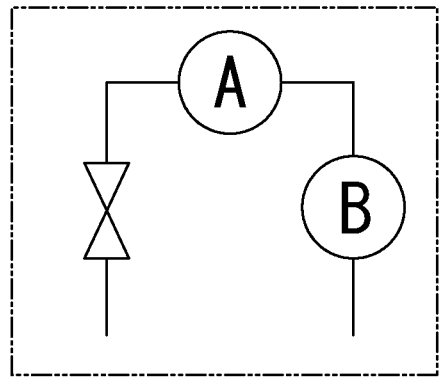
FIG. 40C is a diagram schematically illustrating an operation to select an element group.
Figures 41A, 41B:
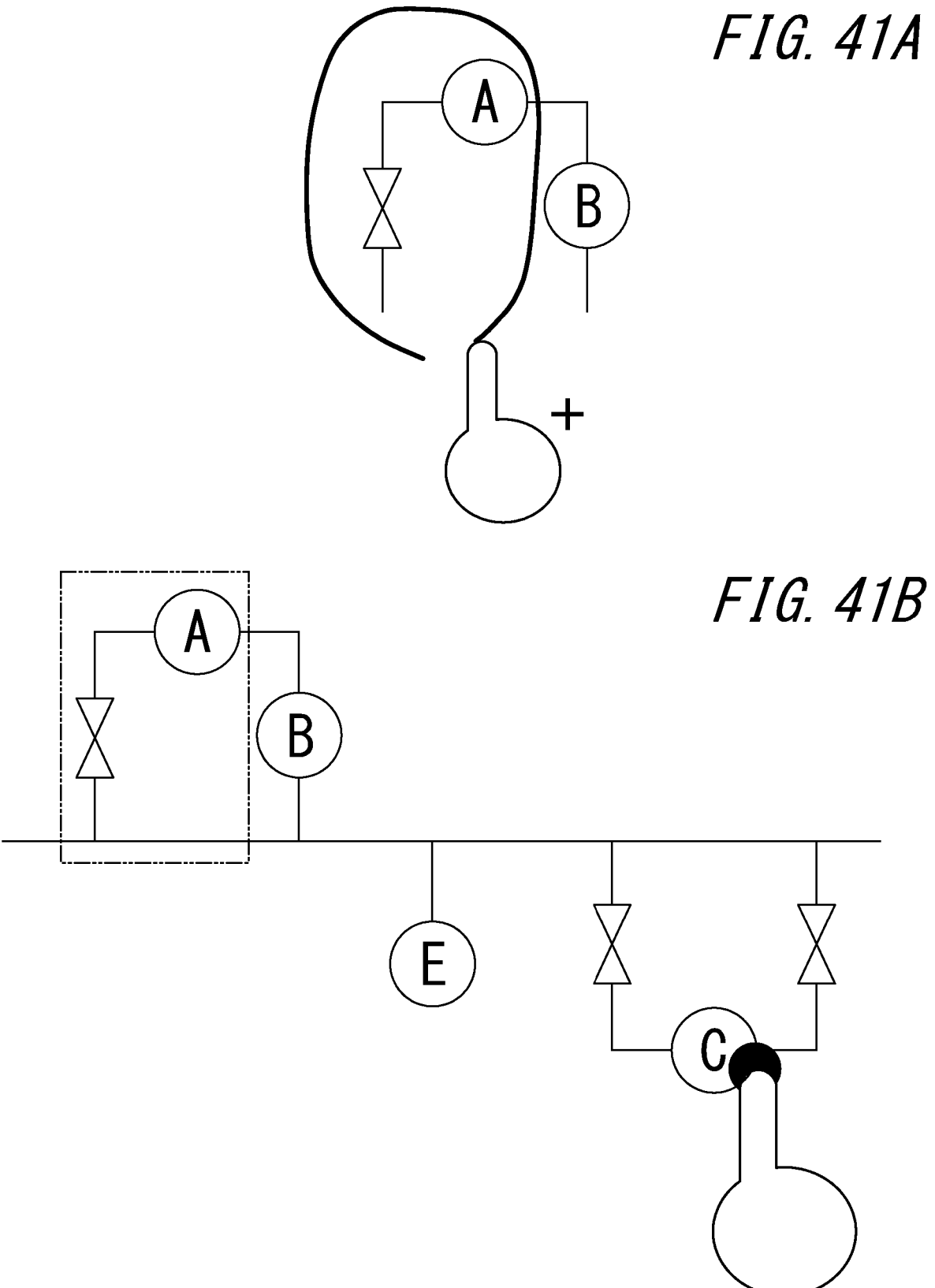
FIG. 41A is a diagram schematically illustrating an operation to select an element group.
FIG. 41B is a diagram schematically illustrating an operation to select an element group.

The controller 11 includes the second element in the selected element group when the time from receipt of the selection of the region that includes the graphics of the first elements until receipt of the selection of the graphic indicating the second element is within the predetermined time, and the region and the second element are in a specific positional relationship (steps S83 to S85, FIG. 40C). Accordingly, once the user selects an element group, the user can select an element near the element group, or an element connected by the same connecting line as an element included in the element group, within a predetermined time to add the element to the element group selected immediately prior. The user can therefore add an element that is to be added to an already selected element group by a simple operation, without having to select the element group again. Although both the temporal condition and the positional condition are listed in the flow of FIG. 39, either of the procedures may be omitted for a determination based only on one of the conditions.

In this way, the controller 11 determines whether an element indicated by a graphic selected after the selection of the region is to be included in the element group based on the time from selection of the region until selection of the graphic, the distance between the selected region and the graphic, and/or the connection relationship between the selected region and the graphic. Accordingly, the controller 11 can automatically determine whether an operation performed after selection of the region is related to the most recent selection operation or is a new selection operation, and an element to be added to an already selected element group can be added by a simple operation.

In FIG. 39, the controller 11 includes the second element in the selected element group when (a), (b), and/or (c) among the following conditions (a) to (c) is satisfied, but the conditions for including the second element in the element group are not limited to these examples. For example, the controller 11 may include the second element in the selected element group when any one or more of the following conditions are satisfied, when any two or more of the conditions are satisfied, or when all of the conditions are satisfied.

(a) The time from receipt of the selection of the region that includes the graphics of the first elements until receipt of the selection of the graphic indicating the second element is within a predetermined time.

(b) The distance between the region containing the graphics of the first elements and the graphic indicating the second element is less than a predetermined distance.

(c) The second element is connected by the same connecting line as any of the first elements.

In addition to the elements indicated by graphics included within the region for which the selection is received, the controller 11 may, in step S81, extract elements indicated by graphics that intersect the boundary of the region as first elements, as illustrated in the seventh embodiment. Not only the elements whose graphics are entirely included within the selected region, but also elements whose graphics intersect the boundary of the region can thus be extracted as the first elements, enabling the user to select a desired element group with a simple operation.

Figure 42:
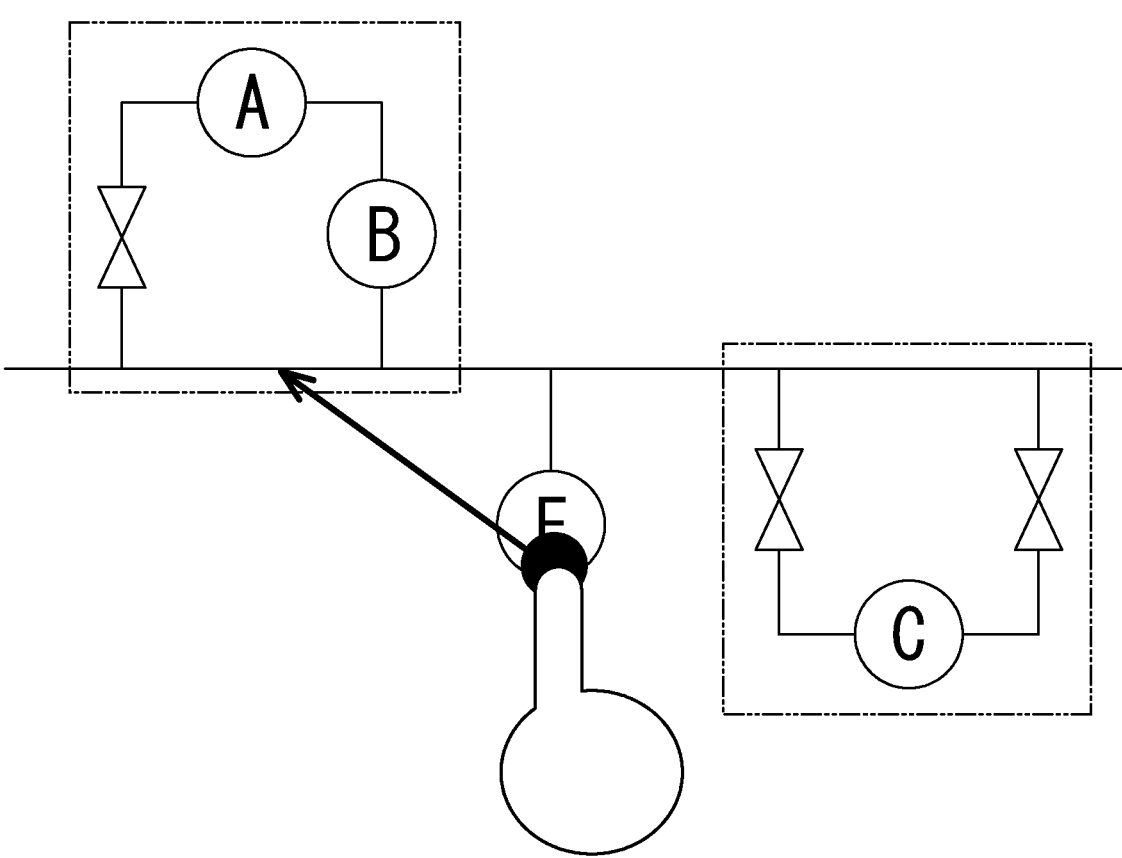
FIG. 42 is a diagram schematically illustrating an operation to select an element group.

When the user performs an operation to drag the graphic of the second element to the region after the selection of the region containing the graphics of the first elements is received, the controller 11 may determine a set of elements formed by the first elements and the second element as the element group selected by the user. FIG. 42 is a diagram schematically illustrating an operation to select an element group. In FIG. 42, after an element group 1 formed by a valve, an element A, and an element B is selected, an element group 2 formed by a valve, an element C, and a valve is selected. Subsequently, the element E is dragged to the region of the element group 1. In such a case, the controller 11 adds the element E to the element group 1 and stores the element group 1 in the storage 12. According to such a process, the user can select a desired element group with an intuitive, understandable operation. In this case, if the user simply drags the element in the direction of the region to which the user wants to add the element, without completely dragging the element into the displayed region, the controller 11 may add the element to the region located in that direction. In other words, operations to drag the graphic of the second element to the region include not only dragging the element into the region but also dragging the element in the direction in which the region is located.

The present disclosure is not limited to the above-described embodiments. For example, a plurality of blocks described in the block diagrams may be integrated, or a block may be divided. Instead of a plurality of steps described in the flowcharts being executed in chronological order in accordance with the description, the plurality of steps may be executed in parallel or in a different order according to the processing capability of the apparatus that executes each step, or as required. Other modifications can be made without departing from the spirit of the present disclosure. Although each disclosed example has been described using drawings of a plant, the present disclosure is not limited to the example of plants and may be applied in fields that deal with drawings depicting a plurality of graphic elements.

The invention claimed is:

1. An information processing apparatus comprising a processor configured to:

retrieve a drawing from a storage;

display the drawing on a display in which a plurality of elements are indicated by graphics and in which a connection relationship between the plurality of elements is indicated by connecting lines, that contains a plurality of the graphics;

receive via an input interface a drawing of a trajectory from a user, in the drawing displayed on the display;

automatically extract from the drawing, as one or more first elements, elements of the plurality of elements, indicated by the graphics, that are completely contained within a region whose outer periphery is defined by the trajectory drawn by the user;

automatically extract from the drawing, as one or more second elements, elements of the plurality of elements, indicated by the graphics, that intersect a boundary of the region for which the selection is received;

for each of the one or more automatically extracted second elements, automatically determine whether the graphic indicating a second element among the one or more second elements is connected by the same connecting line as a first element among the one or more first elements, and automatically extract said second element among the one or more second elements as a third element when the graphic indicating said second element among the one or more second elements is connected by the same connecting line as the first element among the one or more first elements;

automatically store a set of elements including the one or more first elements and the third element in the storage as an element group selected by the user;

automatically search for, from the drawing, an element group that conforms to the element group selected by the user;

automatically display the searched element group on the display in correspondence with a position on the drawing; and correct the element group that conforms to the element group selected by the user.

2. The information processing apparatus of claim 1, wherein as the third element, the processor further extracts, from among the one or more second elements, a second element for which a ratio of an area of a portion, included within the region, of the graphic indicating the second element to an area of the graphic as a whole is a predetermined value or more.

3. The information processing apparatus of claim 1, wherein the processor further extracts the third element based on a positional relationship between a point of intersection of the boundary of the region with a periphery of each graphic indicating the one or more second elements and a center of the graphic.

4. The information processing apparatus of claim 1, wherein the processor receives the selection of the region from the user by taking a trajectory drawn on the drawing by an operation with a pointing device or an operation on a touch panel as the boundary of the region.

5. The information processing apparatus of claim 1, wherein the processor:

receives a first operation for a first position of the drawing by a pointing device or a touch panel;

receives a second operation for a second position of the drawing by the pointing device or the touch panel; and receives, from the user, a selection of a rectangular region having the first position and the second position as ends of a diagonal.

6. The information processing apparatus of claim 1, wherein the input interface is configured by a touchscreen integrally provided with the display.

7. The information processing apparatus of claim 1, wherein the drawing is a piping and instrument diagram (P&ID) illustrating a configuration of a large-scale system of a plant, and the plurality of elements include a plurality of piping elements and a plurality of instrumentation elements.

8. The information processing apparatus of claim 1, wherein the processor is further configured to search from the drawing, as element groups that conform to the element group selected by the user, element groups that are completely identical to the search element group and element groups that are partially different than the search element groups.

9. The information processing apparatus comprising a processor configured to:

retrieve a drawing from a storage;

display the drawing on a display in which a plurality of elements are indicated by graphics and in which a connection relationship between the plurality of elements is indicated by connecting lines, that contains a plurality of the graphics;

receive via an input interface a drawing of a trajectory from a user, in the drawing displayed on the display;

automatically extract from the drawing, as one or more first elements, elements of the plurality of elements, indicated by the graphics, that are completely contained within a region whose outer periphery is defined by the trajectory drawn by the user;

automatically extract from the drawing, as one or more second elements, elements of the plurality of elements, indicated by the graphics, that intersect a boundary of the region for which the selection is received;

for each of the one or more automatically extracted second elements, automatically determine whether a positional relationship between a center of graphic indicating a second element among the one or more second elements and the boundary of the region is a specific relationship, and automatically extract said second element among the one or more second elements as a third element when the positional relationship between the center of graphic indicating said second element among the one or more second elements and the boundary of the region is the specific relationship;

automatically store a set of elements including the one or more first elements and the third element in the storage as an element group selected by the user; and automatically search for, from the drawing, an element group that conforms to the element group selected by the user;

automatically display the searched element group on the display in correspondence with a position on the drawing; and correct the element group that conforms to the element group selected by the user.

10. An information processing method to be performed by a processor of an information processing apparatus, the information processing method comprising:

retrieve a drawing from a storage;

display the drawing on a display in which a plurality of elements are indicated by graphics and in which a connection relationship between the plurality of elements is indicated by connecting lines, that contains a plurality of the graphics;

receiving via an input interface a drawing of a trajectory from a user, in the drawing displayed on the display;

automatically extracting from the drawing, as one or more first elements, elements of the plurality of elements, indicated by the graphics, that are completely contained within a region whose outer periphery is defined by the trajectory drawn by the user;

automatically extracting from the drawing, as one or more second elements, elements of the plurality of elements, indicated by graphics that intersect a boundary of the region for which the selection is received;

for each of the one or more automatically extracted second elements, automatically determining whether the graphic indicating a second element among the one or more second elements is connected by the same connecting line as a first element among the one or more first elements, and automatically extracting said second element as a third element when the graphic indicating said second element is connected by the same connecting line as the first element among the one or more first elements; and automatically storing a set of elements including the one or more first elements and the third element in the storage as an element group selected by the user;

automatically searching for, from the drawing, an element group that conforms to the element group selected by the user;

automatically displaying the searched element group on the display in correspondence with a position on the drawing; and correcting the element group that conforms to the element group selected by the user.

11. A non-transitory computer readable storage medium storing a computer program which, when executed by a computer, causes the computer to at least:

retrieve a drawing from a storage;

display the drawing on a display in which a plurality of elements are indicated by graphics and in which a connection relationship between the plurality of elements is indicated by connecting lines, that contains a plurality of the graphics;

receive via an input interface a drawing of a trajectory from a user, in the drawing displayed on the display;

automatically extract from the drawing, as one or more first elements, elements of the plurality of elements, indicated by the graphics, that are completely contained within a region whose outer periphery is defined by the trajectory drawn by the user;

automatically extract from the drawing, as second elements, elements of the plurality of elements, indicated by the graphics, that intersect a boundary of the region for which the selection is received;

for each of the one or more automatically extracted second elements, automatically determine whether the graphic indicating said second element among the one or more second elements is connected by the same connecting line as a first element among the one or more first elements, and automatically extract said second element as a third element when the graphic indicating said second element is connected by the same connecting line as any first element among the one or more first elements; and automatically store a set of elements including the one or more first elements and the third element in the storage as an element group selected by the user;

automatically search for, from the drawing, an element group that conforms to the element group selected by the user;

automatically display the searched element group on the display in correspondence with a position on the drawing; and correct the element group that conforms to the element group selected by the user.

<p style="text-align:center">* * * * *</p>